US011171764B1

(12) United States Patent
Bennett et al.

(10) Patent No.: US 11,171,764 B1
(45) Date of Patent: Nov. 9, 2021

(54) METHOD AND APPARATUS FOR AUTOMATICALLY RETRANSMITTING CORRUPTED DATA

(71) Applicant: AT&T Intellectual Property I, L.P., Atlanta, GA (US)

(72) Inventors: Robert Bennett, Southold, NY (US); Farhad Barzegar, Branchburg, NJ (US); Irwin Gerszberg, Kendall Park, NJ (US); Donald J. Barnickel, Flemington, NJ (US); Giovanni Vannucci, Middletown, NJ (US); Paul Shala Henry, Holmdel, NJ (US); Peter Wolniansky, Ocean Grove, NJ (US); Thomas M. Willis, III, Tinton Falls, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/999,522

(22) Filed: Aug. 21, 2020

(51) Int. Cl.
*H04L 5/14* (2006.01)
*H04B 3/28* (2006.01)
(Continued)

(52) U.S. Cl.
CPC ............ *H04L 5/14* (2013.01); *H04B 1/0475* (2013.01); *H04B 3/28* (2013.01); *H04B 10/61* (2013.01)

(58) Field of Classification Search
CPC .. H04L 5/14; H04B 3/28; H04B 10/61; H04B 1/0475
(Continued)

(56) References Cited

U.S. PATENT DOCUMENTS 2,542,980 A 2/1951 Barrow
2,685,068 A 7/1954 Goubau
(Continued)

FOREIGN PATENT DOCUMENTS

CA 2515560 A1 2/2007
EP 2568528 B1 12/2017
(Continued)

OTHER PUBLICATIONS en.wikipedia.org/wiki/Go-Back-N_ARQ; Aug. 20, 2020; pp. 1-2.
(Continued)

*Primary Examiner* — Fitwi Y Hailegiorgis
(74) *Attorney, Agent, or Firm* — Guntin & Gust, PLC; Robert Gingher

(57) ABSTRACT

Aspects of the subject disclosure may include a communication system including a full duplex transceiver is configured to transmit and receive electromagnetic wave signals simultaneously over a transmission medium; a processing system including a processor; and a memory that stores executable instructions that, when executed by the processing system, facilitates the performance of operations, including: transmitting, via the full duplex transceiver, electromagnetic wave signals that convey a plurality of data frames, wherein the electromagnetic wave signals propagate along the transmission medium to another transceiver, wherein the electromagnetic wave signals propagate along the transmission medium without requiring an electrical return path; monitoring, via the full duplex transceiver, the transmission medium for an interference; identifying, via the full duplex transceiver, one or more data frames of the plurality of data frames that were transmitted during a period of the interference; and retransmitting, via the full duplex transceiver, the one or more data frames. Other embodiments are disclosed.

20 Claims, 31 Drawing Sheets

(51) Int. Cl.
*H04B 10/61* (2013.01)
*H04B 1/04* (2006.01)

(58) Field of Classification Search
USPC ........................................................ 375/262
See application file for complete search history.

(56) References Cited

U.S. PATENT DOCUMENTS

| | | |
|---|---|---|
| 2,737,632 A | 3/1956 | Grieg et al. |
| 2,852,753 A | 9/1958 | Walter et al. |
| 2,867,776 A | 1/1959 | Wilkinson, Jr. |
| 2,912,695 A | 11/1959 | Cutler |
| 2,921,277 A | 1/1960 | Goubau |
| 3,201,724 A | 8/1965 | Hafner |
| 3,389,394 A | 6/1968 | Lewis |
| 3,566,317 A | 2/1971 | Theodore |
| 3,588,754 A | 6/1971 | Theodore |
| 4,730,172 A | 3/1988 | Bengeult |
| 4,783,665 A | 11/1988 | Lier et al. |
| 4,825,221 A | 4/1989 | Suzuki et al. |
| RE34,036 E | 8/1992 | McGeehan et al. |
| 5,642,121 A | 6/1997 | Martek et al. |
| 5,889,449 A | 3/1999 | Fiedziuszko |
| 5,937,335 A | 8/1999 | Park et al. |
| 6,239,377 B1 | 5/2001 | Nishikawa et al. |
| 7,009,471 B2 | 3/2006 | Elmore |
| 7,043,271 B1 | 5/2006 | Seto et al. |
| 7,280,033 B2 | 10/2007 | Berkman et al. |
| 7,301,424 B2 | 11/2007 | Suarez-gartner et al. |
| 7,345,623 B2 | 3/2008 | McEwan et al. |
| 7,567,154 B2 | 7/2009 | Elmore |
| 7,590,404 B1 | 9/2009 | Johnson et al. |
| 7,915,980 B2 | 3/2011 | Hardacker et al. |
| 7,925,235 B2 | 4/2011 | Konya et al. |
| 8,159,385 B2 | 4/2012 | Farneth et al. |
| 8,212,635 B2 | 7/2012 | Miller, II et al. |
| 8,237,617 B1 | 8/2012 | Johnson et al. |
| 8,253,516 B2 | 8/2012 | Miller, II et al. |
| 8,269,583 B2 | 9/2012 | Miller, II et al. |
| 8,344,829 B2 | 1/2013 | Miller, II et al. |
| 8,736,502 B1 | 5/2014 | Mehr et al. |
| 8,897,697 B1 | 11/2014 | Bennett et al. |
| 9,113,347 B2 | 8/2015 | Shala |
| 9,209,902 B2 | 12/2015 | Willis, III et al. |
| 9,312,919 B1 | 4/2016 | Barzegar et al. |
| 9,461,706 B1 | 10/2016 | Bennett et al. |
| 9,490,869 B1 | 11/2016 | Henry |
| 9,509,415 B1 | 11/2016 | Henry et al. |
| 9,520,945 B2 | 12/2016 | Gerszberg et al. |
| 9,525,524 B2 | 12/2016 | Barzegar et al. |
| 9,544,006 B2 | 1/2017 | Henry et al. |
| 9,564,947 B2 | 2/2017 | Stuckman et al. |
| 9,577,306 B2 | 2/2017 | Willis, III et al. |
| 9,608,692 B2 | 3/2017 | Willis, III et al. |
| 9,608,740 B2 | 3/2017 | Henry et al. |
| 9,615,269 B2 | 4/2017 | Henry et al. |
| 9,627,768 B2 | 4/2017 | Henry et al. |
| 9,628,116 B2 | 4/2017 | Willis, III et al. |
| 9,640,850 B2 | 5/2017 | Henry et al. |
| 9,653,770 B2 | 5/2017 | Henry et al. |
| 9,680,670 B2 | 6/2017 | Henry et al. |
| 9,692,101 B2 | 6/2017 | Henry et al. |
| 9,705,561 B2 | 7/2017 | Henry et al. |
| 9,705,571 B2 | 7/2017 | Gerszberg et al. |
| 9,742,462 B2 | 8/2017 | Bennett et al. |
| 9,748,626 B2 | 8/2017 | Henry et al. |
| 9,749,053 B2 | 8/2017 | Henry et al. |
| 9,722,318 B2 | 9/2017 | Adriazola et al. |
| 9,768,833 B2 | 9/2017 | Fuchs et al. |
| 9,769,020 B2 | 9/2017 | Henry et al. |
| 9,780,834 B2 | 10/2017 | Henry et al. |
| 9,793,951 B2 | 10/2017 | Henry et al. |
| 9,793,954 B2 | 10/2017 | Bennett et al. |
| 9,847,566 B2 | 12/2017 | Henry et al. |
| 9,853,342 B2 | 12/2017 | Henry et al. |
| 9,860,075 B1 | 1/2018 | Gerszberg et al. |
| 9,865,911 B2 | 1/2018 | Henry et al. |
| 9,866,309 B2 | 1/2018 | Bennett et al. |
| 9,871,282 B2 | 1/2018 | Henry et al. |
| 9,871,283 B2 | 1/2018 | Henry et al. |
| 9,876,264 B2 | 1/2018 | Barnickel et al. |
| 9,876,570 B2 | 1/2018 | Henry et al. |
| 9,876,605 B1 | 1/2018 | Henry et al. |
| 9,882,257 B2 | 1/2018 | Henry et al. |
| 9,893,795 B1 | 2/2018 | Willis et al. |
| 9,912,381 B2 | 3/2018 | Bennett et al. |
| 9,917,341 B2 | 3/2018 | Henry et al. |
| 9,991,580 B2 | 6/2018 | Henry et al. |
| 9,997,819 B2 | 6/2018 | Bennett et al. |
| 9,998,172 B1 | 6/2018 | Barzegar et al. |
| 9,998,870 B1 | 6/2018 | Bennett et al. |
| 9,999,038 B2 | 6/2018 | Barzegar et al. |
| 10,003,364 B1 | 6/2018 | Willis, III et al. |
| 10,009,063 B2 | 6/2018 | Gerszberg et al. |
| 10,009,065 B2 | 6/2018 | Henry et al. |
| 10,009,067 B2 | 6/2018 | Birk et al. |
| 10,009,901 B2 | 6/2018 | Gerszberg |
| 10,027,397 B2 | 7/2018 | Kim |
| 10,027,427 B2 | 7/2018 | Vannucci et al. |
| 10,033,107 B2 | 7/2018 | Henry et al. |
| 10,033,108 B2 | 7/2018 | Henry et al. |
| 10,044,409 B2 | 8/2018 | Barzegar et al. |
| 10,051,483 B2 | 8/2018 | Barzegar et al. |
| 10,051,488 B1 | 8/2018 | Vannucci et al. |
| 10,062,970 B1 | 8/2018 | Vannucci et al. |
| 10,069,535 B2 | 9/2018 | Vannucci et al. |
| 10,079,661 B2 | 9/2018 | Gerszberg et al. |
| 10,090,606 B2 | 10/2018 | Henry et al. |
| 10,096,883 B2 | 10/2018 | Henry et al. |
| 10,103,777 B1 | 10/2018 | Henry et al. |
| 10,103,801 B2 | 10/2018 | Bennett et al. |
| 10,123,217 B1 | 11/2018 | Barzegar et al. |
| 10,129,057 B2 | 11/2018 | Willis, III et al. |
| 10,135,145 B2 | 11/2018 | Henry et al. |
| 10,136,434 B2 | 11/2018 | Gerszberg et al. |
| 10,142,086 B2 | 11/2018 | Bennett et al. |
| 10,148,016 B2 | 12/2018 | Johnson et al. |
| 10,154,493 B2 | 12/2018 | Bennett et al. |
| 10,170,840 B2 | 1/2019 | Henry et al. |
| 10,171,158 B1 | 1/2019 | Barzegar et al. |
| 10,200,106 B1 | 2/2019 | Barzegar et al. |
| 10,205,212 B2 | 2/2019 | Henry et al. |
| 10,205,231 B1 | 2/2019 | Henry et al. |
| 10,205,655 B2 | 2/2019 | Barzegar et al. |
| 10,224,981 B2 | 3/2019 | Henry et al. |
| 10,230,426 B1 | 3/2019 | Henry et al. |
| 10,230,428 B1 | 3/2019 | Barzegar et al. |
| 10,243,270 B2 | 3/2019 | Henry et al. |
| 10,244,408 B1 | 3/2019 | Vannucci et al. |
| 10,264,586 B2 | 4/2019 | Beattie, Jr. et al. |
| 10,276,907 B2 | 4/2019 | Bennett et al. |
| 10,284,261 B2 | 5/2019 | Barzegar et al. |
| 10,291,286 B2 | 5/2019 | Henry et al. |
| 10,305,190 B2 | 5/2019 | Britz et al. |
| 10,305,192 B1 | 5/2019 | Rappaport |
| 10,305,197 B2 | 5/2019 | Henry et al. |
| 10,312,567 B2 | 6/2019 | Bennett et al. |
| 10,320,586 B2 | 6/2019 | Henry et al. |
| 10,326,495 B1 | 6/2019 | Barzegar et al. |
| 10,340,573 B2 | 7/2019 | Johnson et al. |
| 10,340,600 B2 | 7/2019 | Henry et al. |
| 10,340,979 B1 | 7/2019 | Barzegar et al. |
| 10,348,391 B2 | 7/2019 | Bennett et al. |
| 10,355,745 B2 | 7/2019 | Henry et al. |
| 10,361,489 B2 | 7/2019 | Britz et al. |
| 10,371,889 B1 | 8/2019 | Barzegar et al. |
| 10,374,277 B2 | 8/2019 | Henry et al. |
| 10,374,278 B2 | 8/2019 | Henry et al. |
| 10,374,281 B2 | 8/2019 | Henry et al. |
| 10,374,316 B2 | 8/2019 | Bennett et al. |
| 10,389,029 B2 | 8/2019 | Henry et al. |
| 10,389,037 B2 | 8/2019 | Johnson et al. |
| 10,389,403 B2 | 8/2019 | Henry et al. |
| 10,389,419 B2 | 8/2019 | Johnson et al. |

(56) References Cited

U.S. PATENT DOCUMENTS

| | | |
|---|---|---|
| 10,405,199 B1 | 9/2019 | Henry et al. |
| 10,411,356 B2 | 9/2019 | Johnson et al. |
| 10,411,920 B2 | 9/2019 | Henry et al. |
| 10,424,845 B2 | 9/2019 | Johnson et al. |
| 10,439,290 B2 | 10/2019 | Adriazola et al. |
| 10,446,899 B2 | 10/2019 | Henry et al. |
| 10,446,936 B2 | 10/2019 | Henry et al. |
| 10,454,151 B2 | 10/2019 | Henry et al. |
| 10,469,156 B1 | 11/2019 | Barzegar et al. |
| 10,469,192 B2 | 11/2019 | Wolniansky et al. |
| 10,469,228 B2 | 11/2019 | Barzegar et al. |
| 10,498,589 B2 | 12/2019 | Barzegar et al. |
| 10,505,248 B2 | 12/2019 | Henry et al. |
| 10,505,249 B2 | 12/2019 | Henry et al. |
| 10,505,250 B2 | 12/2019 | Henry et al. |
| 10,505,252 B2 | 12/2019 | Stuckman et al. |
| 10,505,584 B1 | 12/2019 | Henry et al. |
| 10,511,346 B2 | 12/2019 | Henry et al. |
| 10,516,555 B2 | 12/2019 | Henry et al. |
| 10,523,269 B1 | 12/2019 | Henry et al. |
| 10,523,388 B2 | 12/2019 | Gerszberg et al. |
| 10,530,505 B2 | 1/2020 | Henry et al. |
| 10,547,545 B2 | 1/2020 | Barzegar et al. |
| 10,553,959 B2 | 2/2020 | Vannucci et al. |
| 10,553,960 B2 | 2/2020 | Vannucci et al. |
| 10,554,454 B2 | 2/2020 | Henry et al. |
| 10,555,249 B2 | 2/2020 | Barzegar et al. |
| 10,555,318 B2 | 2/2020 | Willis, III et al. |
| 10,581,275 B2 | 3/2020 | Vannucci et al. |
| 10,587,310 B1 | 3/2020 | Bennett et al. |
| 10,601,494 B2 | 3/2020 | Vannucci |
| 10,608,312 B2 | 3/2020 | Henry et al. |
| 10,623,033 B1 | 4/2020 | Henry et al. |
| 10,623,056 B1 | 4/2020 | Bennett et al. |
| 10,623,057 B1 | 4/2020 | Bennett et al. |
| 10,629,995 B2 | 4/2020 | Rappaport |
| 10,637,149 B2 | 4/2020 | Britz |
| 10,637,535 B1 | 4/2020 | Vannucci et al. |
| 10,665,942 B2 | 5/2020 | Henry et al. |
| 10,673,116 B2 | 6/2020 | Henry et al. |
| 10,680,308 B2 | 6/2020 | Vannucci et al. |
| 10,686,493 B2 | 6/2020 | Barzegar et al. |
| 10,693,667 B2 | 6/2020 | Barzegar et al. |
| 10,714,824 B2 | 7/2020 | Bennett et al. |
| 10,714,831 B2 | 7/2020 | Vannucci et al. |
| 10,727,577 B2 | 7/2020 | Henry et al. |
| 10,727,583 B2 | 7/2020 | Henry et al. |
| 10,727,599 B2 | 7/2020 | Wolniansky |
| 10,727,955 B2 | 7/2020 | Barzegar et al. |
| 2003/0054814 A1 * | 3/2003 | Karabinis et al. ........ H04Q 7/20 455/427 |
| 2003/0151548 A1 | 8/2003 | Kingsley et al. |
| 2004/0110469 A1 | 6/2004 | Judd et al. |
| 2004/0113756 A1 | 6/2004 | Mollenkopf et al. |
| 2004/0169572 A1 | 9/2004 | Elmore et al. |
| 2004/0218688 A1 | 11/2004 | Santhoff et al. |
| 2005/0017825 A1 | 1/2005 | Hansen |
| 2005/0042989 A1 | 2/2005 | Ho et al. |
| 2005/0085259 A1 | 4/2005 | Conner et al. |
| 2005/0111533 A1 | 5/2005 | Berkman et al. |
| 2005/0258920 A1 | 11/2005 | Elmore et al. |
| 2006/0083269 A1 | 4/2006 | Kang et al. |
| 2007/0229231 A1 | 10/2007 | Hurwitz et al. |
| 2008/0064331 A1 | 3/2008 | Washiro et al. |
| 2008/0125036 A1 | 5/2008 | Konya et al. |
| 2008/0211727 A1 | 9/2008 | Elmore et al. |
| 2008/0252541 A1 | 10/2008 | Diaz et al. |
| 2009/0079660 A1 | 3/2009 | Elmore et al. |
| 2009/0258652 A1 | 10/2009 | Lambert et al. |
| 2010/0225426 A1 | 9/2010 | Unger et al. |
| 2010/0277003 A1 | 11/2010 | Von Novak et al. |
| 2011/0110404 A1 | 5/2011 | Washiro |
| 2011/0132658 A1 | 6/2011 | Miller, II et al. |
| 2011/0136432 A1 | 6/2011 | Miller, II et al. |
| 2011/0140911 A1 | 6/2011 | Pant et al. |
| 2011/0187578 A1 | 8/2011 | Farneth et al. |
| 2011/0215887 A1 | 9/2011 | Kunes |
| 2011/0243255 A1 | 10/2011 | Paoletti |
| 2012/0133373 A1 | 5/2012 | Ali et al. |
| 2012/0306587 A1 | 12/2012 | Strid et al. |
| 2013/0064311 A1 | 3/2013 | Turner et al. |
| 2013/0169499 A1 | 7/2013 | Lin et al. |
| 2014/0155054 A1 | 6/2014 | Henry et al. |
| 2014/0167882 A1 | 6/2014 | Shinoda et al. |
| 2014/0176340 A1 | 6/2014 | Liang et al. |
| 2014/0285277 A1 | 9/2014 | Herbsommer et al. |
| 2015/0126107 A1 | 5/2015 | Bennett et al. |
| 2015/0188584 A1 | 7/2015 | Laurent-Michel |
| 2016/0080839 A1 | 3/2016 | Fuchs et al. |
| 2016/0094879 A1 | 3/2016 | Gerszberg et al. |
| 2016/0112093 A1 | 4/2016 | Barzegar |
| 2016/0149614 A1 | 5/2016 | Barzegar |
| 2016/0164571 A1 | 6/2016 | Bennett et al. |
| 2016/0182096 A1 | 6/2016 | Panioukov et al. |
| 2016/0197642 A1 | 7/2016 | Henry et al. |
| 2016/0315660 A1 | 10/2016 | Henry |
| 2016/0359530 A1 | 12/2016 | Bennett |
| 2016/0359541 A1 | 12/2016 | Bennett |
| 2017/0012667 A1 | 1/2017 | Bennett |
| 2017/0018852 A1 | 1/2017 | Adriazola et al. |
| 2017/0019130 A1 | 1/2017 | Henry et al. |
| 2017/0033953 A1 | 2/2017 | Henry et al. |
| 2017/0079037 A1 | 3/2017 | Gerszberg et al. |
| 2017/0110804 A1 | 4/2017 | Henry et al. |
| 2018/0041270 A1 * | 2/2018 | Buer et al. ............. H04B 7/204 |
| 2018/0048497 A1 | 2/2018 | Henry et al. |
| 2018/0076515 A1 | 3/2018 | Perlman et al. |
| 2018/0077709 A1 | 3/2018 | Gerszberg |
| 2018/0108997 A1 | 4/2018 | Henry et al. |
| 2018/0108998 A1 | 4/2018 | Henry et al. |
| 2018/0115058 A1 | 4/2018 | Henry et al. |
| 2018/0123207 A1 | 5/2018 | Henry et al. |
| 2018/0123208 A1 | 5/2018 | Henry et al. |
| 2018/0123643 A1 | 5/2018 | Henry et al. |
| 2018/0151957 A1 | 5/2018 | Bennett et al. |
| 2018/0159235 A1 | 6/2018 | Wolniansky |
| 2018/0166784 A1 | 6/2018 | Johnson et al. |
| 2018/0166785 A1 | 6/2018 | Henry et al. |
| 2019/0074580 A1 | 3/2019 | Henry et al. |
| 2019/0074864 A1 | 3/2019 | Henry et al. |
| 2019/0074865 A1 | 3/2019 | Henry et al. |
| 2019/0075470 A1 | 3/2019 | Bennett et al. |
| 2019/0104419 A1 | 4/2019 | Barzegar et al. |
| 2019/0104420 A1 | 4/2019 | Barzegar et al. |
| 2019/0123783 A1 | 4/2019 | Henry et al. |
| 2019/0140679 A1 | 5/2019 | Vannucci et al. |
| 2019/0174506 A1 | 6/2019 | Willis, III et al. |
| 2019/0181683 A1 | 6/2019 | Vannucci et al. |
| 2020/0014423 A1 | 1/2020 | Britz |
| 2020/0076088 A1 | 3/2020 | Bennett et al. |
| 2020/0083744 A1 | 3/2020 | Vannucci et al. |
| 2020/0083927 A1 | 3/2020 | Henry et al. |
| 2020/0106477 A1 | 4/2020 | Nanni et al. |
| 2020/0153095 A1 | 5/2020 | Henry et al. |
| 2020/0153096 A1 | 5/2020 | Henry et al. |
| 2020/0161757 A1 | 5/2020 | Henry |
| 2020/0176847 A1 | 6/2020 | Rappaport et al. |
| 2020/0176848 A1 | 6/2020 | Bennett et al. |
| 2020/0176875 A1 | 6/2020 | Johnson |
| 2020/0176879 A1 | 6/2020 | Wolniansky et al. |
| 2020/0176881 A1 | 6/2020 | Britz et al. |
| 2020/0176888 A1 | 6/2020 | Henry et al. |
| 2020/0176890 A1 | 6/2020 | Rappaport et al. |
| 2020/0177234 A1 | 6/2020 | Barzegar et al. |
| 2020/0177237 A1 | 6/2020 | Barzegar et al. |
| 2020/0177238 A1 | 6/2020 | Barzegar et al. |
| 2020/0177239 A1 | 6/2020 | Henry et al. |
| 2020/0194863 A1 | 6/2020 | Bennett et al. |
| 2020/0195302 A1 | 6/2020 | Vannucci et al. |
| 2020/0195303 A1 | 6/2020 | Vannucci et al. |
| 2020/0195304 A1 | 6/2020 | Vannucci et al. |

(56) References Cited

U.S. PATENT DOCUMENTS

FOREIGN PATENT DOCUMENTS

| EP | 1898532 B1 | 12/2018 |
|---|---|---|
| WO | 8605327 A1 | 9/1986 |
| WO | 2013008292 A1 | 1/2013 |
| WO | 2015069431 A2 | 5/2015 |
| WO | 2016171914 A1 | 10/2016 |
| WO | 2018106455 A1 | 6/2018 |
| WO | 2018106915 A1 | 6/2018 |
| WO | 2019050752 A1 | 3/2019 |

OTHER PUBLICATIONS en.wikipedia.org/wiki/Selective_Repeat_ARQ; Aug. 20, 2020; pp. 1-3.

en.wikipedia.org/wiki/Stop-and-wait_ARQ; Aug. 20, 2020; pp. 1-2.

"International Search Report and Written Opinion", PCT/US2018/015634, dated Jun. 25, 2018, 8 pages.

Akalin, Tahsin et al., "Single-Wire Transmission Lines at Terahertz Frequencies", IEEE Transactions on Microwave Theory and Techniques, vol. 54, No. 6, 2006, 2762-2767.

Alam, M. N. et al., "Novel Surface Wave Exciters for Power Line Fault Detection and Communications", Department of Electrical Engineering, University of South Carolina, Antennas and Propagation (APSURSI), 2011 IEEE International Symposium, IEEE, 2011, 1-4.

Barlow, H. M. et al., "Surface Waves", 621.396.11 : 538.566, Paper No. 1482 Radio Section, 1953, pp. 329-341.

Corridor Systems, "A New Approach to Outdoor DAS Network Physical Layer Using E-Line Technology", Mar. 2011, 5 pages.

Elmore, Glenn et al., "A Surface Wave Transmission Line", QEX, May/Jun. 2012, pp. 3-9.

Elmore, Glenn , "Introduction to the Propagating Wave on a Single Conductor", www.corridor.biz, Jul. 27, 2009, 30 pages.

Friedman, M et al., "Low-Loss RF Transport Over Long Distances", IEEE Transactions on Microwave Theory and Techniques, vol. 49, No. 2, Feb. 2001, 8 pages.

Goubau, Georg et al., "Investigation of a Surface-Wave Line for Long Distance Transmission", 1952, 263-267.

Goubau, Georg et al., "Investigations with a Model Surface Wave Transmission Line", IRE Transactions on Antennas and Propagation, 1957, 222-227.

Goubau, Georg, "Open Wire Lines", IRE Transactions on Microwave Theory and Techniques, 1956, 197-200.

Goubau, Georg, "Single-Conductor Surface-Wave Transmission Lines", Proceedings of the I.R.E., 1951, 619-624.

Goubau, Georg, "Surface Waves and Their Application to Transmission Lines", Radio Communication Branch, Coles Signal Laboratory, Mar. 10, 1950, 1119-1128.

Goubau, Georg, "Waves on Interfaces", IRE Transactions on Antennas and Propagation, Dec. 1959, 140-146.

Ren-Bin, Zhong et al., "Surface plasmon wave propagation along single metal wire", Chin. Phys. B, vol. 21, No. 11, May 2, 2012, 9 pages.

Sommerfeld, A, "On the propagation of electrodynamic waves along a wire", Annals of Physics and Chemistry New Edition, vol. 67, No. 2, 1899, 72 pages.

Villaran, Michael et al., "Condition Monitoring of Cables Task 3 Report: Condition Monitoring Techniques for Electric Cables", Brookhaven National Laboratory, Technical Report, Nov. 30, 2009, 89 pages.

Wang, Hao et al., "Dielectric Loaded Substrate Integrated Waveguide (SIW)—Plan Horn Antennas", IEEE Transactions on Antennas and Propagation, IEEE Service Center, Piscataway, NJ, US, vol. 56, No. 3, Mar. 1, 2010, 640-647.

Wang, Kanglin , "Dispersion of Surface Plasmon Polaritons on Metal Wires in the Terahertz Frequency Range", Physical Review Letters, PRL 96, 157401, 2006, 4 pages.

* cited by examiner

100

200

500

E-field Intensity Pattern

Antenna Gain Pattern

1160

1170

1300

METHOD AND APPARATUS FOR AUTOMATICALLY RETRANSMITTING CORRUPTED DATA

FIELD OF THE DISCLOSURE

The subject disclosure relates to a method and apparatus for automatically retransmitting corrupted data.

BACKGROUND

As smart phones and other portable devices increasingly become ubiquitous, and data usage increases, macrocell base station devices and existing wireless infrastructure in turn require higher bandwidth capability in order to address the increased demand. To provide additional mobile bandwidth, small cell deployment is being pursued, with microcells and picocells providing coverage for much smaller areas than traditional macrocells.

In addition, most homes and businesses have grown to rely on broadband data access for services such as voice, video and Internet browsing, etc. Broadband access networks include satellite, 4G or 5G wireless, power line communication, fiber, cable, and telephone networks.

BRIEF DESCRIPTION OF THE DRAWINGS

Reference will now be made to the accompanying drawings, which are not necessarily drawn to scale, and wherein.

DETAILED DESCRIPTION

Figure 1:
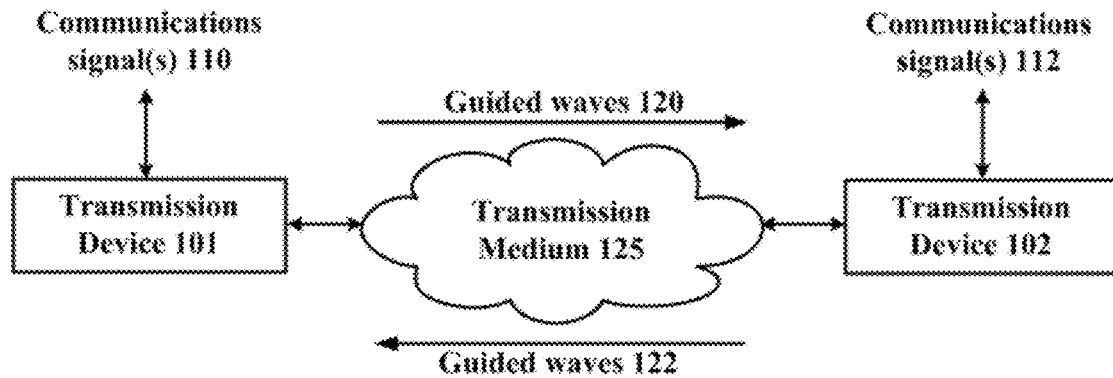
FIG. 1 is a block diagram illustrating an example, non-limiting embodiment of a guided-wave communications system in accordance with various aspects described herein.

One or more embodiments are now described with reference to the drawings, wherein like reference numerals are used to refer to like elements throughout the drawings. In the following description, for purposes of explanation, numerous details are set forth in order to provide a thorough understanding of the various embodiments. It is evident, however, that the various embodiments can be practiced without these details (and without applying to any particular networked environment or standard).

In an embodiment, a guided wave communication system is presented for sending and receiving communication signals such as data or other signaling via guided electromagnetic waves. The guided electromagnetic waves include, for example, surface waves or other electromagnetic waves that are bound to or guided by a transmission medium as described herein. It will be appreciated that a variety of transmission media can be utilized with guided wave communications without departing from example embodiments. Examples of such transmission media can include one or more of the following, either alone or in one or more combinations: wires, whether insulated or not, and whether single-stranded or multi-stranded; conductors of other shapes or configurations including unshielded twisted pair cables including single twisted pairs, Category 5e and other twisted pair cable bundles, other wire bundles, cables, rods, rails, pipes; non-conductors such as dielectric pipes, rods, rails, or other dielectric members; combinations of conductors and dielectric materials such as coaxial cables; or other guided wave transmission media.

The inducement of guided electromagnetic waves that propagate along a transmission medium can be independent of any electrical potential, charge or current that is injected or otherwise transmitted through the transmission medium as part of an electrical circuit. For example, in the case where the transmission medium is a wire, it is to be appreciated that while a small current in the wire may be formed in response to the propagation of the electromagnetic waves guided along the wire, this can be due to the propagation of the electromagnetic wave along the wire surface, and is not formed in response to electrical potential, charge or current that is injected into the wire as part of an electrical circuit. The electromagnetic waves traveling along the wire therefore do not require an electrical circuit (i.e., ground or other electrical return path) to propagate along the wire surface. The wire therefore is a single wire transmission line that is not part of an electrical circuit. For example, electromagnetic waves can propagate along a wire configured as an electrical open circuit. Also, in some embodiments, a wire is not necessary, and the electromagnetic waves can propagate along a single line transmission medium that is not a wire including a single line transmission medium that is conductorless. Accordingly, electromagnetic waves can propagate along a physical transmission medium without requiring an electrical return path More generally, "guided electromagnetic waves" or "guided waves" as described by the subject disclosure are affected by the presence of a physical object that is at least a part of the transmission medium (e.g., a bare wire or other conductor, a dielectric including a dielectric core without a conductive shield and/or without an inner conductor, an insulated wire, a conduit or other hollow element whether conductive or not, a bundle of insulated wires that is coated, covered or surrounded by a dielectric or insulator or other wire bundle, or another form of solid, liquid or otherwise non-gaseous transmission medium) so as to be at least partially bound to or guided by the physical object and so as to propagate along a transmission path of the physical object. Such a physical object can operate as at least a part of a transmission medium that guides, by way of one or more interfaces of the transmission medium (e.g., an outer surface, inner surface, an interior portion between the outer and the inner surfaces or other boundary between elements of the transmission medium). In this fashion, a transmission medium may support multiple transmission paths over different surfaces of the transmission medium. For example, a stranded cable or wire bundle may support electromagnetic waves that are guided by the outer surface of the stranded cable or wire bundle, as well as electromagnetic waves that are guided by inner cable surfaces between two, three or more individual strands or wires within the stranded cable or wire bundle. For example, electromagnetic waves can be guided within interstitial areas of a stranded cable, insulated twisted pair wires, or a wire bundle. The guided electromagnetic waves of the subject disclosure are launched from a sending (transmitting) device and propagate along the transmission medium for reception by at least one receiving device. The propagation of guided electromagnetic waves can carry energy, data and/or other signals along the transmission path from the sending device to the receiving device.

As used herein the term "conductor" (based on a definition of the term "conductor" from *IEEE 100, the Authoritative Dictionary of IEEE Standards Terms, 7$^{th}$ Edition, 2000*) means a substance or body that allows a current of electricity to pass continuously along it. The terms "insulator", "conductorless" or "nonconductor" (based on a definition of the term "insulator" from *IEEE 100, the Authoritative Dictionary of IEEE Standards Terms, 7$^{th}$ Edition, 2000*) means a device or material in which electrons or ions cannot be moved easily. It is possible for an insulator, or a conductorless or nonconductive material to be intermixed intentionally (e.g., doped) or unintentionally into a resulting substance with a small amount of another material having the properties of a conductor. However, the resulting substance may remain substantially resistant to a flow of a continuous electrical current along the resulting substance. Furthermore, a conductorless member such as a dielectric rod or other conductorless core lacks an inner conductor and a conductive shield. As used herein, the term "eddy current" (based on a definition of the term "conductor" from *IEEE 100, the Authoritative Dictionary of IEEE Standards Terms, 7$^{th}$ Edition, 2000*) means a current that circulates in a metallic material as a result of electromotive forces induced by a variation of magnetic flux. Although it may be possible for an insulator, conductorless or nonconductive material in the foregoing embodiments to allow eddy currents that circulate within the doped or intermixed conductor and/or a very small continuous flow of an electrical current along the extent of the insulator, conductorless or nonconductive material, any such continuous flow of electrical current along such an insulator, conductorless or nonconductive material is de minimis compared to the flow of an electrical current along a conductor. Accordingly, in the subject disclosure an insulator, and a conductorless or nonconductor material are not considered to be a conductor. The term "dielectric" means an insulator that can be polarized by an applied electric field. When a dielectric is placed in an electric field, electric charges do not continuously flow through the material as they do in a conductor, but only slightly shift from their average equilibrium positions causing dielectric polarization. The terms "conductorless transmission medium or non-conductor transmission medium" can mean a transmission medium consisting of any material (or combination of materials) that may or may not contain one or more conductive elements but lacks a continuous conductor between the sending and receiving devices along the conductorless transmission medium or non-conductor transmission medium—similar or identical to the aforementioned properties of an insulator, conductorless or nonconductive material.

Unlike free space propagation of wireless signals such as unguided (or unbounded) electromagnetic waves that decrease in intensity inversely by the square of the distance traveled by the unguided electromagnetic waves, guided electromagnetic waves can propagate along a transmission medium with less loss in magnitude per unit distance than experienced by unguided electromagnetic waves.

Unlike electrical signals, guided electromagnetic waves can propagate along different types of transmission media from a sending device to a receiving device without requiring a separate electrical return path between the sending device and the receiving device. As a consequence, guided electromagnetic waves can propagate from a sending device to a receiving device along a conductorless transmission medium including a transmission medium having no conductive components (e.g., a dielectric strip, rod, or pipe), or via a transmission medium having no more than a single conductor (e.g., a single bare wire or insulated wire configured in an open electrical circuit). Even if a transmission medium includes one or more conductive components and the guided electromagnetic waves propagating along the transmission medium generate currents that flow in the one or more conductive components in a direction of the guided electromagnetic waves, such guided electromagnetic waves can propagate along the transmission medium from a sending device to a receiving device without requiring a flow of opposing currents on an electrical return path between the sending device and the receiving device (i.e., in an electrical open circuit configuration).

In a non-limiting illustration, consider electrical systems that transmit and receive electrical signals between sending and receiving devices by way of conductive media. Such systems generally rely on an electrical forward path and an electrical return path. For instance, consider a coaxial cable having a center conductor and a ground shield that are separated by an insulator. Typically, in an electrical system a first terminal of a sending (or receiving) device can be connected to the center conductor, and a second terminal of the sending (or receiving) device can be connected to the ground shield or other second conductor. If the sending device injects an electrical signal in the center conductor via the first terminal, the electrical signal will propagate along the center conductor causing forward currents in the center conductor and return currents in the ground shield or other second conductor. The same conditions apply for a two-terminal receiving device.

In contrast, consider a guided wave communication system such as described in the subject disclosure, which can utilize different embodiments of a transmission medium (including among others a coaxial cable) for transmitting and receiving guided electromagnetic waves without requiring an electrical return path. In one embodiment, for example, the guided wave communication system of the subject disclosure can be configured to induce guided electromagnetic waves that propagate along an outer surface of a coaxial cable. Although the guided electromagnetic waves can cause forward currents on the ground shield, the guided electromagnetic waves do not require return currents on, for example, the center conductor to enable the guided electromagnetic waves to propagate along the outer surface of the coaxial cable. The same can be said of other transmission media used by a guided wave communication system for the transmission and reception of guided electromagnetic waves. For example, guided electromagnetic waves induced by the guided wave communication system on a bare wire, an insulated wire, or a dielectric transmission medium (e.g., a dielectric core with no conductive materials), can propagate along the bare wire, the insulated bare wire, or the dielectric transmission medium without requiring return currents on an electrical return path.

Consequently, electrical systems that require forward and return conductors for carrying corresponding forward and reverse currents on conductors to enable the propagation of electrical signals injected by a sending device are distinct from guided wave systems that induce guided electromagnetic waves on an interface of a transmission medium without requiring an electrical return path to enable the propagation of the guided electromagnetic waves along the interface of the transmission medium. It is also noted that a transmission medium having an electrical return path (e.g., ground) for purposes of conducting currents (e.g., a power line) can be used to contemporaneously propagate electromagnetic waves along the transmission medium. However, the propagation of the electromagnetic waves is not dependent on the electrical currents flowing through the transmission medium. For example, if the electrical currents flowing through the transmission medium stop flowing for any reason (e.g., a power outage), electromagnetic waves propagating along the transmission medium can continue to propagate without interruption.

It is further noted that guided electromagnetic waves as described in the subject disclosure can have an electromagnetic field structure that lies primarily or substantially on an outer surface of a transmission medium so as to be bound to or guided by the outer surface of the transmission medium and so as to propagate non-trivial distances on or along the outer surface of the transmission medium. In other embodiments, guided electromagnetic waves can have an electromagnetic field structure that substantially lies above an outer surface of a transmission medium, but is nonetheless bound to or guided by the transmission medium and so as to propagate non-trivial distances on or along the transmission medium. In other embodiments, guided electromagnetic waves can have an electromagnetic field structure that has a field strength that is de minimis at the outer surface, below the outer surface, and/or in proximity to the outer surface of a transmission medium, but is nonetheless bound to or guided by the transmission medium and so as to propagate non-trivial distances along the transmission medium. In other embodiments, guided electromagnetic waves can have an electromagnetic field structure that lies primarily or substantially below an outer surface of a transmission medium so as to be bound to or guided by an inner material of the transmission medium (e.g., dielectric material) and so as to propagate non-trivial distances within the inner material of the transmission medium. In other embodiments, guided electromagnetic waves can have an electromagnetic field structure that lies within a region that is partially below and partially above an outer surface of a transmission medium so as to be bound to or guided by this region of the transmission medium and so as to propagate non-trivial distances along this region of the transmission medium. It will be appreciated that electromagnetic waves that propagate along a transmission medium or are otherwise guided by a transmission medium (i.e., guided electromagnetic waves) can have an electric field structure such as described in one or more of the foregoing embodiments. The desired electromagnetic field structure in an embodiment may vary based upon a variety of factors, including the desired transmission distance, the characteristics of the transmission medium itself, environmental conditions/characteristics outside of the transmission medium (e.g., presence of rain, fog, atmospheric conditions, etc.), and characteristics of an electromagnetic wave that are configurable by a launcher as will be described below (e.g., configurable wave mode, configurable electromagnetic field structure, configurable polarity, configurable wavelength, configurable bandwidth, and so on).

Various embodiments described herein relate to coupling devices, that can be referred to as "waveguide coupling devices", "waveguide couplers" or more simply as "couplers", "coupling devices" or "launchers" for launching and/or receiving/extracting guided electromagnetic waves to and from a transmission medium, wherein a wavelength of the guided electromagnetic waves can be small compared to one or more dimensions of the coupling device and/or the transmission medium such as the circumference of a wire or other cross sectional dimension. Such electromagnetic waves can operate at millimeter wave frequencies (e.g., 30 to 300 GHz), or lower than microwave frequencies such as 300 MHz to 30 GHz. Electromagnetic waves can be induced to propagate along a transmission medium by a coupling device, such as: a strip, arc or other length of dielectric material; a millimeter wave integrated circuit (MMIC), a horn, monopole, dipole, rod, slot, patch, planar or other antenna; an array of antennas; a magnetic resonant cavity or other resonant coupler; a coil, a strip line, a coaxial waveguide, a hollow waveguide, or other waveguide and/or other coupling device. In operation, the coupling device receives an electromagnetic wave from a transmitter or transmission medium. The electromagnetic field structure of the electromagnetic wave can be carried below an outer surface of the coupling device, substantially on the outer surface of the coupling device, within a hollow cavity of the coupling device, can be radiated from a coupling device or a combination thereof. When the coupling device is in close proximity to a transmission medium, at least a portion of an electromagnetic wave couples to or is bound to the transmission medium and continues to propagate as guided electromagnetic waves along the transmission medium. In a reciprocal fashion, a coupling device can receive or extract at least a portion of the guided electromagnetic waves from a transmission medium and transfer these electromagnetic waves to a receiver. The guided electromagnetic waves launched and/or received by the coupling device propagate along the transmission medium from a sending device to a receiving device without requiring an electrical return path between the sending device and the receiving device. In this circumstance, the transmission medium acts as a waveguide to support the propagation of the guided electromagnetic waves from the sending device to the receiving device.

According to an example embodiment, a surface wave is a type of guided wave that is guided by a surface of a transmission medium, such as an exterior or outer surface or an interior or inner surface including an interstitial surface of the transmission medium such as the interstitial area between wires in a multi-stranded cable, insulated twisted pair wires, or wire bundle, and/or another surface of the transmission medium that is adjacent to or exposed to another type of medium having different properties (e.g., dielectric properties). Indeed, in an example embodiment, a surface of the transmission medium that guides a surface wave can represent a transitional surface between two different types of media. For example, in the case of a bare wire or uninsulated wire, the surface of the wire can be the outer or exterior conductive surface of the bare wire or uninsulated wire that is exposed to air or free space. As another example, in the case of insulated wire, the surface of the wire can be the conductive portion of the wire that meets an inner surface of the insulator portion of the wire. A surface of the transmission medium can be any one of an inner surface of an insulator surface of a wire or a conductive surface of the wire that is separated by a gap composed of, for example, air or free space. A surface of a transmission medium can otherwise be any material region of the transmission medium. For example, the surface of the transmission medium can be an inner portion of an insulator disposed on a conductive portion of the wire that meets the insulator portion of the wire. The surface that guides an electromagnetic wave can depend upon the relative differences in the properties (e.g., dielectric properties) of the insulator, air, and/or the conductor and further dependent on the frequency and propagation mode or modes of the guided wave.

According to an example embodiment, the term "about" a wire or other transmission medium used in conjunction with a guided wave can include fundamental guided wave propagation modes such as a guided wave having a circular or substantially circular field pattern/distribution, a symmetrical electromagnetic field pattern/distribution (e.g., electric field or magnetic field) or other fundamental mode pattern at least partially around a wire or other transmission medium. Unlike Zenneck waves that propagate along a single planar surface of a planar transmission medium, the guided electromagnetic waves of the subject disclosure that are bound to a transmission medium can have electromagnetic field patterns that surround or circumscribe, at least in part, a non-planar surface of the transmission medium with electromagnetic energy in all directions, or in all but a finite number of azimuthal null directions characterized by field strengths that approach zero field strength for infinitesimally small azimuthal widths.

For example, such non-circular field distributions can be unilateral or multi-lateral with one or more axial lobes characterized by relatively higher field strength and/or one or more nulls directions of zero field strength or substantially zero-field strength or null regions characterized by relatively low-field strength, zero-field strength and/or substantially zero-field strength. Further, the field distribution can otherwise vary as a function of azimuthal orientation around a transmission medium such that one or more angular regions around the transmission medium have an electric or magnetic field strength (or combination thereof) that is higher than one or more other angular regions of azimuthal orientation, according to an example embodiment. It will be appreciated that the relative orientations or positions of the guided wave higher order modes, particularly asymmetrical modes, can vary as the guided wave travels along the wire.

In addition, when a guided wave propagates "about" a wire or other type of transmission medium, it can do so according to a guided wave propagation mode that includes not only the fundamental wave propagation modes (e.g., zero order modes), but additionally or alternatively, non-fundamental wave propagation modes such as higher-order guided wave modes (e.g., $1^{st}$ order modes, $2^{nd}$ order modes, etc.). Higher-order modes include symmetrical modes that have a circular or substantially circular electric or magnetic field distribution and/or a symmetrical electric or magnetic field distribution, or asymmetrical modes and/or other guided (e.g., surface) waves that have non-circular and/or asymmetrical field distributions around the wire or other transmission medium. For example, the guided electromagnetic waves of the subject disclosure can propagate along a transmission medium from the sending device to the receiving device or along a coupling device via one or more guided wave modes such as a fundamental transverse magnetic (TM) TM00 mode (or Goubau mode), a fundamental hybrid mode (EH or HE) "EH00" mode or "HE00" mode, a transverse electromagnetic "TEMnm" mode, a total internal reflection (TIR) mode or any other mode such as EHnm, HEnm or TMnm, where n and/or m have integer values greater than or equal to 0, and other fundamental, hybrid and non-fundamental wave modes.

As used herein, the term "guided wave mode" refers to a guided wave propagation mode of a transmission medium, coupling device or other system component of a guided wave communication system that propagates for non-trivial distances along the length of the transmission medium, coupling device or other system component.

As used herein, the term "millimeter-wave" can refer to electromagnetic waves/signals that fall within the "millimeter-wave frequency band" of 30 GHz to 300 GHz. The term "microwave" can refer to electromagnetic waves/signals that fall within a "microwave frequency band" of 300 MHz to 300 GHz. The term "radio frequency" or "RF" can refer to electromagnetic waves/signals that fall within the "radio frequency band" of 10 kHz to 1 THz. It is appreciated that wireless signals, electrical signals, and guided electromagnetic waves as described in the subject disclosure can be configured to operate at any desirable frequency range, such as, for example, at frequencies within, above or below millimeter-wave and/or microwave frequency bands. In particular, when a coupling device or transmission medium includes a conductive element, the frequency of the guided electromagnetic waves that are carried by the coupling device and/or propagate along the transmission medium can be below the mean collision frequency of the electrons in the conductive element. Further, the frequency of the guided electromagnetic waves that are carried by the coupling device and/or propagate along the transmission medium can be a non-optical frequency, e.g., a radio frequency below the range of optical frequencies that begins at 1 THz.

It is further appreciated that a transmission medium as described in the subject disclosure can be configured to be opaque or otherwise resistant to (or at least substantially reduce) a propagation of electromagnetic waves operating at optical frequencies (e.g., greater than 1 THz).

As used herein, the term "antenna" can refer to a device that is part of a transmitting or receiving system to transmit/radiate or receive free space wireless signals.

In accordance with one or more embodiments, a communication system including a full duplex transceiver is configured to transmit and receive electromagnetic wave signals simultaneously over a transmission medium; a processing system including a processor; and a memory that stores executable instructions that, when executed by the processing system, facilitates the performance of operations, including: transmitting, via the full duplex transceiver, electromagnetic wave signals that convey a plurality of data frames, wherein the electromagnetic wave signals propagate along the transmission medium to another transceiver, wherein the electromagnetic wave signals propagate along the transmission medium without requiring an electrical return path; monitoring, via the full duplex transceiver, the transmission medium for an interference; identifying, via the full duplex transceiver, one or more data frames of the plurality of data frames that were transmitted during a period of the interference; and retransmitting, via the full duplex transceiver, the one or more data frames.

In accordance with one or more embodiments, a machine-readable medium, comprising executable instructions that, when executed by a processing system including a processor, facilitate performance of operations, including directing a transceiver to transmit electromagnetic wave signals that convey a plurality of data frames, wherein the electromagnetic wave signals propagate along a transmission medium to another transceiver, wherein the electromagnetic wave signals propagate along the transmission medium without requiring an electrical return path; monitoring the transmission medium for an interference; identifying one or more data frames of the plurality of data frames that were transmitted during a period of the interference; and directing the transceiver to retransmit the one or more data frames.

In accordance with one or more embodiments, a method of detecting, by a processing system including a processor, noise interfering with data transmissions on a transmission medium; identifying, by the processing system, one or more data frames that were transmitted during a period of the noise; and directing, by the processing system, a transceiver to retransmit the one or more data frames conveyed by electromagnetic wave signals, wherein the electromagnetic wave signals propagate along the transmission medium to another transceiver, wherein the electromagnetic wave signals propagate along the transmission medium without requiring an electrical return path.

Referring now to FIG. 1, a block diagram 100 illustrating an example, non-limiting embodiment of a guided wave communications system is shown. In operation, a transmission device 101 receives one or more communication signals 110 from a communication network or other communications device that includes data and generates guided waves 120 to convey the data via the transmission medium 125 to the transmission device 102. The transmission device 102 receives the guided waves 120 and converts them to communication signals 112 that include the data for transmission to a communications network or other communications device. The guided waves 120 can be modulated to convey data via a modulation technique such as phase shift keying, frequency shift keying, quadrature amplitude modulation, amplitude modulation, multi-carrier modulation such as orthogonal frequency division multiplexing and via multiple access techniques such as frequency division multiplexing, time division multiplexing, code division multiplexing, multiplexing via differing wave propagation modes and via other modulation and access strategies.

The communication network or networks can include a wireless communication network such as a mobile data network, a cellular voice and data network, a wireless local area network (e.g., Wi-Fi or an IEEE 802.xx network), a satellite communications network, a personal area network or other wireless network. The communication network or networks can also include a wired communication network such as a telephone network, an Ethernet network, a local area network, a wide area network such as the Internet, a broadband access network, a cable network, a fiber optic network, or other wired network. The communication devices can include a network edge device, bridge device or home gateway, a set-top box, broadband modem, telephone adapter, access point, base station, or other fixed communication device, a mobile communication device such as an automotive gateway or automobile, laptop computer, tablet, smartphone, cellular telephone, or other communication device.

In an example embodiment, the guided wave communication system 100 can operate in a bi-directional fashion where transmission device 102 receives one or more communication signals 112 from a communication network or device that includes other data and generates guided waves 122 to convey the other data via the transmission medium 125 to the transmission device 101. In this mode of operation, the transmission device 101 receives the guided waves 122 and converts them to communication signals 110 that include the other data for transmission to a communications network or device. The guided waves 122 can be modulated to convey data via a modulation technique such as phase shift keying, frequency shift keying, quadrature amplitude modulation, amplitude modulation, multi-carrier modulation such as orthogonal frequency division multiplexing and via multiple access techniques such as frequency division multiplexing, time division multiplexing, code division multiplexing, multiplexing via differing wave propagation modes and via other modulation and access strategies.

The transmission medium 125 can include a cable having at least one inner portion surrounded by a dielectric material such as an insulator or other dielectric cover, coating or other dielectric material, the dielectric material having an outer surface and a corresponding circumference. In an example embodiment, the transmission medium 125 operates as a single-wire transmission line to guide the transmission of an electromagnetic wave. When the transmission medium 125 is implemented as a single wire transmission system, it can include a wire. The wire can be insulated or uninsulated, and single-stranded or multi-stranded (e.g., braided). In other embodiments, the transmission medium 125 can contain conductors of other shapes or configurations including wire bundles, cables, rods, rails, pipes. In addition, the transmission medium 125 can include non-conductors such as dielectric pipes, rods, rails, or other dielectric members; combinations of conductors and dielectric materials, conductors without dielectric materials or other guided wave transmission media and/or consist essentially of non-conductors such as dielectric pipes, rods, rails, or other dielectric members that operate without a continuous conductor such as an inner conductor or a conductive shield. It should be noted that the transmission medium 125 can otherwise include any of the transmission media previously discussed.

Further, as previously discussed, the guided waves 120 and 122 can be contrasted with radio transmissions over free space/air or conventional propagation of electrical power or signals through the conductor of a wire via an electrical circuit. In addition to the propagation of guided waves 120 and 122, the transmission medium 125 may optionally contain one or more wires that propagate electrical power or other communication signals in a conventional manner as a part of one or more electrical circuits.

Figure 2:
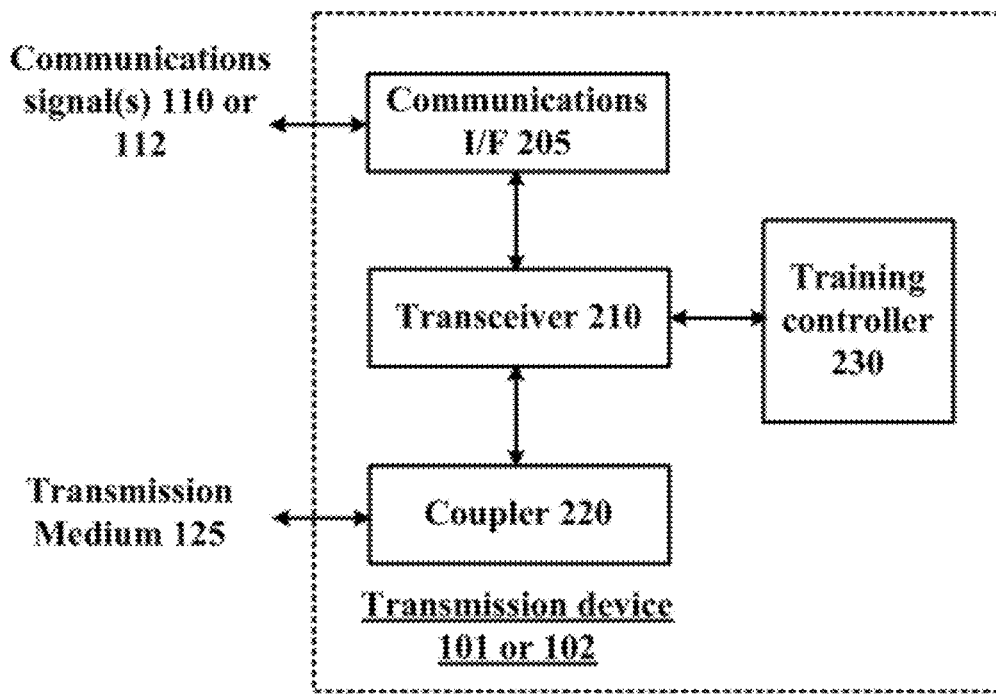
FIG. 2 is a block diagram illustrating an example, non-limiting embodiment of a transmission device in accordance with various aspects described herein.

Referring now to FIG. 2, a block diagram 200 illustrating an example, non-limiting embodiment of a transmission device is shown. The transmission device 101 or 102 includes a communications interface (I/F) 205, a transceiver 210 and a coupler 220.

In an example of operation, the communications interface 205 receives a communication signal 110 or 112 that includes data. In various embodiments, the communications interface 205 can include a wireless interface for receiving a wireless communication signal in accordance with a wireless standard protocol such as LTE or other cellular voice and data protocol, Wi-Fi or an 802.11 protocol, WIMAX protocol, Ultra Wideband protocol, Bluetooth® protocol, Zigbee® protocol, a direct broadcast satellite (DBS) or other satellite communication protocol or other wireless protocol. In addition or in the alternative, the communications interface 205 includes a wired interface that operates in accordance with an Ethernet protocol, universal serial bus (USB) protocol, a data over cable service interface specification (DOCSIS) protocol, a digital subscriber line (DSL) protocol, a Firewire (IEEE 1394) protocol, or other wired protocol. In additional to standards-based protocols, the communications interface 205 can operate in conjunction with other wired or wireless protocol. In addition, the communications interface 205 can optionally operate in conjunction with a protocol stack that includes multiple protocol layers including a MAC protocol, transport protocol, application protocol, etc.

In an example of operation, the transceiver 210 generates an electromagnetic wave based on the communication signal 110 or 112 to convey the data. The electromagnetic wave has at least one carrier frequency and at least one corresponding wavelength. The carrier frequency can be within a millimeter-wave frequency band of 30 GHz-300 GHz, such as 60 GHz or a carrier frequency in the range of 30-40 GHz or a lower frequency band of 300 MHz-30 GHz in the microwave frequency range such as 26-30 GHz, 11 GHz, or 3-6 GHz, but it will be appreciated that other carrier frequencies are possible in other embodiments. In one mode of operation, the transceiver 210 merely upconverts the communications signal or signals 110 or 112 for transmission of the electromagnetic signal in the microwave or millimeter-wave band as a guided electromagnetic wave that is guided by or bound to the transmission medium 125. In another mode of operation, the communications interface 205 either converts the communication signal 110 or 112 to a baseband or near baseband signal or extracts the data from the communication signal 110 or 112 and the transceiver 210 modulates a high-frequency carrier with the data, the baseband or near baseband signal for transmission. It should be appreciated that the transceiver 210 can modulate the data received via the communication signal 110 or 112 to preserve one or more data communication protocols of the communication signal 110 or 112 either by encapsulation in the payload of a different protocol or by simple frequency shifting. In the alternative, the transceiver 210 can otherwise translate the data received via the communication signal 110 or 112 to a protocol that is different from the data communication protocol or protocols of the communication signal 110 or 112.

In an example of operation, the coupler 220 couples the electromagnetic wave to the transmission medium 125 as a guided electromagnetic wave to convey the communications signal or signals 110 or 112. While the prior description has focused on the operation of the transceiver 210 as a transmitter, the transceiver 210 can also operate to receive electromagnetic waves that convey other data from the single wire transmission medium via the coupler 220 and to generate communications signals 110 or 112, via communications interface 205 that includes the other data. Consider embodiments where an additional guided electromagnetic wave conveys other data that also propagates along the transmission medium 125. The coupler 220 can also couple this additional electromagnetic wave from the transmission medium 125 to the transceiver 210 for reception.

The transmission device 101 or 102 includes an optional training controller 230. In an example embodiment, the training controller 230 is implemented by a standalone processor or a processor that is shared with one or more other components of the transmission device 101 or 102. The training controller 230 selects the carrier frequencies, modulation schemes and/or guided wave modes for the guided electromagnetic waves based on testing of the transmission medium 125, environmental conditions and/or feedback data received by the transceiver 210 from at least one remote transmission device coupled to receive the guided electromagnetic wave.

In an example embodiment, a guided electromagnetic wave transmitted by a remote transmission device 101 or 102 conveys data that also propagates along the transmission medium 125. The data from the remote transmission device 101 or 102 can be generated to include the feedback data. In operation, the coupler 220 also couples the guided electromagnetic wave from the transmission medium 125 and the transceiver receives the electromagnetic wave and processes the electromagnetic wave to extract the feedback data.

In an example embodiment, the training controller 230 operates based on the feedback data to evaluate a plurality of candidate frequencies, modulation schemes and/or transmission modes to select a carrier frequency, modulation scheme and/or transmission mode to enhance performance, such as throughput, signal strength, reduce propagation loss, etc.

Consider the following example: a transmission device 101 begins operation under control of the training controller 230 by sending a plurality of guided waves as test signals such as pilot waves or other test signals at a corresponding plurality of candidate frequencies and/or candidate modes directed to a remote transmission device 102 coupled to the transmission medium 125. The guided waves can include, in addition or in the alternative, test data. The test data can indicate the particular candidate frequency and/or guidewave mode of the signal. In an embodiment, the training controller 230 at the remote transmission device 102 receives the test signals and/or test data from any of the guided waves that were properly received and determines the best candidate frequency and/or guided wave mode, a set of acceptable candidate frequencies and/or guided wave modes, or a rank ordering of candidate frequencies and/or guided wave modes. This selection of candidate frequenc(ies) or/and guided-mode(s) are generated by the training controller 230 based on one or more optimizing criteria such as received signal strength, bit error rate, frame error rate, signal to noise ratio, propagation loss, etc. The training controller 230 generates feedback data that indicates the selection of candidate frequenc(ies) or/and guided wave mode(s) and sends the feedback data to the transceiver 210 for transmission to the transmission device 101. The transmission device 101 and 102 can then communicate data with one another based on the selection of candidate frequenc(ies) or/and guided wave mode(s).

In other embodiments, the guided electromagnetic waves that contain the test signals and/or test data are reflected back, repeated back or otherwise looped back by the remote transmission device 102 to the transmission device 101 for reception and analysis by the training controller 230 of the transmission device 101 that initiated these waves. For example, the transmission device 101 can send a signal to the remote transmission device 102 to initiate a test mode where a physical reflector is switched on the line, a termination impedance is changed to cause reflections, a loop back mode is switched on to couple electromagnetic waves back to the source transmission device 102, and/or a repeater mode is enabled to amplify and retransmit the electromagnetic waves back to the source transmission device 102. The training controller 230 at the source transmission device 102 receives the test signals and/or test data from any of the guided waves that were properly received and determines selection of candidate frequenc(ies) or/and guided wave mode(s).

While the procedure above has been described in a start-up or initialization mode of operation, each transmission device 101 or 102 can send test signals, evaluate candidate frequencies or guided wave modes via non-test conditions such as normal transmissions or otherwise evaluate candidate frequencies or guided wave modes at other times or continuously as well. In an example embodiment, the communication protocol between the transmission devices 101 and 102 can include an on-request or periodic test mode where either full testing or more limited testing of a subset of candidate frequencies and guided wave modes are tested and evaluated. In other modes of operation, the re-entry into such a test mode can be triggered by a degradation of performance due to a disturbance, weather conditions, etc. In an example embodiment, the receiver bandwidth of the transceiver 210 is either sufficiently wide or swept to receive all candidate frequencies or can be selectively adjusted by the training controller 230 to a training mode where the receiver bandwidth of the transceiver 210 is sufficiently wide or swept to receive all candidate frequencies.

In one embodiment, an electromagnetic field distribution can correspond to a modal "sweet spot" that enhances guided electromagnetic wave propagation along an insulated transmission medium and reduces end-to-end transmission loss. In this particular mode, electromagnetic waves are guided by the transmission medium 125 to propagate along an outer surface of the transmission medium, such as an outer surface of an insulating jacket. For instance, electromagnetic waves can be partially embedded in the insulator and partially radiating on the outer surface of the insulator. In this fashion, electromagnetic waves are "lightly" coupled to the insulator so as to enable electromagnetic wave propagation at long distances with low propagation loss.

In one example, a 38 GHz electromagnetic wave can be guided by a wire with a diameter of 1.1 cm and a dielectric insulation of thickness of 0.36 cm. Because the electromagnetic wave is guided by the transmission medium 125 and the majority of the field strength is concentrated in the air outside of the insulating jacket within a limited distance of the outer surface, the guided wave can propagate longitudinally down the transmission medium 125 with very low loss. In this example, this "limited distance" corresponds to a distance from the outer surface that is less than half the largest cross-sectional dimension of the transmission medium 125. In this case, the largest cross-sectional dimension of the wire can correspond to the overall diameter of 1.82 cm, however, this value can vary with the size and shape of the transmission medium 125. For example, should the transmission medium 125 be of a rectangular shape with a height of 0.3 cm and a width of 0.4 cm, the largest cross-sectional dimension would be the diagonal of 0.5 cm and the corresponding limited distance would be 0.25 cm. The dimensions of the area containing the majority of the field strength also vary with the frequency, and in general, increase as carrier frequencies decrease.

It should also be noted that the components of a guided wave communication system, such as couplers and transmission media can have their own cut-off frequencies for each guided wave mode. The cut-off frequency generally sets forth the lowest frequency that a particular guided wave mode is designed to be supported by that particular component. In an example embodiment, the particular non-circular and non-fundamental mode of propagation shown is induced on the transmission medium 125 by an electromagnetic wave having a frequency that falls within a limited range (such as Fc to 2Fc) of the cut-off frequency Fc for this particular non-fundamental mode. The cut-off frequency Fc is particular to the characteristics of transmission medium 125. For embodiments as shown that include an inner conductor surrounded by an insulating jacket, this cutoff frequency can vary based on the dimensions and properties of the insulating jacket and potentially the dimensions and properties of the inner conductor and can be determined experimentally to have a desired mode pattern. It should be noted however, that similar effects can be found for a hollow dielectric or insulator without an inner conductor or conductive shield. In this case, the cutoff frequency can vary based on the dimensions and properties of the hollow dielectric or insulator.

At frequencies lower than the cut-off frequency, the non-circular mode is difficult to induce in the transmission medium 125 and fails to propagate for all but trivial distances. As the frequency increases above the limited range of frequencies about the cut-off frequency, the non-circular mode shifts more and more inward of an insulating jacket. At frequencies much larger than the cut-off frequency, the field strength is no longer concentrated outside of the insulating jacket, but primarily inside of the insulating jacket. While the transmission medium 125 provides strong guidance to the electromagnetic wave and propagation is still possible, ranges are more limited by increased losses due to propagation within the insulating jacket—as opposed to the surrounding air.

In another example, a 60 GHz wave can be guided by a wire with a diameter of 1.1 cm and a dielectric insulation of thickness of 0.36 cm. Because the frequency of the guided wave is above the limited range of the cut-off frequency of this particular non-fundamental mode, much of the field strength has shifted inward of the insulating jacket. In particular, the field strength is concentrated primarily inside of the insulating jacket.

Figure 3:
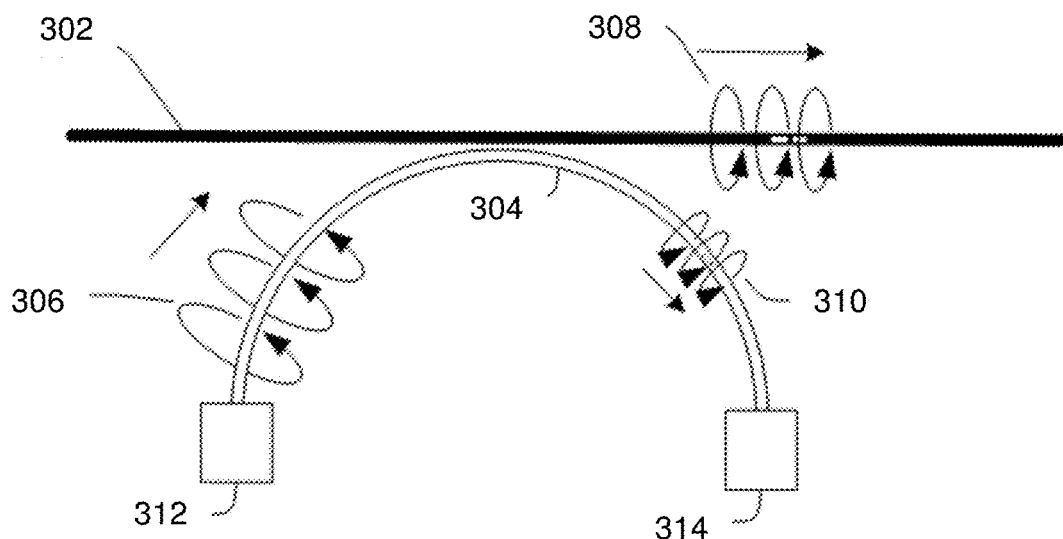
FIG. 3 is a block diagram illustrating an example, non-limiting embodiment of an arc coupler in accordance with various aspects described herein.

Referring now to FIG. 3, a block diagram 300 illustrating an example, non-limiting embodiment of an arc coupler is shown. In particular a coupling device is presented for use in a transmission device, such as transmission device 101 or 102 presented in conjunction with FIG. 1. The coupling device includes an arc coupler 304 coupled to a transmitter circuit 312 and termination or damper 314. The arc coupler 304 can be made of a dielectric material, or other low-loss insulator (e.g., Teflon, polyethylene, etc.), or made of a conducting (e.g., metallic, non-metallic, etc.) material, or any combination of the foregoing materials. As shown, the arc coupler 304 operates as a waveguide and has a wave 306 propagating as a guided wave, within and about a waveguide surface of the arc coupler 304. In the embodiment shown, at least a portion of the arc coupler 304 can be placed near a wire 302 or other transmission medium, (such as transmission medium 125), in order to facilitate coupling between the arc coupler 304 and the wire 302 or other transmission medium, as described herein to launch the guided wave 308 on the wire. The arc coupler 304 can be placed such that a portion of the curved arc coupler 304 is tangential to, and parallel or substantially parallel to the wire 302. The portion of the arc coupler 304 that is parallel to the wire can be an apex of the curve, or any point where a tangent of the curve is parallel to the wire 302. When the arc coupler 304 is positioned or placed thusly, the wave 306 travelling along the arc coupler 304 couples, at least in part, to the wire 302, and propagates as guided wave 308 around or about the wire surface of the wire 302 and longitudinally along the wire 302. The guided wave 308 can be characterized as a surface wave or other electromagnetic wave that is guided by or bound to the wire 302 or other transmission medium.

A portion of the wave 306 that does not couple to the wire 302 propagates as a wave 310 along the arc coupler 304. It will be appreciated that the arc coupler 304 can be configured and arranged in a variety of positions in relation to the wire 302 to achieve a desired level of coupling or non-coupling of the wave 306 to the wire 302. For example, the curvature and/or length of the arc coupler 304 that is parallel or substantially parallel, as well as its separation distance (which can include zero separation distance in an embodiment), to the wire 302 can be varied without departing from example embodiments. Likewise, the arrangement of arc coupler 304 in relation to the wire 302 may be varied based upon considerations of the respective intrinsic characteristics (e.g., thickness, composition, electromagnetic properties, etc.) of the wire 302 and the arc coupler 304, as well as the characteristics (e.g., frequency, energy level, etc.) of the waves 306 and 308.

The guided wave 308 stays parallel or substantially parallel to the wire 302, even as the wire 302 bends and flexes. Bends in the wire 302 can increase transmission losses, which are also dependent on wire diameters, frequency, and materials. If the dimensions of the arc coupler 304 are chosen for efficient power transfer, most of the power in the wave 306 is transferred to the wire 302, with little power remaining in wave 310. It will be appreciated that the guided wave 308 can still be multi-modal in nature (discussed herein), including having modes that are non-circular, non-fundamental and/or asymmetric, while traveling along a path that is parallel or substantially parallel to the wire 302, with or without a fundamental transmission mode. In an embodiment, non-circular, non-fundamental and/or asymmetric modes can be utilized to minimize transmission losses and/or obtain increased propagation distances.

It is noted that the term "parallel" is generally a geometric construct which often is not exactly achievable in real systems. Accordingly, the term "parallel" as utilized in the subject disclosure represents an approximation rather than an exact configuration when used to describe embodiments disclosed in the subject disclosure. In an embodiment, "substantially parallel" can include approximations that are within 30 degrees of true parallel in all dimensions.

In an embodiment, the wave 306 can exhibit one or more wave propagation modes. The arc coupler modes can be dependent on the shape and/or design of the coupler 304. The one or more arc coupler modes of wave 306 can generate, influence, or impact one or more wave propagation modes of the guided wave 308 propagating along wire 302. It should be particularly noted however that the guided wave modes present in the guided wave 306 may be the same as or different from the guided wave modes of the guided wave 308. In this fashion, one or more guided wave modes of the guided wave 306 may not be transferred to the guided wave 308, and further one or more guided wave modes of guided wave 708 may not have been present in guided wave 306. It should also be noted that the cut-off frequency of the arc coupler 304 for a particular guided wave mode may be different than the cutoff frequency of the wire 302 or other transmission medium for that same mode. For example, while the wire 302 or other transmission medium may be operated slightly above its cutoff frequency for a particular guided wave mode, the arc coupler 304 may be operated well above its cut-off frequency for that same mode for low loss, slightly below its cut-off frequency for that same mode to, for example, induce greater coupling and power transfer, or some other point in relation to the arc coupler's cutoff frequency for that mode.

In an embodiment, the wave propagation modes on the wire 302 can be similar to the arc coupler modes since both waves 306 and 308 propagate about the outside of the arc coupler 304 and wire 302, respectively. In some embodiments, as the wave 306 couples to the wire 302, the modes can change form, or new modes can be created or generated, due to the coupling between the arc coupler 304 and the wire 302. For example, differences in size, material, and/or impedances of the arc coupler 304 and wire 302 may create additional modes do not present in the arc coupler modes and/or suppress some of the arc coupler modes. The wave propagation modes can comprise the fundamental transverse magnetic mode ($TM_{00}$), where only small magnetic fields extend in the direction of propagation, and the electric field extends radially outwards and then longitudinally while the guided wave propagates along the wire. This guided wave mode can be donut shaped, where only a portion of the electromagnetic fields exist within the arc coupler 304 or wire 302.

While the waves 306 and 308 can comprise a fundamental TM mode, the waves 306 and 308, also or in the alternative, can comprise non-fundamental TM modes. While particular wave propagation modes are discussed above, other wave propagation modes in or along the coupler and/or along the wire are likewise possible such as transverse electric (TE) and hybrid (EH or HE) modes, based on the frequencies employed, the design of the arc coupler 304, the dimensions and composition of the wire 302, as well as its surface characteristics, its insulation if present, the electromagnetic properties of the surrounding environment, etc. It should be noted that, depending on the frequency, the electrical and physical characteristics of the wire 302 and the particular wave propagation modes that are generated, guided wave 308 can travel along the conductive surface of an oxidized uninsulated wire, an unoxidized uninsulated wire, an insulated wire and/or along the insulating surface of an insulated wire.

In an embodiment, a diameter of the arc coupler 304 is smaller than the diameter of the wire 302. For the millimeter-band wavelength being used, the arc coupler 304 supports a single waveguide mode that makes up wave 306. This single waveguide mode can change as it couples to the wire 302 as guided wave 308. If the arc coupler 304 were larger, more than one waveguide mode can be supported, but these additional waveguide modes may not couple to the wire 302 as efficiently, and higher coupling losses can result. However, in some alternative embodiments, the diameter of the arc coupler 304 can be equal to or larger than the diameter of the wire 302, for example, where higher coupling losses are desirable or when used in conjunction with other techniques to otherwise reduce coupling losses (e.g., impedance matching with tapering, etc.).

In an embodiment, the wavelength of the waves 306 and 308 are comparable in size, or smaller than a circumference of the arc coupler 304 and the wire 302. In an example, if the wire 302 has a diameter of 0.5 cm, and a corresponding circumference of around 1.5 cm, the wavelength of the transmission is around 1.5 cm or less, corresponding to a frequency of 70 GHz or greater. In another embodiment, a suitable frequency of the transmission and the carrier-wave signal is in the range of 30-100 GHz, perhaps around 30-60 GHz, and around 38 GHz in one example. In an embodiment, when the circumference of the arc coupler 304 and wire 302 is comparable in size to, or greater than a wavelength of the transmission, the waves 306 and 308 can exhibit multiple wave propagation modes including fundamental and/or non-fundamental (symmetric and/or asymmetric, circular and/or non-circular) modes that propagate over sufficient distances to support various communication systems described herein. The waves 306 and 308 can therefore comprise more than one type of electric and magnetic field configuration. In an embodiment, as the guided wave 308 propagates down the wire 302, the electrical and magnetic field configurations will remain the same from end to end of the wire 302. In other embodiments, as the guided wave 308 encounters interference (distortion or obstructions) or loses energy due to transmission losses or scattering, the electric and magnetic field configurations can change as the guided wave 308 propagates down wire 302.

In an embodiment, the arc coupler 304 can be composed of nylon, Teflon, polyethylene, a polyamide, or other plastics. In other embodiments, other dielectric materials can be employed. The wire surface of wire 302 can be metallic with either a bare metallic surface, or can be insulated using plastic, dielectric, insulator or other coating, jacket or sheathing. In an embodiment, a dielectric or otherwise non-conducting/insulated waveguide can be paired with either a bare/metallic wire or insulated wire. In other embodiments, a metallic and/or conductive waveguide can be paired with a bare/metallic wire or insulated wire. In an embodiment, an oxidation layer on the bare metallic surface of the wire 302 (e.g., resulting from exposure of the bare metallic surface to oxygen/air) can also provide insulating or dielectric properties similar to those provided by some insulators or sheathings.

It is noted that the graphical representations of waves 306, 308 and 310 are presented merely to illustrate the principles that wave 306 induces or otherwise launches a guided wave 308 on a wire 302 that operates, for example, as a single wire transmission line. Wave 310 represents the portion of wave 306 that remains on the arc coupler 304 after the generation of guided wave 308. The actual electric and magnetic fields generated as a result of such wave propagation may vary depending on the frequencies employed, the particular wave propagation mode or modes, the design of the arc coupler 304, the dimensions and composition of the wire 302, as well as its surface characteristics, its optional insulation, the electromagnetic properties of the surrounding environment, etc.

It is noted that arc coupler 304 can include a termination circuit or damper 314 at the end of the arc coupler 304 that can absorb leftover radiation or energy from wave 310. The termination circuit or damper 314 can prevent and/or minimize the leftover radiation or energy from wave 310 reflecting back toward transmitter circuit 312. In an embodiment, the termination circuit or damper 314 can include termination resistors, absorbing materials and/or other components that perform impedance matching to attenuate reflection. In some embodiments, if the coupling efficiencies are high enough, and/or wave 310 is sufficiently small, it may not be necessary to use a termination circuit or damper 314. For the sake of simplicity, these transmitter 312 and termination circuits or dampers 314 may not be depicted in the other figures, but in those embodiments, transmitter and termination circuits or dampers may possibly be used.

Further, while a single arc coupler 304 is presented that generates a single guided wave 308, multiple arc couplers 304 placed at different points along the wire 302 and/or at different azimuthal orientations about the wire can be employed to generate and receive multiple guided waves 308 at the same or different frequencies, at the same or different phases, at the same or different wave propagation modes.

Figure 4:
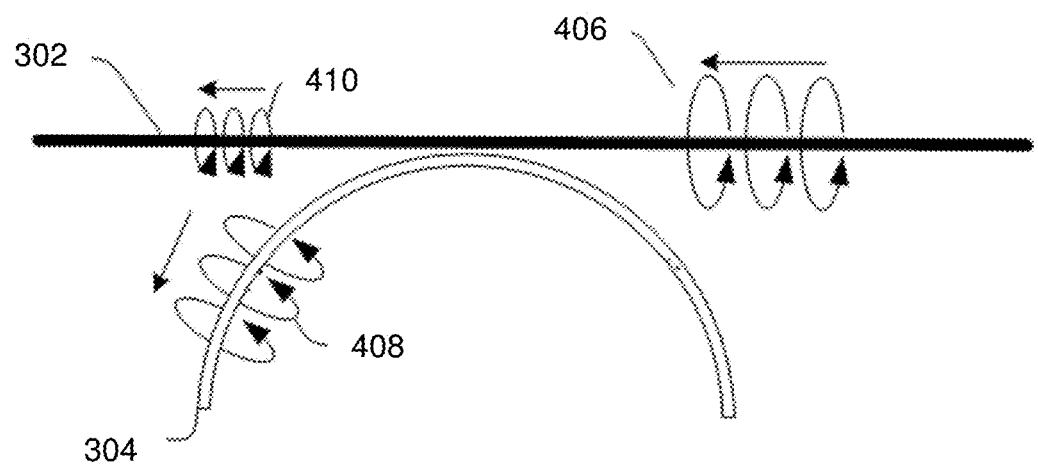
FIG. 4 is a block diagram illustrating an example, non-limiting embodiment of an arc coupler in accordance with various aspects described herein.

FIG. 4, a block diagram 400 illustrating an example, non-limiting embodiment of an arc coupler is shown. In the embodiment shown, at least a portion of the coupler 304 can be placed near a wire 302 or other transmission medium, (such as transmission medium 125), in order to facilitate coupling between the arc coupler 304 and the wire 302 or other transmission medium, to extract a portion of the guided wave 406 as a guided wave 408 as described herein. The arc coupler 304 can be placed such that a portion of the curved arc coupler 304 is tangential to, and parallel or substantially parallel to the wire 302. The portion of the arc coupler 304 that is parallel to the wire can be an apex of the curve, or any point where a tangent of the curve is parallel to the wire 302. When the arc coupler 304 is positioned or placed thusly, the wave 406 travelling along the wire 302 couples, at least in part, to the arc coupler 304, and propagates as guided wave 408 along the arc coupler 304 to a receiving device (not expressly shown). A portion of the wave 406 that does not couple to the arc coupler propagates as wave 410 along the wire 302 or other transmission medium.

In an embodiment, the wave 406 can exhibit one or more wave propagation modes. The arc coupler modes can be dependent on the shape and/or design of the coupler 304. The one or more modes of guided wave 406 can generate, influence, or impact one or more guide-wave modes of the guided wave 408 propagating along the arc coupler 304. It should be particularly noted however that the guided wave modes present in the guided wave 406 may be the same or different from the guided wave modes of the guided wave 408. In this fashion, one or more guided wave modes of the guided wave 406 may not be transferred to the guided wave 408, and further one or more guided wave modes of guided wave 408 may not have been present in guided wave 406.

Figure 5:
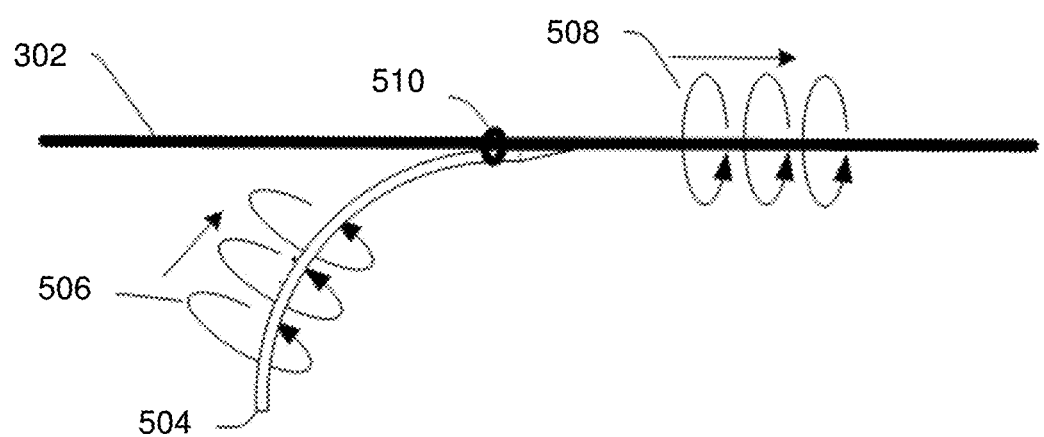
FIG. 5 is a block diagram illustrating an example, non-limiting embodiment of a stub coupler in accordance with various aspects described herein.

Referring now to FIG. 5, a block diagram 500 illustrating an example, non-limiting embodiment of a stub coupler is shown. In particular a coupling device that includes stub coupler 504 is presented for use in a transmission device, such as transmission device 101 or 102 presented in conjunction with FIG. 1. The stub coupler 504 can be made of a dielectric material, or other low-loss insulator (e.g., Teflon, polyethylene and etc.), or made of a conducting (e.g., metallic, non-metallic, etc.) material, or any combination of the foregoing materials. As shown, the stub coupler 504 operates as a waveguide and has a wave 506 propagating as a guided wave within and about a waveguide surface of the stub coupler 504. In the embodiment shown, at least a portion of the stub coupler 504 can be placed near a wire 302 or other transmission medium, (such as transmission medium 125), in order to facilitate coupling between the stub coupler 504 and the wire 302 or other transmission medium, as described herein to launch the guided wave 508 on the wire.

In an embodiment, the stub coupler 504 is curved, and an end of the stub coupler 504 can be tied, fastened, or otherwise mechanically coupled to a wire 302. When the end of the stub coupler 504 is fastened to the wire 302, the end of the stub coupler 504 is parallel or substantially parallel to the wire 302. Alternatively, another portion of the dielectric waveguide beyond an end can be fastened or coupled to wire 302 such that the fastened or coupled portion is parallel or substantially parallel to the wire 302. The fastener 510 can be a nylon cable tie or other type of non-conducting/ dielectric material that is either separate from the stub coupler 504 or constructed as an integrated component of the stub coupler 504. The stub coupler 504 can be adjacent to the wire 302 without surrounding the wire 302.

Like the arc coupler 304 described in conjunction with FIG. 3, when the stub coupler 504 is placed with the end parallel to the wire 302, the guided wave 506 travelling along the stub coupler 504 couples to the wire 302, and propagates as guided wave 508 about the wire surface of the wire 302. In an example embodiment, the guided wave 508 can be characterized as a surface wave or other electromagnetic wave.

It is noted that the graphical representations of waves 506 and 508 are presented merely to illustrate the principles that wave 506 induces or otherwise launches a guided wave 508 on a wire 302 that operates, for example, as a single wire transmission line. The actual electric and magnetic fields generated as a result of such wave propagation may vary depending on one or more of the shape and/or design of the coupler, the relative position of the dielectric waveguide to the wire, the frequencies employed, the design of the stub coupler 504, the dimensions and composition of the wire 302, as well as its surface characteristics, its optional insulation, the electromagnetic properties of the surrounding environment, etc.

In an embodiment, an end of stub coupler 504 can taper towards the wire 302 in order to increase coupling efficiencies. Indeed, the tapering of the end of the stub coupler 504 can provide impedance matching to the wire 302 and reduce reflections, according to an example embodiment of the subject disclosure. For example, an end of the stub coupler 504 can be gradually tapered in order to obtain a desired level of coupling between waves 506 and 508 as illustrated in FIG. 5.

In an embodiment, the fastener 510 can be placed such that there is a short length of the stub coupler 504 between the fastener 510 and an end of the stub coupler 504. Maximum coupling efficiencies are realized in this embodiment when the length of the end of the stub coupler 504 that is beyond the fastener 510 is at least several wavelengths long for whatever frequency is being transmitted.

Figure 6:
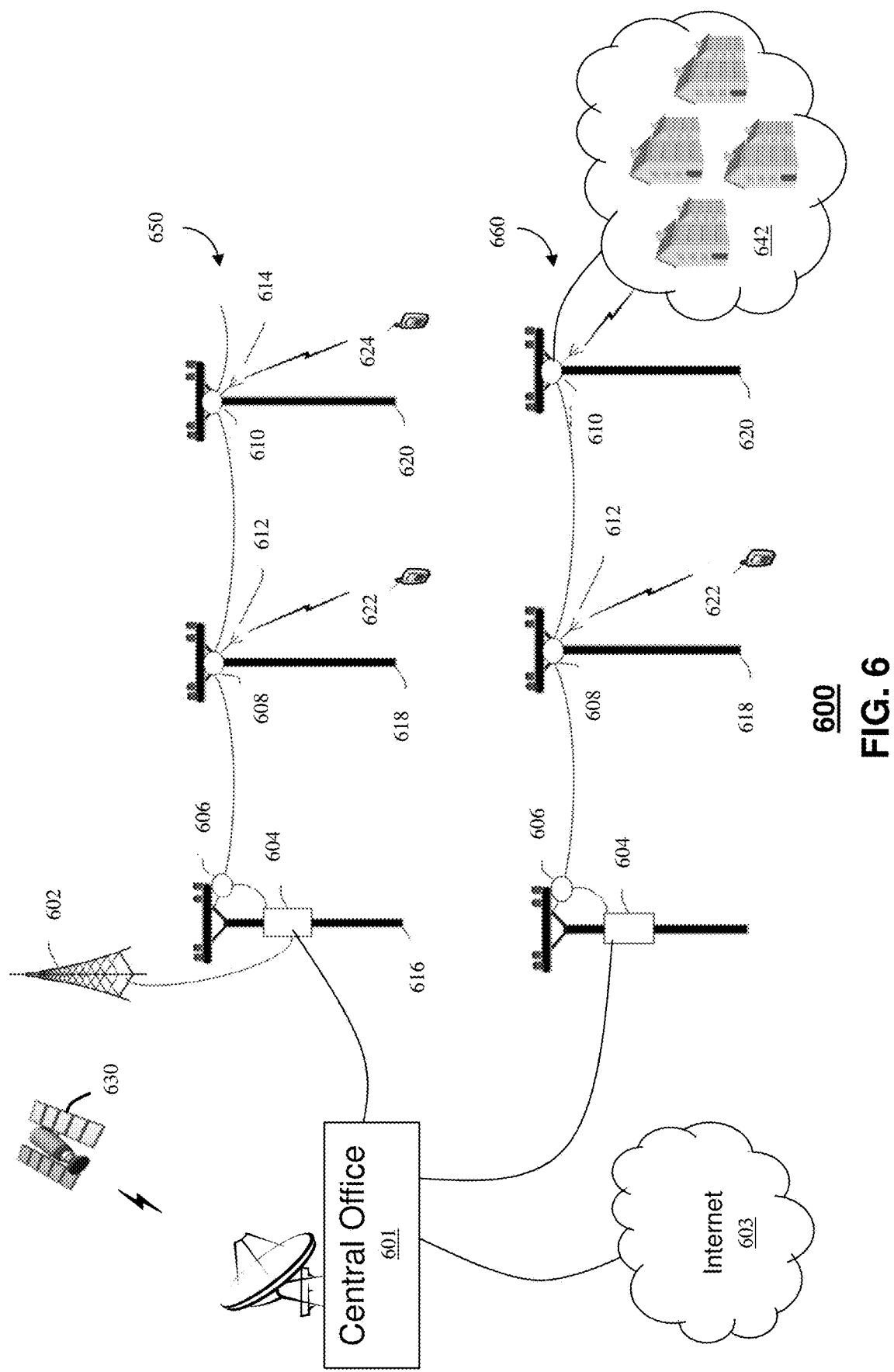
FIG. 6 is a block diagram illustrating an example, non-limiting embodiment of a guided-wave communications system in accordance with various aspects described herein.

Referring now to FIG. 6, a block diagram 600 illustrating an example, non-limiting embodiment of a guided wave communications system is shown. This diagram depicts an exemplary environment in which a guided wave communication system, such as the guided wave communication system presented in conjunction with FIG. 1, can be used.

To provide network connectivity to additional base station devices, a backhaul network that links the communication cells (e.g., macrocells and macrocells) to network devices of a core network correspondingly expands. Similarly, to provide network connectivity to a distributed antenna system, an extended communication system that links base station devices and their distributed antennas is desirable. A guided wave communication system 600 such as shown in FIG. 6 can be provided to enable alternative, increased or additional network connectivity and a waveguide coupling system can be provided to transmit and/or receive guided wave (e.g., surface wave) communications on a transmission medium such as a wire that operates as a single-wire transmission line (e.g., a utility line), and that can be used as a waveguide and/or that otherwise operates to guide the transmission of an electromagnetic wave.

The guided wave communication system 600 can comprise a first instance of a distribution system 650 that includes one or more base station devices (e.g., base station device 604) that are communicably coupled to a central office 601 and/or a macrocell site 602. Base station device 604 can be connected by a wired (e.g., fiber and/or cable), or by a wireless (e.g., microwave wireless) connection to the macrocell site 602 and the central office 601. A second instance of the distribution system 660 can be used to provide wireless voice and data services to mobile device 622 and to residential and/or commercial establishments 642 (herein referred to as establishments 642). System 600 can have additional instances of the distribution systems 650 and 660 for providing voice and/or data services to mobile devices 622-624 and establishments 642 as shown in FIG. 6.

Macrocells such as macrocell site 602 can have dedicated connections to a mobile network and base station device 604 or can share and/or otherwise use another connection. Central office 601 can be used to distribute media content and/or provide internet service provider (ISP) services to mobile devices 622-624 and establishments 642. The central office 601 can receive media content from a constellation of satellites 630 (one of which is shown in FIG. 6) or other sources of content, and distribute such content to mobile devices 622-624 and establishments 642 via the first and second instances of the distribution system 650 and 660. The central office 601 can also be communicatively coupled to the Internet 603 for providing internet data services to mobile devices 622-624 and establishments 642.

Base station device 604 can be mounted on, or attached to, utility pole 616. In other embodiments, base station device 604 can be near transformers and/or other locations situated nearby a power line. Base station device 604 can facilitate connectivity to a mobile network for mobile devices 622 and 624. Antennas 612 and 614, mounted on or near utility poles 618 and 620, respectively, can receive signals from base station device 604 and transmit those signals to mobile devices 622 and 624 over a much wider area than if the antennas 612 and 614 were located at or near base station device 604.

It is noted that FIG. 6 displays three utility poles, in each instance of the distribution systems 650 and 660, with one base station device, for purposes of simplicity. In other embodiments, utility pole 616 can have more base station devices, and more utility poles with distributed antennas and/or tethered connections to establishments 642.

A transmission device 606, such as transmission device 101 or 102 presented in conjunction with FIG. 1, can transmit a signal from base station device 604 to antennas 612 and 614 via utility or power line(s) that connect the utility poles 616, 618, and 620. To transmit the signal, radio source and/or transmission device 606 upconverts the signal (e.g., via frequency mixing) from base station device 604 or otherwise converts the signal from the base station device 604 to a microwave band signal and the transmission device 606 launches a microwave band wave that propagates as a guided wave traveling along the utility line or other wire as described in previous embodiments. At utility pole 618, another transmission device 608 receives the guided wave (and optionally can amplify it as needed or desired or operate as a repeater to receive it and regenerate it) and sends it forward as a guided wave on the utility line or other wire. The transmission device 608 can also extract a signal from the microwave band guided wave and shift it down in frequency or otherwise convert it to its original cellular band frequency (e.g., 1.9 GHz or other defined cellular frequency) or another cellular (or non-cellular) band frequency. An antenna 612 can wireless transmit the downshifted signal to mobile device 622. The process can be repeated by transmission device 610, antenna 614 and mobile device 624, as necessary or desirable.

Transmissions from mobile devices 622 and 624 can also be received by antennas 612 and 614, respectively. The transmission devices 608 and 610 can upshift or otherwise convert the cellular band signals to microwave band and transmit the signals as guided wave (e.g., surface wave or other electromagnetic wave) transmissions over the power line(s) to base station device 604.

Media content received by the central office 601 can be supplied to the second instance of the distribution system 660 via the base station device 604 for distribution to mobile devices 622 and establishments 642. The transmission device 610 can be tethered to the establishments 642 by one or more wired connections or a wireless interface. The one or more wired connections may include without limitation, a power line, a coaxial cable, a fiber cable, a twisted pair cable, a guided wave transmission medium or other suitable wired mediums for distribution of media content and/or for providing internet services. In an example embodiment, the wired connections from the transmission device 610 can be communicatively coupled to one or more very high bit rate digital subscriber line (VDSL) modems located at one or more corresponding service area interfaces (SAIs—not shown) or pedestals, each SAI or pedestal providing services to a portion of the establishments 642. The VDSL modems can be used to selectively distribute media content and/or provide internet services to gateways (not shown) located in the establishments 642. The SAIs or pedestals can also be communicatively coupled to the establishments 642 over a wired medium such as a power line, a coaxial cable, a fiber cable, a twisted pair cable, a guided wave transmission medium or other suitable wired mediums. In other example embodiments, the transmission device 610 can be communicatively coupled directly to establishments 642 without intermediate interfaces such as the SAIs or pedestals.

In another example embodiment, system 600 can employ diversity paths, where two or more utility lines or other wires are strung between the utility poles 616, 618, and 620 (e.g., for example, two or more wires between poles 616 and 620) and redundant transmissions from base station/macrocell site 602 are transmitted as guided waves down the surface of the utility lines or other wires. The utility lines or other wires can be either insulated or uninsulated, and depending on the environmental conditions that cause transmission losses, the coupling devices can selectively receive signals from the insulated or uninsulated utility lines or other wires. The selection can be based on measurements of the signal-to-noise ratio of the wires or based on determined weather/environmental conditions (e.g., moisture detectors, weather forecasts, etc.). The use of diversity paths with system 600 can enable alternate routing capabilities, load balancing, increased load handling, concurrent bi-directional or synchronous communications, spread spectrum communications, etc.

It is noted that the use of the transmission devices 606, 608, and 610 in FIG. 6 are by way of example only, and that in other embodiments, other uses are possible. For instance, transmission devices can be used in a backhaul communication system, providing network connectivity to base station devices. Transmission devices 606, 608, and 610 can be used in many circumstances where it is desirable to transmit guided wave communications over a wire, whether insulated or not insulated. Transmission devices 606, 608, and 610 are improvements over other coupling devices due to no contact or limited physical and/or electrical contact with the wires that may carry high voltages. The transmission device can be located away from the wire (e.g., spaced apart from the wire) and/or located on the wire so long as it is not electrically in contact with the wire, as the dielectric acts as an insulator, allowing for cheap, easy, and/or less complex installation. However, as previously noted conducting or non-dielectric couplers can be employed, for example in configurations where the wires correspond to a telephone network, cable television network, broadband data service, fiber optic communications system or other network employing low voltages or having insulated transmission lines.

It is further noted, that while base station device 604 and macrocell site 602 are illustrated in an embodiment, other network configurations are likewise possible. For example, devices such as access points or other wireless gateways can be employed in a similar fashion to extend the reach of other networks such as a wireless local area network, a wireless personal area network or other wireless network that operates in accordance with a communication protocol such as a 802.11 protocol, WIMAX protocol, UltraWideband protocol, Bluetooth® protocol, Zigbee® protocol or other wireless protocol.

Figure 7A:
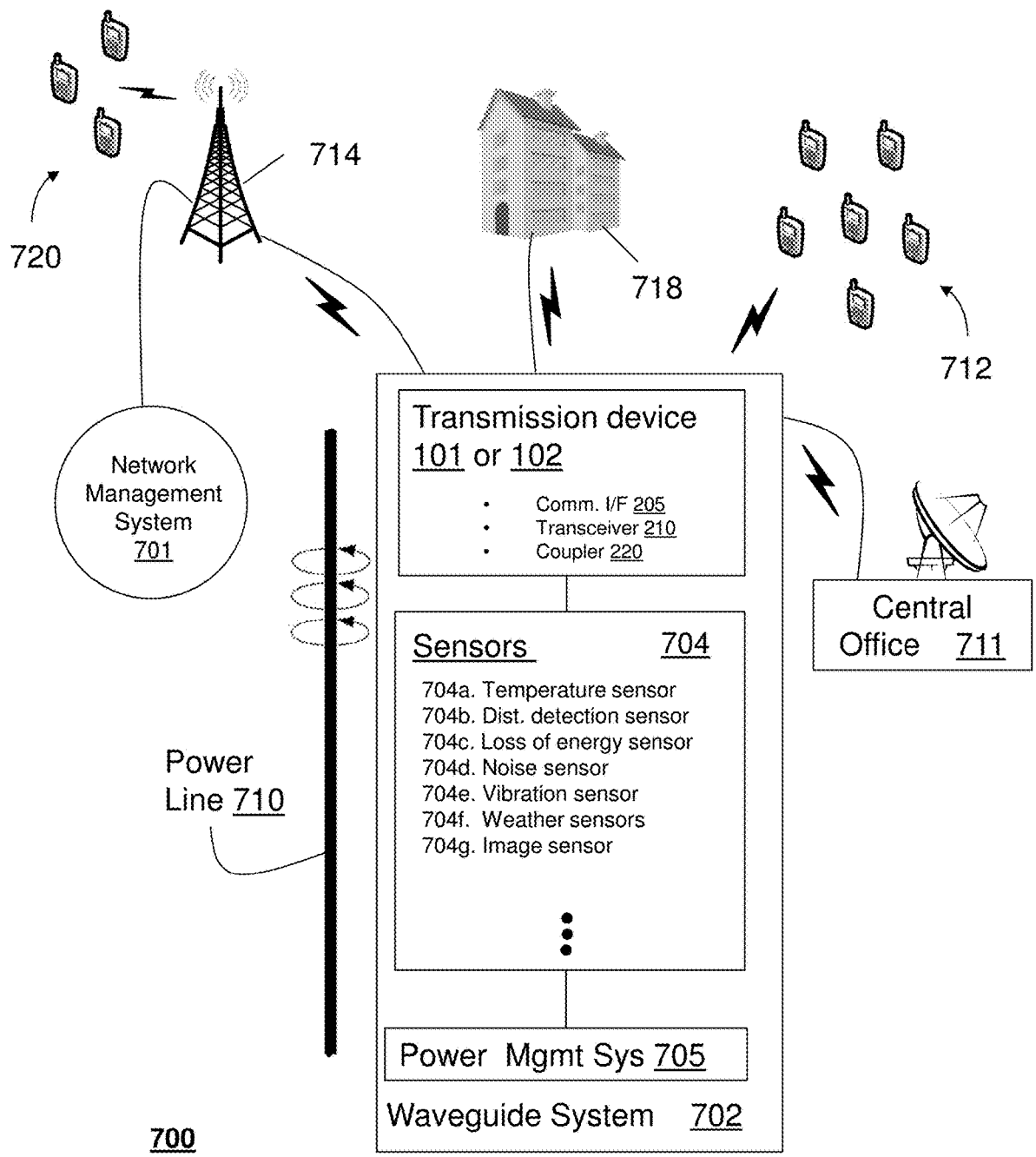
FIGS. 7A & 7B are block diagrams illustrating an example, non-limiting embodiment of a system for managing a power grid communication system in accordance with various aspects described herein.
Figure 7B:
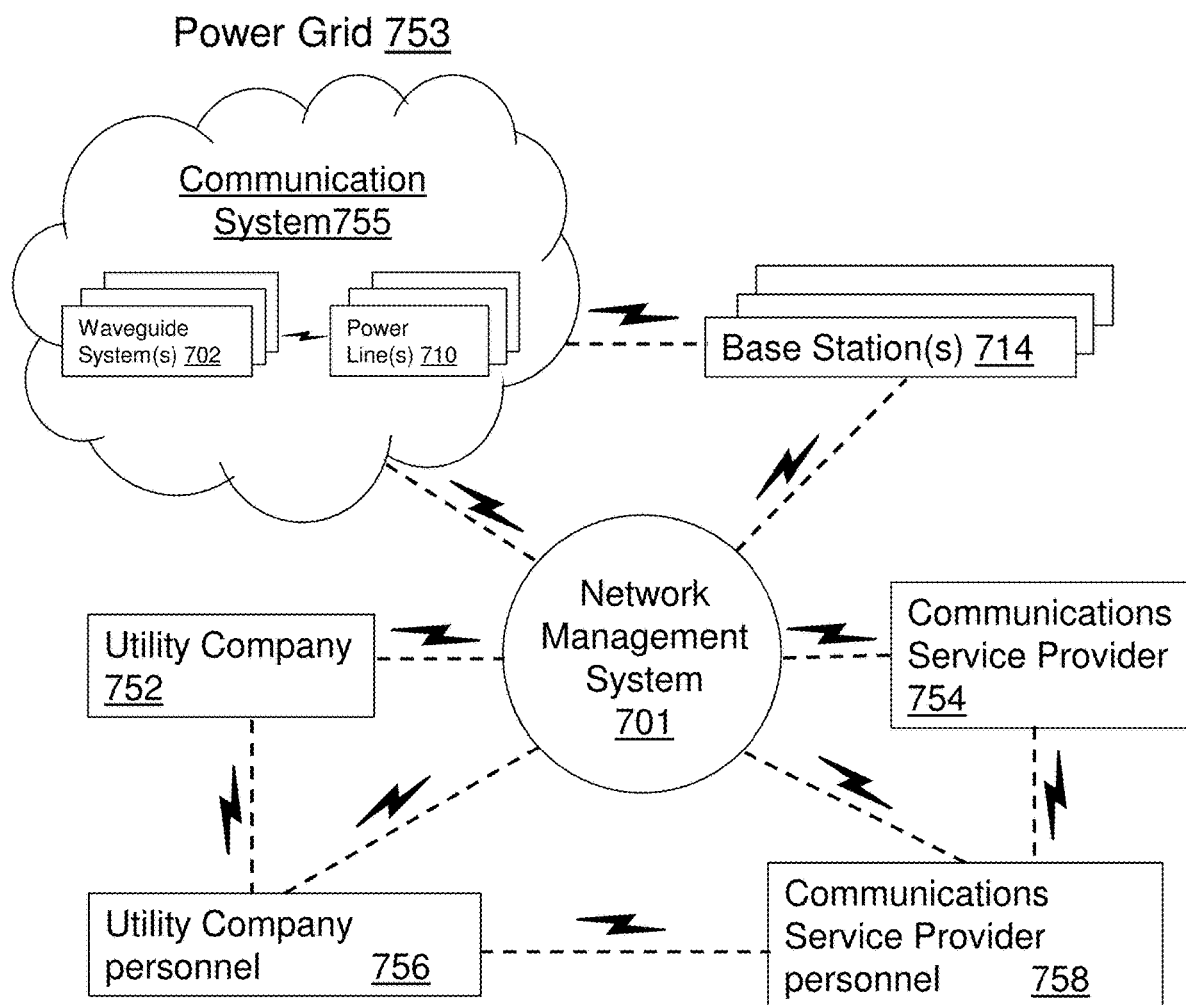

Referring now to FIGS. 7A & 7B, block diagrams illustrating an example, non-limiting embodiment of a system for managing a power grid communication system are shown. Considering FIG. 7A, a waveguide system 702 is presented for use in a guided wave communications system 700, such as the system presented in conjunction with FIG. 6. The waveguide system 702 can comprise sensors 704, a power management system 705, a transmission device 101 or 102 that includes at least one communication interface 205, transceiver 210 and coupler 220.

The waveguide system 702 can be coupled to a power line 710 for facilitating guided wave communications in accordance with embodiments described in the subject disclosure. In an example embodiment, the transmission device 101 or 102 includes coupler 220 for inducing electromagnetic waves on a surface of the power line 710 that longitudinally propagate along the surface of the power line 710 as described in the subject disclosure. The transmission device 101 or 102 can also serve as a repeater for retransmitting electromagnetic waves on the same power line 710 or for routing electromagnetic waves between power lines 710.

The transmission device 101 or 102 includes transceiver 210 configured to, for example, up-convert a signal operating at an original frequency range to electromagnetic waves operating at, exhibiting, or associated with a carrier frequency that propagate along a coupler to induce corresponding guided electromagnetic waves that propagate along a surface of the power line 710. A carrier frequency can be represented by a center frequency having upper and lower cutoff frequencies that define the bandwidth of the electromagnetic waves. The power line 710 can be a wire (e.g., single stranded or multi-stranded) having a conducting surface or insulated surface. The transceiver 210 can also receive signals from the coupler 220 and down-convert the electromagnetic waves operating at a carrier frequency to signals at their original frequency.

Signals received by the communications interface 205 of transmission device 101 or 102 for up-conversion can include without limitation signals supplied by a central office 711 over a wired or wireless interface of the communications interface 205, a base station 714 over a wired or wireless interface of the communications interface 205, wireless signals transmitted by mobile devices 720 to the base station 714 for delivery over the wired or wireless interface of the communications interface 205, signals supplied by in-building communication devices 718 over the wired or wireless interface of the communications interface 205, and/or wireless signals supplied to the communications interface 205 by mobile devices 712 roaming in a wireless communication range of the communications interface 205. In embodiments where the waveguide system 702 functions as a repeater, the communications interface 205 may or may not be included in the waveguide system 702.

The electromagnetic waves propagating along the surface of the power line 710 can be modulated and formatted to include packets or frames of data that include a data payload and further include networking information (such as header information for identifying one or more destination waveguide systems 702). The networking information may be provided by the waveguide system 702 or an originating device such as the central office 711, the base station 714, mobile devices 720, or in-building devices 718, or a combination thereof. Additionally, the modulated electromagnetic waves can include error correction data for mitigating signal disturbances. The networking information and error correction data can be used by a destination waveguide system 702 for detecting transmissions directed to it, and for down-converting and processing with error correction data transmissions that include voice and/or data signals directed to recipient communication devices communicatively coupled to the destination waveguide system 702.

Referring now to the sensors 704 of the waveguide system 702, the sensors 704 can comprise one or more of a temperature sensor 704*a*, a disturbance detection sensor 704*b*, a loss of energy sensor 704*c*, a noise sensor 704*d*, a vibration sensor 704*e*, an environmental (e.g., weather) sensor 704*f*, and/or an image sensor 704*g*. The temperature sensor 704*a* can be used to measure ambient temperature, a temperature of the transmission device 101 or 102, a temperature of the power line 710, temperature differentials (e.g., compared to a setpoint or baseline, between transmission device 101 or 102 and 710, etc.), or any combination thereof. In one embodiment, temperature metrics can be collected and reported periodically to a network management system 701 by way of the base station 714.

The disturbance detection sensor 704*b* can perform measurements on the power line 710 to detect disturbances such as signal reflections, which may indicate a presence of a downstream disturbance that may impede the propagation of electromagnetic waves on the power line 710. A signal reflection can represent a distortion resulting from, for example, an electromagnetic wave transmitted on the power line 710 by the transmission device 101 or 102 that reflects in whole or in part back to the transmission device 101 or 102 from a disturbance in the power line 710 located downstream from the transmission device 101 or 102.

Signal reflections can be caused by obstructions on the power line 710. For example, a tree limb may cause electromagnetic wave reflections when the tree limb is lying on the power line 710 or is in close proximity to the power line 710 which may cause a corona discharge. Other obstructions that can cause electromagnetic wave reflections can include without limitation an object that has been entangled on the power line 710 (e.g., clothing, a shoe wrapped around a power line 710 with a shoe string, etc.), a corroded build-up on the power line 710 or an ice build-up. Power grid components may also impede or obstruct with the propagation of electromagnetic waves on the surface of power lines 710. Illustrations of power grid components that may cause signal reflections include without limitation a transformer and a joint for connecting spliced power lines. A sharp angle on the power line 710 may also cause electromagnetic wave reflections.

The disturbance detection sensor 704*b* can comprise a circuit to compare magnitudes of electromagnetic wave reflections to magnitudes of original electromagnetic waves transmitted by the transmission device 101 or 102 to determine how much a downstream disturbance in the power line 710 attenuates transmissions. The disturbance detection sensor 704*b* can further comprise a spectral analyzer circuit for performing spectral analysis on the reflected waves. The spectral data generated by the spectral analyzer circuit can be compared with spectral profiles via pattern recognition, an expert system, curve fitting, matched filtering or other artificial intelligence, classification or comparison technique to identify a type of disturbance based on, for example, the spectral profile that most closely matches the spectral data. The spectral profiles can be stored in a memory of the disturbance detection sensor 704b or may be remotely accessible by the disturbance detection sensor 704b. The profiles can comprise spectral data that models different disturbances that may be encountered on power lines 710 to enable the disturbance detection sensor 704b to identify disturbances locally. An identification of the disturbance if known can be reported to the network management system 701 by way of the base station 714. The disturbance detection sensor 704b can also utilize the transmission device 101 or 102 to transmit electromagnetic waves as test signals to determine a roundtrip time for an electromagnetic wave reflection. The round trip time measured by the disturbance detection sensor 704b can be used to calculate a distance traveled by the electromagnetic wave up to a point where the reflection takes place, which enables the disturbance detection sensor 704b to calculate a distance from the transmission device 101 or 102 to the downstream disturbance on the power line 710.

The distance calculated can be reported to the network management system 701 by way of the base station 714. In one embodiment, the location of the waveguide system 702 on the power line 710 may be known to the network management system 701, which the network management system 701 can use to determine a location of the disturbance on the power line 710 based on a known topology of the power grid. In another embodiment, the waveguide system 702 can provide its location to the network management system 701 to assist in the determination of the location of the disturbance on the power line 710. The location of the waveguide system 702 can be obtained by the waveguide system 702 from a pre-programmed location of the waveguide system 702 stored in a memory of the waveguide system 702, or the waveguide system 702 can determine its location using a GPS receiver (not shown) included in the waveguide system 702.

The power management system 705 provides energy to the aforementioned components of the waveguide system 702. The power management system 705 can receive energy from solar cells, or from a transformer (not shown) coupled to the power line 710, or by inductive coupling to the power line 710 or another nearby power line. The power management system 705 can also include a backup battery and/or a super capacitor or other capacitor circuit for providing the waveguide system 702 with temporary power. The loss of energy sensor 704c can be used to detect when the waveguide system 702 has a loss of power condition and/or the occurrence of some other malfunction. For example, the loss of energy sensor 704c can detect when there is a loss of power due to defective solar cells, an obstruction on the solar cells that causes them to malfunction, loss of power on the power line 710, and/or when the backup power system malfunctions due to expiration of a backup battery, or a detectable defect in a super capacitor. When a malfunction and/or loss of power occurs, the loss of energy sensor 704c can notify the network management system 701 by way of the base station 714.

The noise sensor 704d can be used to measure noise on the power line 710 that may adversely affect transmission of electromagnetic waves on the power line 710. The noise sensor 704d can sense unexpected electromagnetic interference, noise bursts, or other sources of disturbances that may interrupt reception of modulated electromagnetic waves on a surface of a power line 710. A noise burst can be caused by, for example, a corona discharge, or other source of noise. The noise sensor 704d can compare the measured noise to a noise profile obtained by the waveguide system 702 from an internal database of noise profiles or from a remotely located database that stores noise profiles via pattern recognition, an expert system, curve fitting, matched filtering or other artificial intelligence, classification or comparison technique. From the comparison, the noise sensor 704d may identify a noise source (e.g., corona discharge or otherwise) based on, for example, the noise profile that provides the closest match to the measured noise. The noise sensor 704d can also detect how noise affects transmissions by measuring transmission metrics such as bit error rate, packet loss rate, jitter, packet retransmission requests, etc. The noise sensor 704d can report to the network management system 701 by way of the base station 714 the identity of noise sources, their time of occurrence, and transmission metrics, among other things.

The vibration sensor 704e can include accelerometers and/or gyroscopes to detect 2D or 3D vibrations on the power line 710. The vibrations can be compared to vibration profiles that can be stored locally in the waveguide system 702, or obtained by the waveguide system 702 from a remote database via pattern recognition, an expert system, curve fitting, matched filtering or other artificial intelligence, classification or comparison technique. Vibration profiles can be used, for example, to distinguish fallen trees from wind gusts based on, for example, the vibration profile that provides the closest match to the measured vibrations. The results of this analysis can be reported by the vibration sensor 704e to the network management system 701 by way of the base station 714.

The environmental sensor 704f can include a barometer for measuring atmospheric pressure, ambient temperature (which can be provided by the temperature sensor 704a), wind speed, humidity, wind direction, and rainfall, among other things. The environmental sensor 704f can collect raw information and process this information by comparing it to environmental profiles that can be obtained from a memory of the waveguide system 702 or a remote database to predict weather conditions before they arise via pattern recognition, an expert system, knowledge-based system or other artificial intelligence, classification or other weather modeling and prediction technique. The environmental sensor 704f can report raw data as well as its analysis to the network management system 701.

The image sensor 704g can be a digital camera (e.g., a charged coupled device or CCD imager, infrared camera, etc.) for capturing images in a vicinity of the waveguide system 702. The image sensor 704g can include an electromechanical mechanism to control movement (e.g., actual position or focal points/zooms) of the camera for inspecting the power line 710 from multiple perspectives (e.g., top surface, bottom surface, left surface, right surface and so on). Alternatively, the image sensor 704g can be designed such that no electromechanical mechanism is needed in order to obtain the multiple perspectives. The collection and retrieval of imaging data generated by the image sensor 704g can be controlled by the network management system 701 or can be autonomously collected and reported by the image sensor 704g to the network management system 701.

Other sensors that may be suitable for collecting telemetry information associated with the waveguide system 702 and/or the power lines 710 for purposes of detecting, predicting and/or mitigating disturbances that can impede the propagation of electromagnetic wave transmissions on power lines 710 (or any other form of a transmission medium of electromagnetic waves) may be utilized by the waveguide system 702.

Referring now to FIG. 7B, block diagram 750 illustrates an example, non-limiting embodiment of a system for managing a power grid 753 and a communication system 755 embedded therein or associated therewith in accordance with various aspects described herein. The communication system 755 comprises a plurality of waveguide systems 702 coupled to power lines 710 of the power grid 753. At least a portion of the waveguide systems 702 used in the communication system 755 can be in direct communication with a base station 714 and/or the network management system 701. Waveguide systems 702 not directly connected to a base station 714 or the network management system 701 can engage in communication sessions with either a base station 714 or the network management system 701 by way of other downstream waveguide systems 702 connected to a base station 714 or the network management system 701.

The network management system 701 can be communicatively coupled to equipment of a utility company 752 and equipment of a communications service provider 754 for providing each entity, status information associated with the power grid 753 and the communication system 755, respectively. The network management system 701, the equipment of the utility company 752, and the communications service provider 754 can access communication devices utilized by utility company personnel 756 and/or communication devices utilized by communications service provider personnel 758 for purposes of providing status information and/or for directing such personnel in the management of the power grid 753 and/or communication system 755.

Figure 8A:
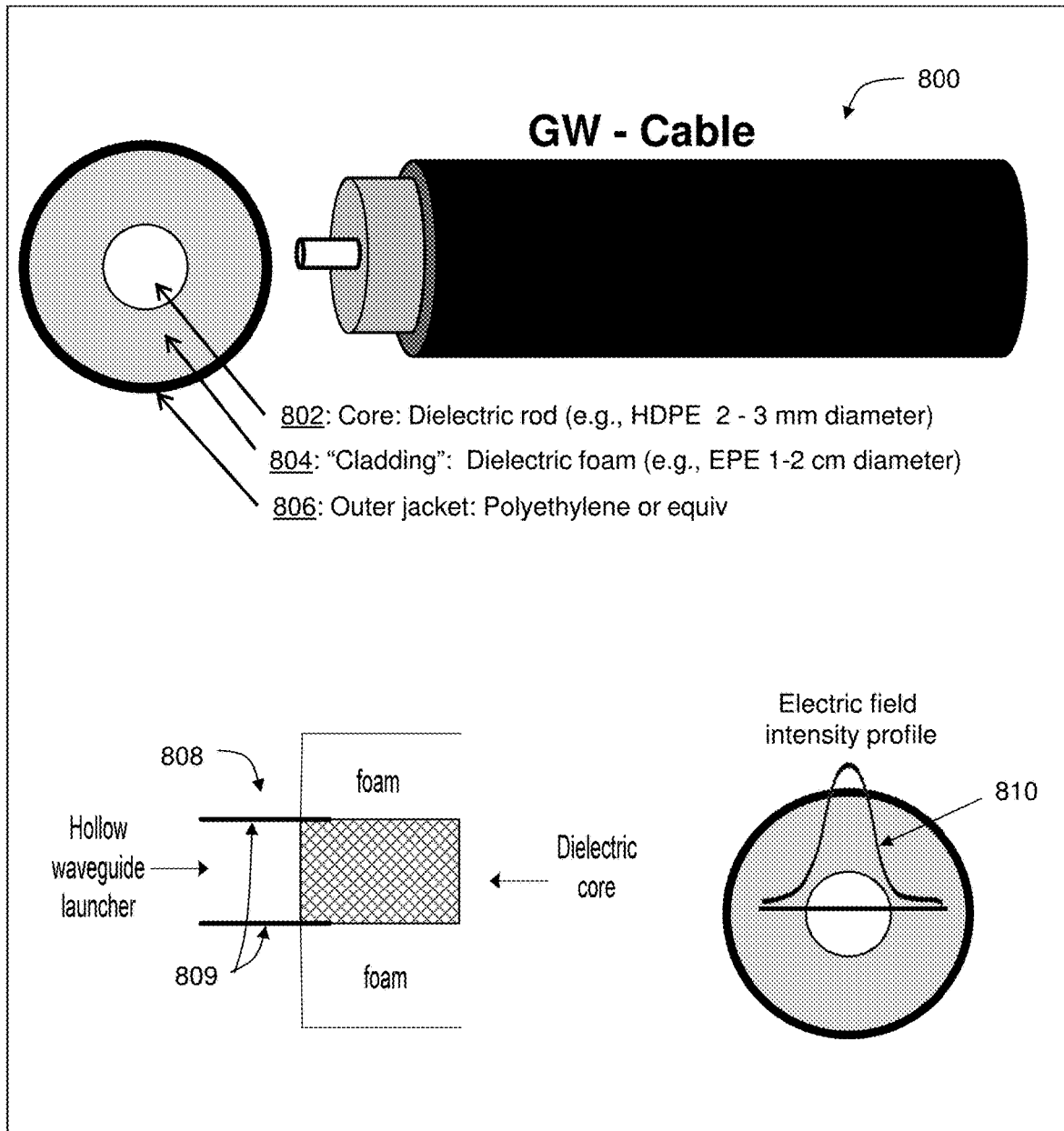
FIG. 8A is a block diagram illustrating an example, non-limiting embodiment of a transmission medium for propagating guided electromagnetic waves.

Turning now to FIG. 8A, a block diagram illustrating an example, non-limiting embodiment of a transmission medium 800 for propagating guided electromagnetic waves is shown. In particular, a further example of transmission medium 125 presented in conjunction with FIG. 1 is presented. In an embodiment, the transmission medium 800 can comprise a first dielectric material 802 and a second dielectric material 804 disposed thereon. In an embodiment, the first dielectric material 802 can comprise a dielectric core (referred to herein as dielectric core 802) and the second dielectric material 804 can comprise a cladding or shell such as a dielectric foam that surrounds in whole or in part the dielectric core (referred to herein as dielectric foam 804). In an embodiment, the dielectric core 802 and dielectric foam 804 can be coaxially aligned to each other (although not necessary). In an embodiment, the combination of the dielectric core 802 and the dielectric foam 804 can be flexed or bent at least by 45 degrees without damaging the materials of the dielectric core 802 and the dielectric foam 804. In an embodiment, an outer surface of the dielectric foam 804 can be further surrounded in whole or in part by a third dielectric material 806, which can serve as an outer jacket (referred to herein as jacket 806). The jacket 806 can prevent exposure of the dielectric core 802 and the dielectric foam 804 to an environment that can adversely affect the propagation of electromagnetic waves (e.g., water, soil, etc.).

The dielectric core 802 can comprise, for example, a high-density polyethylene material, a high-density polyurethane material, or other suitable dielectric material(s). The dielectric foam 804 can comprise, for example, a cellular plastic material such an expanded polyethylene material, or other suitable dielectric material(s). The jacket 806 can comprise, for example, a polyethylene material or equivalent. In an embodiment, the dielectric constant of the dielectric foam 804 can be (or substantially) lower than the dielectric constant of the dielectric core 802. For example, the dielectric constant of the dielectric core 802 can be approximately 2.3 while the dielectric constant of the dielectric foam 804 can be approximately 1.15 (slightly higher than the dielectric constant of air).

The dielectric core 802 can be used for receiving signals in the form of electromagnetic waves from a launcher or other coupling device described herein which can be configured to launch guided electromagnetic waves on the transmission medium 800. In one embodiment, the transmission 800 can be coupled to a hollow waveguide 808 structured as, for example, a circular waveguide 809, which can receive electromagnetic waves from a radiating device such as a stub antenna (not shown). The hollow waveguide 808 can in turn induce guided electromagnetic waves in the dielectric core 802. In this configuration, the guided electromagnetic waves are guided by or bound to the dielectric core 802 and propagate longitudinally along the dielectric core 802. By adjusting electronics of the launcher, an operating frequency of the electromagnetic waves can be chosen such that a field intensity profile 810 of the guided electromagnetic waves extends nominally (or not at all) outside of the jacket 806.

By maintaining most (if not all) of the field strength of the guided electromagnetic waves within portions of the dielectric core 802, the dielectric foam 804 and/or the jacket 806, the transmission medium 800 can be used in hostile environments without adversely affecting the propagation of the electromagnetic waves propagating therein. For example, the transmission medium 800 can be buried in soil with no (or nearly no) adverse effect to the guided electromagnetic waves propagating in the transmission medium 800. Similarly, the transmission medium 800 can be exposed to water (e.g., rain or placed underwater) with no (or nearly no) adverse effect to the guided electromagnetic waves propagating in the transmission medium 800. In an embodiment, the propagation loss of guided electromagnetic waves in the foregoing embodiments can be 1 to 2 dB per meter or better at an operating frequency of 60 GHz. Depending on the operating frequency of the guided electromagnetic waves and/or the materials used for the transmission medium 800 other propagation losses may be possible. Additionally, depending on the materials used to construct the transmission medium 800, the transmission medium 800 can in some embodiments be flexed laterally with no (or nearly no) adverse effect to the guided electromagnetic waves propagating through the dielectric core 802 and the dielectric foam 804.

Other configurations of the transmission medium 800 are possible including, a transmission medium that comprises a conductive core with or without an insulation layer surrounding the conductive core in whole or in part that is, in turn, covered in whole or in part by a dielectric foam 804 and jacket 806, which can be constructed from the materials previously described.

It should be noted that the hollow launcher 808 used with the transmission medium 800 can be replaced with other launchers, couplers or coupling devices described in the subject disclosure. Additionally, the propagation mode(s) of the electromagnetic waves for any of the foregoing embodiments can be fundamental mode(s), non-fundamental mode(s), or combinations thereof.

Figure 8B:
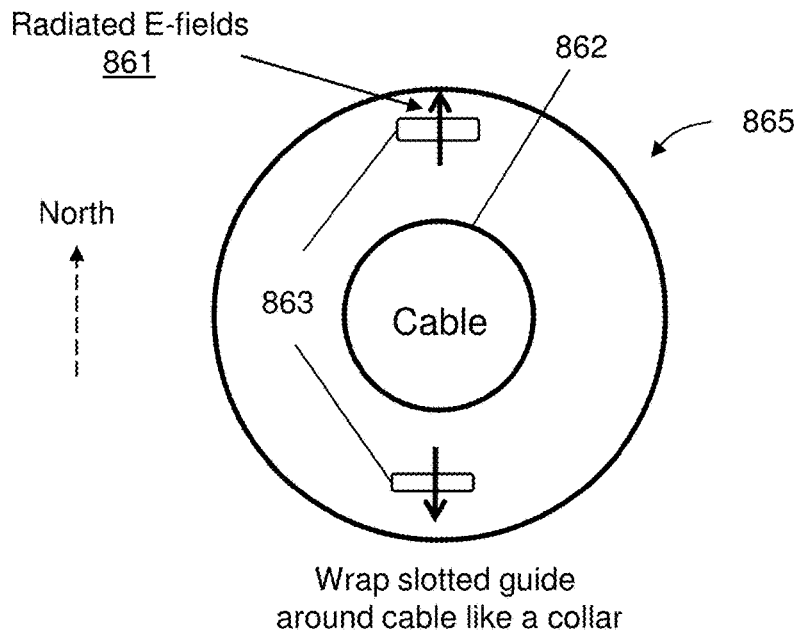
FIGS. 8B, 8C, 8D, 8E, 8F, 8G, 8H and 8I are block diagrams illustrating example, non-limiting embodiments of a waveguide device for transmitting or receiving electromagnetic waves in accordance with various aspects described herein.

FIGS. 8B, 8C, 8D, 8E, 8F, 8G and 8H are block diagrams illustrating example, non-limiting embodiments of a waveguide device for transmitting or receiving electromagnetic waves in accordance with various aspects described herein. In an embodiment, FIG. 8B illustrates a front view of a waveguide device 865 having a plurality of slots 863 (e.g., openings or apertures) for emitting electromagnetic waves having radiated electric fields (e-fields) 861. In an embodiment, the radiated e-fields 861 of pairs of symmetrically positioned slots 863 (e.g., north and south slots of the waveguide 865) can be directed away from each other (i.e., polar opposite radial orientations about the cable 862). While the slots 863 are shown as having a rectangular shape, other shapes such as other polygons, sector and arc shapes, ellipsoid shapes and other shapes are likewise possible. For illustration purposes only, the term north will refer to a relative azimuthal direction/orientation as shown in the figures. All references in the subject disclosure to other directions/orientations (e.g., south, east, west, northwest, and so forth) will be relative to northern illustration. In an embodiment, to achieve e-fields with opposing orientations at the north and south slots 863, for example, the north and south slots 863 can be arranged to have a circumferential distance between each other that is approximately one wavelength of electromagnetic waves signals supplied to these slots. The waveguide 865 can have a cylindrical cavity in a center of the waveguide 865 to enable placement of a cable 862. In one embodiment, the cable 862 can comprise an insulated conductor. In another embodiment, the cable 862 can comprise an uninsulated conductor. In yet other embodiments, the cable 862 can comprise any of the embodiments of a transmission core 852 of cable 850 previously described.

In one embodiment, the cable 862 can slide into the cylindrical cavity of the waveguide 865. In another embodiment, the waveguide 865 can utilize an assembly mechanism (not shown). The assembly mechanism (e.g., a hinge or other suitable mechanism that provides a way to open the waveguide 865 at one or more locations) can be used to enable placement of the waveguide 865 on an outer surface of the cable 862 or otherwise to assemble separate pieces together to form the waveguide 865 as shown. According to these and other suitable embodiments, the waveguide 865 can be configured to wrap around the cable 862 like a collar.

Figure 8C:
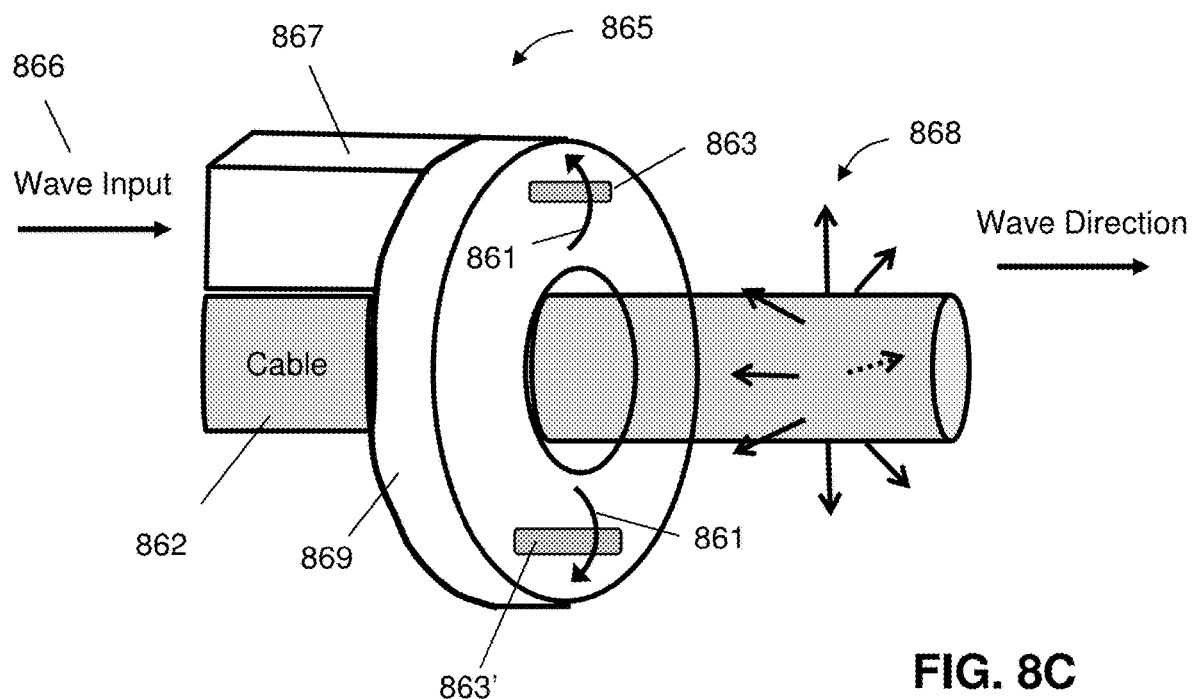

FIG. 8C illustrates a side view of an embodiment of the waveguide 865. The waveguide 865 can be adapted to have a hollow rectangular waveguide portion 867 that receives electromagnetic waves 866 generated by a transmitter circuit as previously described in the subject disclosure (e.g., see FIG. 1). The electromagnetic waves 866 can be distributed by the hollow rectangular waveguide portion 867 into a hollow collar 869 of the waveguide 865. The rectangular waveguide portion 867 and the hollow collar 869 can be constructed of materials suitable for maintaining the electromagnetic waves within the hollow chambers of these assemblies (e.g., carbon fiber materials). It should be noted that while the waveguide portion 867 is shown and described in a hollow rectangular configuration, other shapes and/or other non-hollow configurations can be employed. In particular, the waveguide portion 867 can have a square or other polygonal cross section, an arc or sector cross section that is truncated to conform to the outer surface of the cable 862, a circular or ellipsoid cross section or cross sectional shape. In addition, the waveguide portion 867 can be configured as, or otherwise include, a solid dielectric material.

As previously described, the hollow collar 869 can be configured to emit electromagnetic waves from each slot 863 with opposite e-fields 861 at pairs of symmetrically positioned slots 863 and 863'. In an embodiment, the electromagnetic waves emitted by the combination of slots 863 and 863' can in turn induce electromagnetic waves 868 on that are bound to the cable 862 for propagation according to a fundamental wave mode without other wave modes present—such as non-fundamental wave modes. In this configuration, the electromagnetic waves 868 can propagate longitudinally along the cable 862 to other downstream waveguide systems coupled to the cable 862.

It should be noted that since the hollow rectangular waveguide portion 867 of FIG. 8C is closer to slot 863 (at the northern position of the waveguide 865), slot 863 can emit electromagnetic waves having a stronger magnitude than electromagnetic waves emitted by slot 863' (at the southern position). To reduce magnitude differences between these slots, slot 863' can be made larger than slot 863. The technique of utilizing different slot sizes to balance signal magnitudes between slots can be applied to any of the embodiments of the subject disclosure relating to FIGS. 8B, 8C, 8E, and 8G—some of which are described below.

Figure 8D:
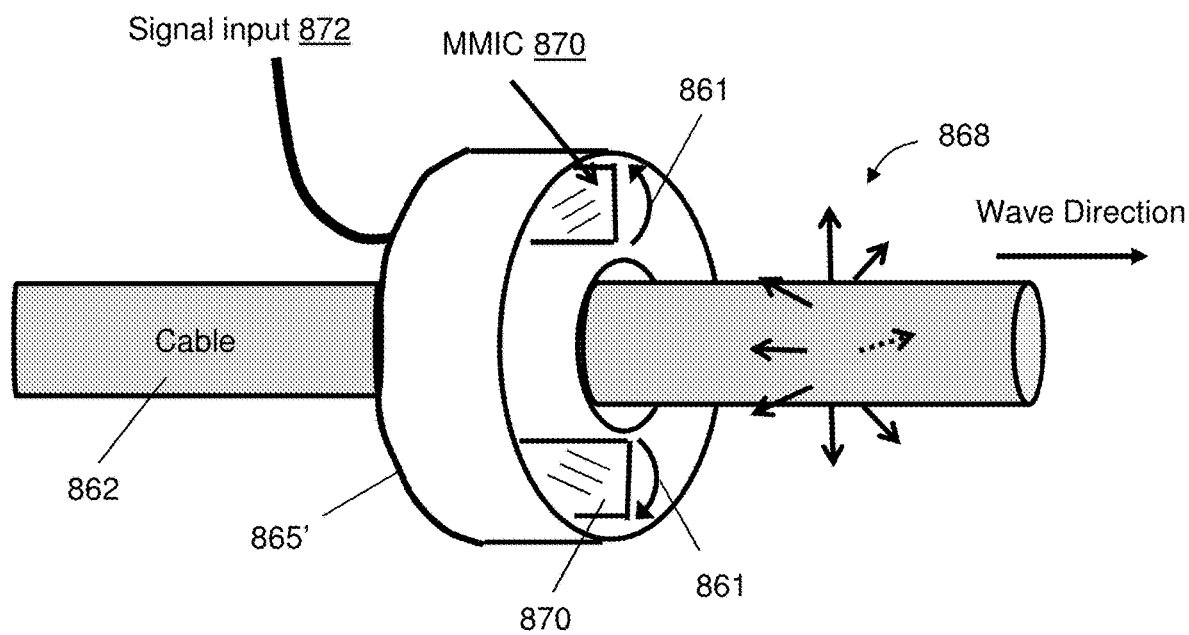

In another embodiment, FIG. 8D depicts a waveguide 865' that can be configured to utilize circuitry such as monolithic microwave integrated circuits (MMICs) 870 each coupled to a signal input 872 (e.g., coaxial cable that provides a communication signal). The signal input 872 can be generated by a transmitter circuit as previously described in the subject disclosure (e.g., see reference 101 of FIG. 1) adapted to provide electrical signals to the MMICs 870. Each MMIC 870 can be configured to receive signal 872 which the MMIC 870 can modulate and transmit with a radiating element (e.g., an antenna) to emit electromagnetic waves having radiated e-fields 861. In one embodiment, the MMICs 870 can be configured to receive the same signal 872, but transmit electromagnetic waves having e-fields 861 of opposing orientation. This can be accomplished by configuring one of the MMICs 870 to transmit electromagnetic waves that are 180 degrees out of phase with the electromagnetic waves transmitted by the other MMIC 870. In an embodiment, the combination of the electromagnetic waves emitted by the MMICs 870 can together induce electromagnetic waves 868 that are bound to the cable 862 for propagation according to a fundamental wave mode without other wave modes present—such as non-fundamental wave modes. In this configuration, the electromagnetic waves 868 can propagate longitudinally along the cable 862 to other downstream waveguide systems coupled to the cable 862.

Figure 8E:
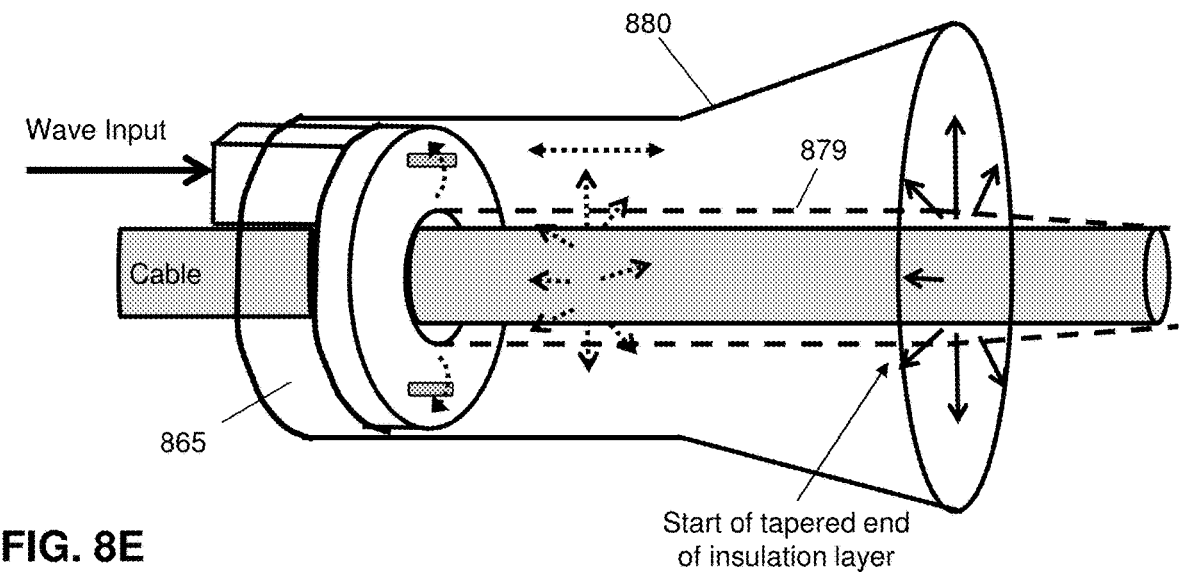
Figure 8F:
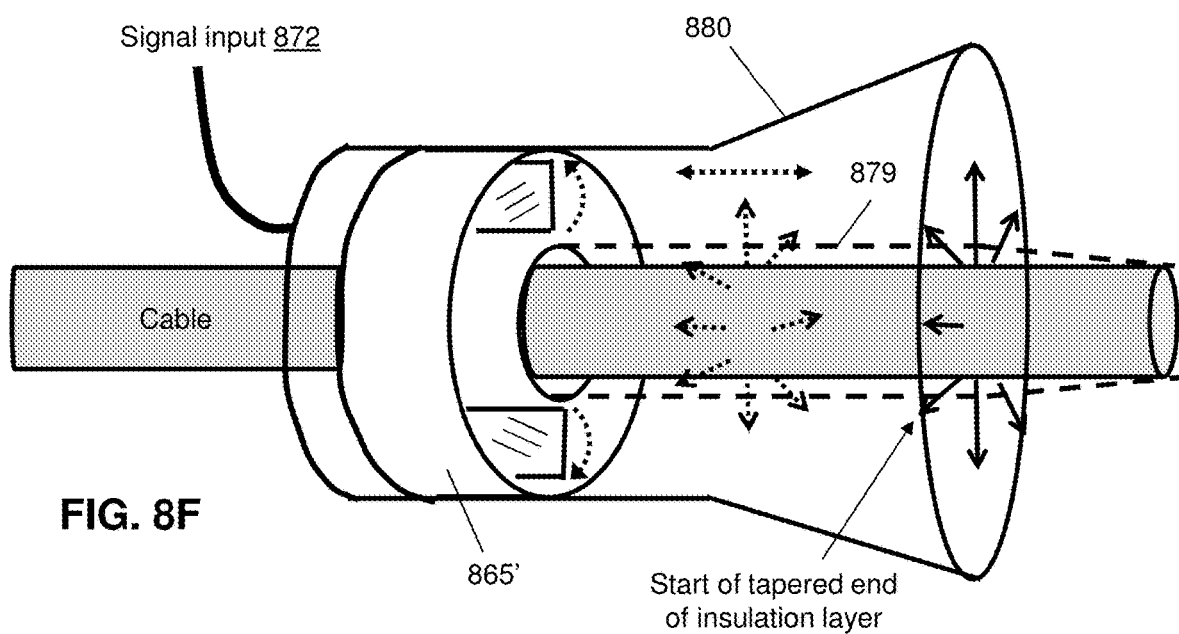

A tapered horn 880 can be added to the embodiments of FIGS. 8C and 8D to assist in the inducement of the electromagnetic waves 868 on cable 862 as depicted in FIGS. 8E and 8F. In an embodiment where the cable 862 is an uninsulated conductor, the electromagnetic waves induced on the cable 862 can have a large radial dimension (e.g., 1 meter). To enable use of a smaller tapered horn 880, an insulation layer 879 can be applied on a portion of the cable 862 at or near the cavity as depicted with hash lines in FIGS. 8E and 8F. The insulation layer 879 can have a tapered end facing away from the waveguide 865. The added insulation enables the electromagnetic waves 868 initially launched by the waveguide 865 (or 865') to be tightly bound to the insulation, which in turn reduces the radial dimension of the electromagnetic fields 868 (e.g., centimeters). As the electromagnetic waves 868 propagate away from the waveguide 865 (865') and reach the tapered end of the insulation layer 879, the radial dimension of the electromagnetic waves 868 begin to increase eventually achieving the radial dimension they would have had had the electromagnetic waves 868 been induced on the uninsulated conductor without an insulation layer. In the illustration of FIGS. 8E and 8F the tapered end begins at an end of the tapered horn 880. In other embodiments, the tapered end of the insulation layer 879 can begin before or after the end of the tapered horn 880. The tapered horn can be metallic or constructed of other conductive material or constructed of a plastic or other non-conductive material that is coated or clad with a dielectric layer or doped with a conductive material to provide reflective properties similar to a metallic horn.

Figure 8G:
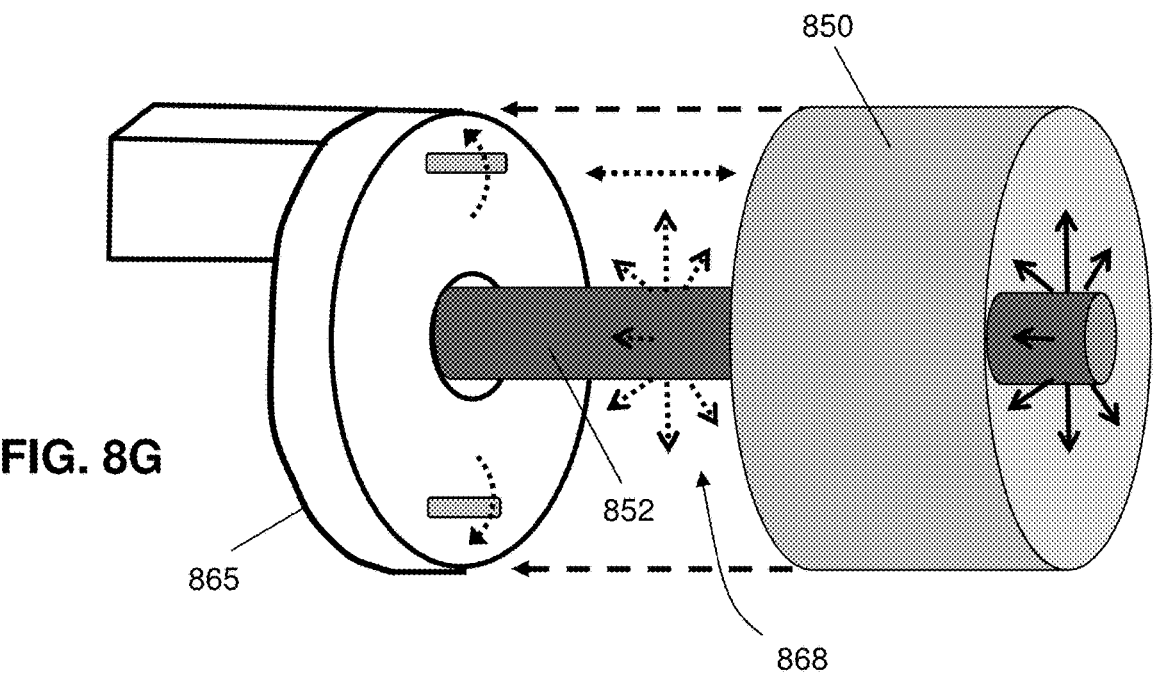
Figure 8H:
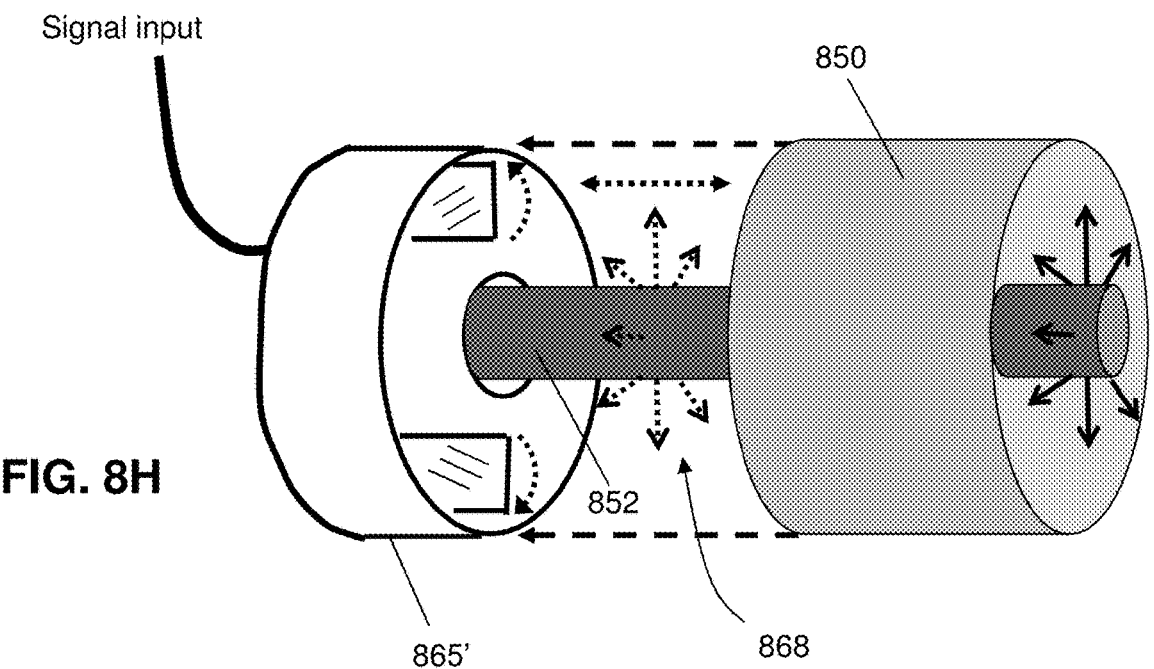

In an embodiment, cable 862 can comprise any of the embodiments of cable 850 described earlier. In this embodiment, waveguides 865 and 865' can be coupled to a transmission core 852 of cable 850 as depicted in FIGS. 8G and 8H. The waveguides 865 and 865' can induce, as previously described, electromagnetic waves 868 on the transmission core 852 for propagation entirely or partially within inner layers of cable 850.

It is noted that for the foregoing embodiments of FIGS. 8E, 8F, 8G and 8H, electromagnetic waves 868 can be bidirectional. For example, electromagnetic waves 868 of a different operating frequency can be received by slots 863 or MMICs 870 of the waveguides 865 and 865', respectively. Once received, the electromagnetic waves can be converted by a receiver circuit (e.g., see reference 101 of FIG. 1) for generating a communication signal for processing.

Although not shown, it is further noted that the waveguides 865 and 865' can be adapted so that the waveguides 865 and 865' can direct electromagnetic waves 868 upstream or downstream longitudinally. For example, a first tapered horn 880 coupled to a first instance of a waveguide 865 or 865' can be directed westerly on cable 862, while a second tapered horn 880 coupled to a second instance of a waveguide 865 or 865' can be directed easterly on cable 862. The first and second instances of the waveguides 865 or 865' can be coupled so that in a repeater configuration, signals received by the first waveguide 865 or 865' can be provided to the second waveguide 865 or 865' for retransmission in an easterly direction on cable 862. The repeater configuration just described can also be applied from an easterly to westerly direction on cable 862.

Figure 8I:
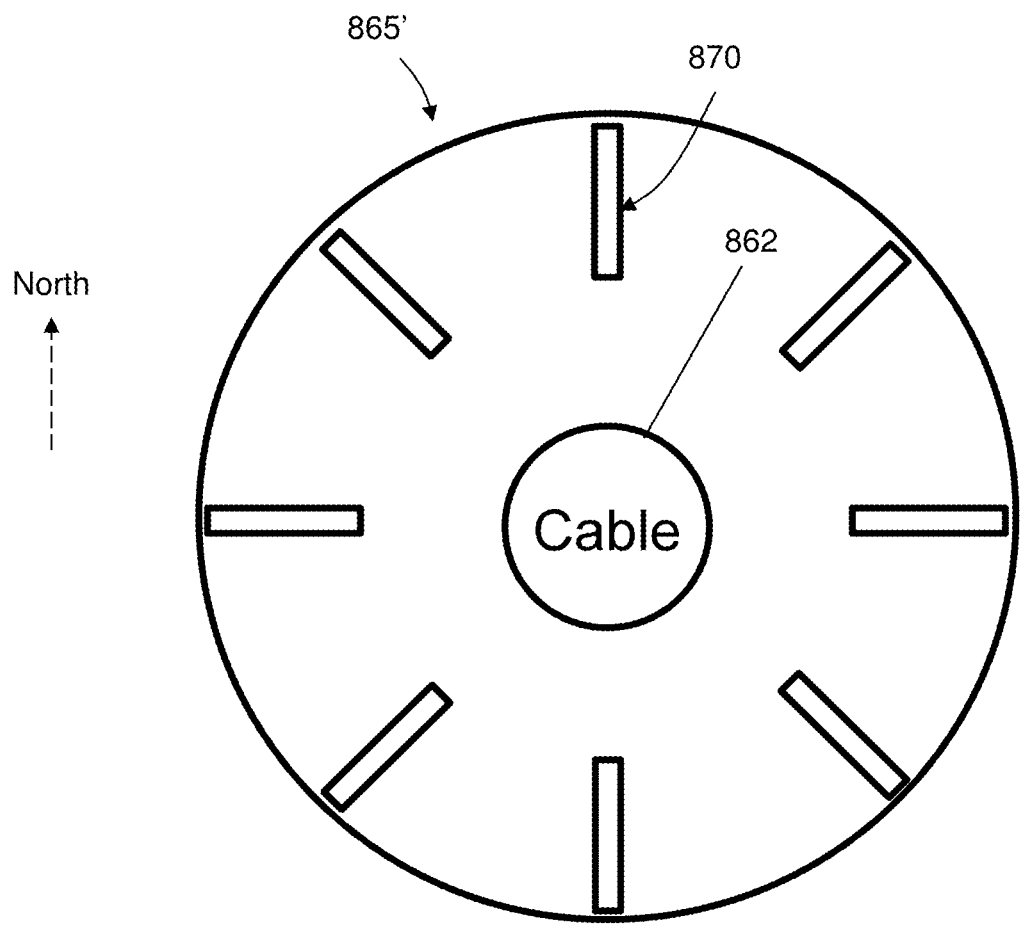

In another embodiment, the waveguide 865' of FIGS. 8E, 8F, 8G and 8H can also be configured to generate electromagnetic waves having non-fundamental wave modes. This can be accomplished by adding more MMICs 870 as depicted in FIG. 8I. Each MMIC 870 can be configured to receive the same signal input 872. However, MMICs 870 can selectively be configured to emit electromagnetic waves having differing phases using controllable phase-shifting circuitry in each MMIC 870. For example, the northerly and southerly MMICs 870 can be configured to emit electromagnetic waves having a 180-degree phase difference, thereby aligning the e-fields either in a northerly or southerly direction. Any combination of pairs of MMICs 870 (e.g., westerly and easterly MMICs 870, northwesterly and southeasterly MMICs 870, northeasterly and southwesterly MMICs 870) can be configured with opposing or aligned e-fields. Consequently, waveguide 865' can be configured to generate electromagnetic waves with one or more non-fundamental wave modes such as TMnm, HEnm or EHnm modes where n and m are non-negative integers and either n or m is non-zero, electromagnetic waves with one or more fundamental wave modes such as TM00, or any combinations thereof.

It is submitted that it is not necessary to select slots 863 in pairs to generate electromagnetic waves having a non-fundamental wave mode. For example, electromagnetic waves having a non-fundamental wave mode can be generated by enabling a single slot from a plurality of slots and disabling all other slots. In particular, a single MMIC 870 of the MMICs 870 shown in FIG. 8K can be configured to generate electromagnetic waves having a non-fundamental wave mode while all other MMICs 870 are not in use or disabled. Likewise, other wave modes and wave mode combinations can be induced by enabling other non-null proper subsets of waveguide slots 863 or the MMICs 870.

It is further noted that in some embodiments, the waveguide systems 865 and 865' may generate combinations of fundamental and non-fundamental wave modes where one wave mode is dominant over the other. For example, in one embodiment electromagnetic waves generated by the waveguide systems 865 and 865' may have a weak signal component that has a non-fundamental wave mode, and a substantially strong signal component that has a fundamental wave mode. Accordingly, in this embodiment, the electromagnetic waves have a substantially fundamental wave mode. In another embodiment electromagnetic waves generated by the waveguide systems 865 and 865' may have a weak signal component that has a fundamental wave mode, and a substantially strong signal component that has a non-fundamental wave mode. Accordingly, in this embodiment, the electromagnetic waves have a substantially non-fundamental wave mode. Further, a non-dominant wave mode may be generated that propagates only trivial distances along the length of the transmission medium.

It is also noted that the waveguide systems 865 and 865' can be configured to generate instances of electromagnetic waves that have wave modes that can differ from a resulting wave mode or modes of the combined electromagnetic wave. It is further noted that each MMIC 870 of the waveguide system 865' of FIG. 8I can be configured to generate an instance of electromagnetic waves having wave characteristics that differ from the wave characteristics of another instance of electromagnetic waves generated by another MMIC 870. One MMIC 870, for example, can generate an instance of an electromagnetic wave having a spatial orientation and a phase, frequency, magnitude, electric field orientation, and/or magnetic field orientation that differs from the spatial orientation and phase, frequency, magnitude, electric field orientation, and/or magnetic field orientation of a different instance of another electromagnetic wave generated by another MMIC 870. The waveguide system 865' can thus be configured to generate instances of electromagnetic waves having different wave and spatial characteristics, which when combined achieve resulting electromagnetic waves having one or more desirable wave modes.

From these illustrations, it is submitted that the waveguide systems 865 and 865' can be adapted to generate electromagnetic waves with one or more selectable wave modes. In one embodiment, for example, the waveguide systems 865 and 865' can be adapted to select one or more wave modes and generate electromagnetic waves having a single wave mode or multiple wave modes selected and produced from a process of combining instances of electromagnetic waves having one or more configurable wave and spatial characteristics. In an embodiment, for example, parametric information can be stored in a look-up table. Each entry in the look-up table can represent a selectable wave mode. A selectable wave mode can represent a single wave mode, or a combination of wave modes. The combination of wave modes can have one or dominant wave modes. The parametric information can provide configuration information for generating instances of electromagnetic waves for producing resultant electromagnetic waves that have the desired wave mode.

For example, once a wave mode or modes is selected, the parametric information obtained from the look-up table from the entry associated with the selected wave mode(s) can be used to identify which of one or more MMICs 870 to utilize, and/or their corresponding configurations to achieve electromagnetic waves having the desired wave mode(s). The parametric information may identify the selection of the one or more MMICs 870 based on the spatial orientations of the MMICs 870, which may be required for producing electromagnetic waves with the desired wave mode. The parametric information can also provide information to configure each of the one or more MMICs 870 with a particular phase, frequency, magnitude, electric field orientation, and/or magnetic field orientation which may or may not be the same for each of the selected MMICs 870. A look-up table with selectable wave modes and corresponding parametric information can be adapted for configuring the slotted waveguide system 865.

In some embodiments, a guided electromagnetic wave can be considered to have a desired wave mode if the corresponding wave mode propagates non-trivial distances on a transmission medium and has a field strength that is substantially greater in magnitude (e.g., 20 dB higher in magnitude) than other wave modes that may or may not be desirable. Such a desired wave mode or modes can be referred to as dominant wave mode(s) with the other wave modes being referred to as non-dominant wave modes. In a similar fashion, a guided electromagnetic wave that is said to be substantially without the fundamental wave mode has either no fundamental wave mode or a non-dominant fundamental wave mode. A guided electromagnetic wave that is said to be substantially without a non-fundamental wave mode has either no non-fundamental wave mode(s) or only non-dominant non-fundamental wave mode(s). In some embodiments, a guided electromagnetic wave that is said to have only a single wave mode or a selected wave mode may have only one corresponding dominant wave mode.

Figure 9A:
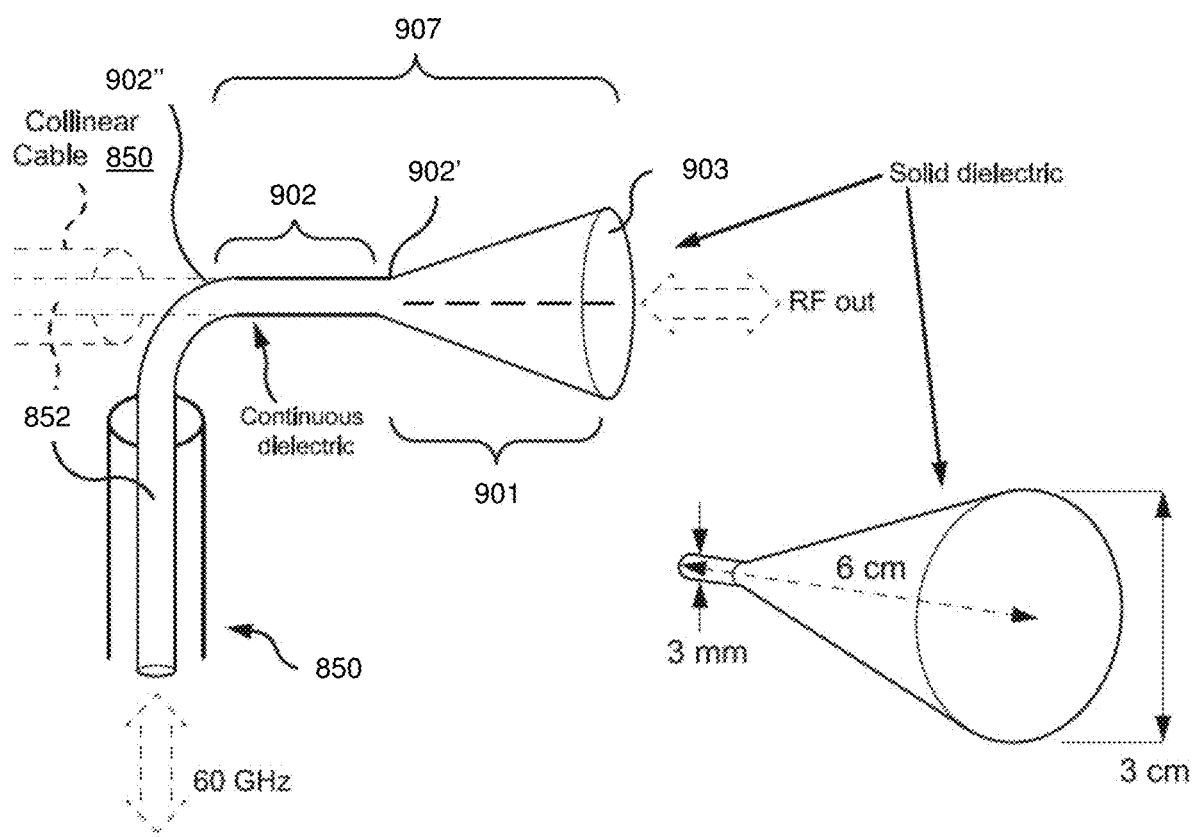
FIGS. 9A and 9B are block diagrams illustrating example, non-limiting embodiments of a dielectric antenna and corresponding gain and field intensity plots in accordance with various aspects described herein.
Figure 9B:
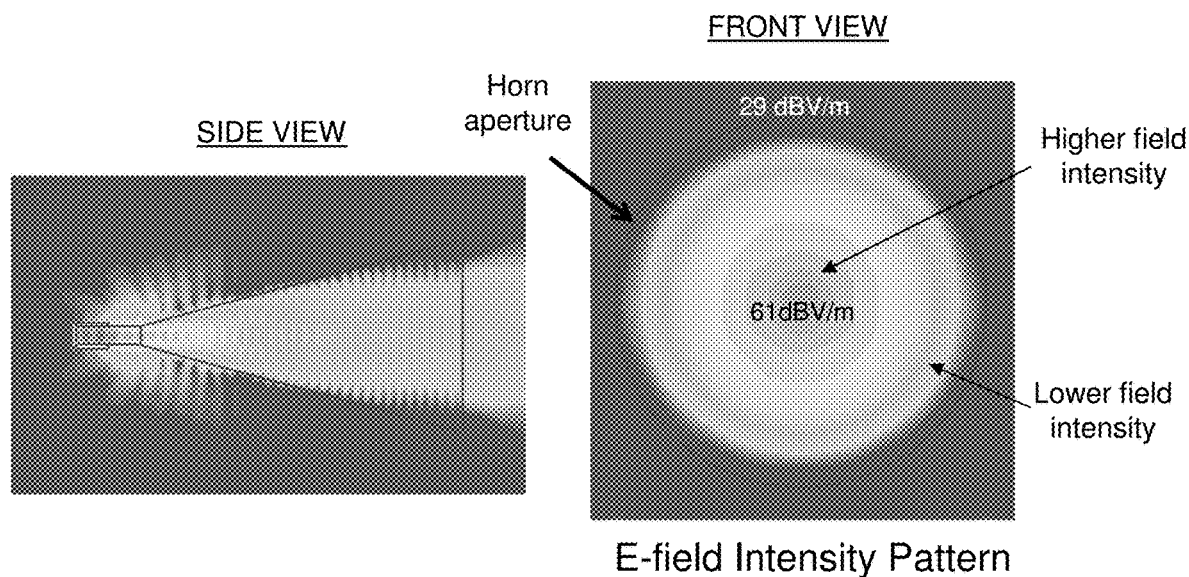
Figure 9B:
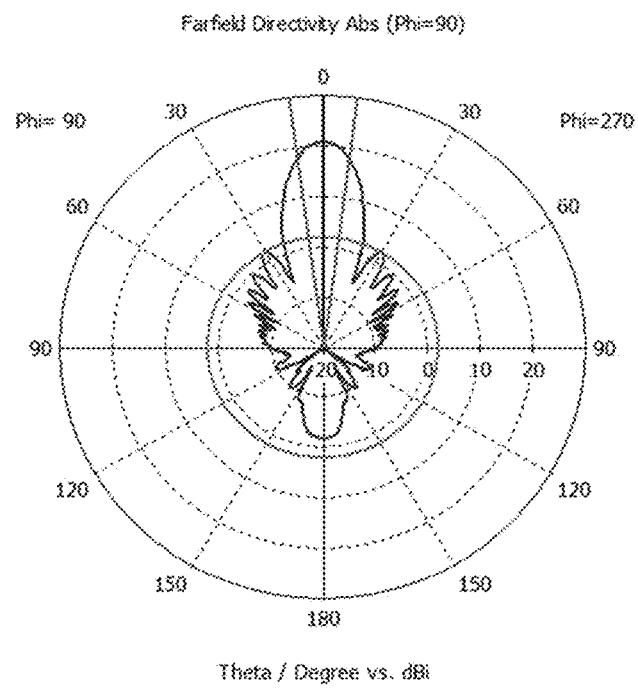

Turning now to FIGS. 9A and 9B, block diagrams illustrating example, non-limiting embodiments of a dielectric antenna and corresponding gain and field intensity plots in accordance with various aspects described herein are shown. FIG. 9A depicts a dielectric horn antenna 901 having a conical structure. The dielectric horn antenna 901 is coupled to one end 902' of a feedline 902 having a feed point 902" at an opposite end of the feedline 902. The dielectric horn antenna 901 and the feedline 902 (as well as other embodiments of the dielectric antenna described below in the subject disclosure) can be constructed of dielectric materials such as a polyethylene material, a polyurethane material or other suitable dielectric material (e.g., a synthetic resin, other plastics, etc.). The dielectric horn antenna 901 and the feedline 902 (as well as other embodiments of the dielectric antenna described below in the subject disclosure) can be conductorless and/or be substantially or entirely devoid of any conductive materials.

For example, the external surfaces 907 of the dielectric horn antenna 901 and the feedline 902 can be non-conductive or substantially non-conductive with at least 95% of the external surface area being non-conductive and the dielectric materials used to construct the dielectric horn antenna 901 and the feedline 902 can be such that they substantially do not contain impurities that may be conductive (e.g., such as less than 1 part per thousand) or result in imparting conductive properties. In other embodiments, however, a limited number of conductive components can be used such as a metallic connector component used for coupling to the feed point 902" of the feedline 902 with one or more screws, rivets or other coupling elements used to bind components to one another, and/or one or more structural elements that do not significantly alter the radiation pattern of the dielectric antenna.

The feed point 902" can be adapted to couple to a core 852 such as core 802 previously described by way of illustration in FIG. 8A. In one embodiment, the feed point 902" can be coupled to the core 852 utilizing a joint (not shown in FIG. 9A). Other embodiments for coupling the feed point 902" to the core 852 can be used. In an embodiment, the joint can be configured to cause the feed point 902" to touch an endpoint of the core 852. In another embodiment, the joint can create a gap between the feed point 902" and an end of the core 852. In yet another embodiment, the joint can cause the feed point 902" and the core 852 to be coaxially aligned or partially misaligned. Notwithstanding any combination of the foregoing embodiments, electromagnetic waves can in whole or at least in part propagate between the junction of the feed point 902" and the core 852.

The cable 850 can be coupled to the waveguide system 865 or the waveguide system 865'. For illustration purposes only, reference will be made to the waveguide system 865'. It is understood, however, that the waveguide system 865 or other waveguide systems can also be utilized in accordance with the discussions that follow. The waveguide system 865' can be configured to select a wave mode (e.g., non-fundamental wave mode, fundamental wave mode, a hybrid wave mode, or combinations thereof as described earlier) and transmit instances of electromagnetic waves having a non-optical operating frequency (e.g., 60 GHz). The electromagnetic waves can be directed to an interface of the cable 850.

The instances of electromagnetic waves generated by the waveguide system 865' can induce a combined electromagnetic wave having the selected wave mode that propagates from the core 852 to the feed point 902". The combined electromagnetic wave can propagate partly inside the core 852 and partly on an outer surface of the core 852. Once the combined electromagnetic wave has propagated through the junction between the core 852 and the feed point 902", the combined electromagnetic wave can continue to propagate partly inside the feedline 902 and partly on an outer surface of the feedline 902. In some embodiments, the portion of the combined electromagnetic wave that propagates on the outer surface of the core 852 and the feedline 902 is small. In these embodiments, the combined electromagnetic wave can be said to be guided by and tightly coupled to the core 852 and the feedline 902 while propagating longitudinally towards the dielectric antenna 901.

When the combined electromagnetic wave reaches a proximal portion of the dielectric antenna 901 (at a junction 902' between the feedline 902 and the dielectric antenna 901), the combined electromagnetic wave enters the proximal portion of the dielectric antenna 901 and propagates longitudinally along an axis of the dielectric antenna 901 (shown as a hashed line). By the time the combined electromagnetic wave reaches the aperture 903, the combined electromagnetic wave has an intensity pattern similar to the one shown by the side view and front view depicted in FIG. 9B. The electric field intensity pattern of FIG. 9B shows that the electric fields of the combined electromagnetic waves are strongest in a center region of the aperture 903 and weaker in the outer regions. In an embodiment, where the wave mode of the electromagnetic waves propagating in the dielectric antenna 901 is a hybrid wave mode (e.g., HE11), the leakage of the electromagnetic waves at the external surfaces 907 is reduced or in some instances eliminated. It is further noted that while the dielectric antenna 901 is constructed of a solid dielectric material having no physical opening, the front or operating face of the dielectric antenna 901 from which free space wireless signals are radiated or received will be referred to as the aperture 903 of the dielectric antenna 901 even though in some prior art systems the term aperture may be used to describe an opening of an antenna that radiates or receives free space wireless signals. Methods for launching a hybrid wave mode on cable 850 is discussed below.

In an embodiment, the far-field antenna gain pattern depicted in FIG. 9B can be widened by decreasing the operating frequency of the combined electromagnetic wave from a nominal frequency. Similarly, the gain pattern can be narrowed by increasing the operating frequency of the combined electromagnetic wave from the nominal frequency. Accordingly, a width of a beam of wireless signals emitted by the aperture 903 can be controlled by configuring the waveguide system 865' to increase or decrease the operating frequency of the combined electromagnetic wave.

The dielectric antenna 901 of FIG. 9A can also be used for receiving wireless signals, such as free space wireless signals transmitted by either a similar antenna or conventional antenna design. Wireless signals received by the dielectric antenna 901 at the aperture 903 induce electromagnetic waves in the dielectric antenna 901 that propagate towards the feedline 902. The electromagnetic waves continue to propagate from the feedline 902 to the junction between the feed point 902" and an endpoint of the core 852 and are thereby delivered to the waveguide system 865' coupled to the cable 850. In this configuration, the waveguide system 865' can perform bidirectional communications utilizing the dielectric antenna 901. It is further noted that in some embodiments the core 852 of the cable 850 (shown with dashed lines) can be configured to be collinear with the feed point 902" to avoid a bend shown in FIG. 9A. In some embodiments, a collinear configuration can reduce an alteration in the propagation of the electromagnetic due to the bend in cable 850.

Figure 9C:
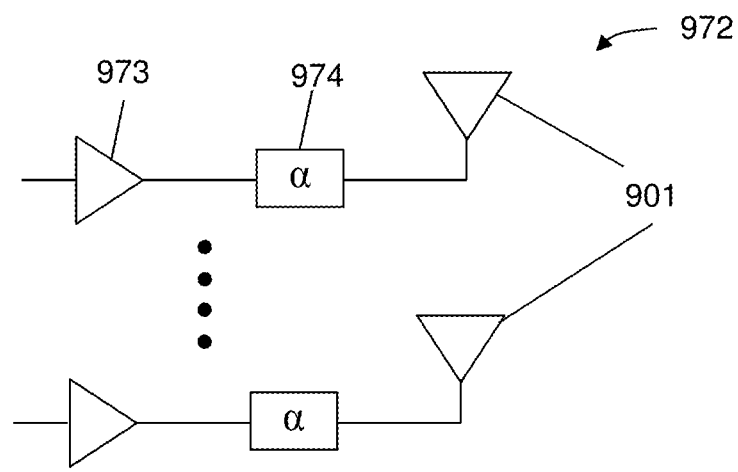
FIG. 9C is a block diagram of an example, non-limiting embodiment of an array of dielectric antennas configurable for steering wireless signals in accordance with various aspects described herein.
Figure 9C:
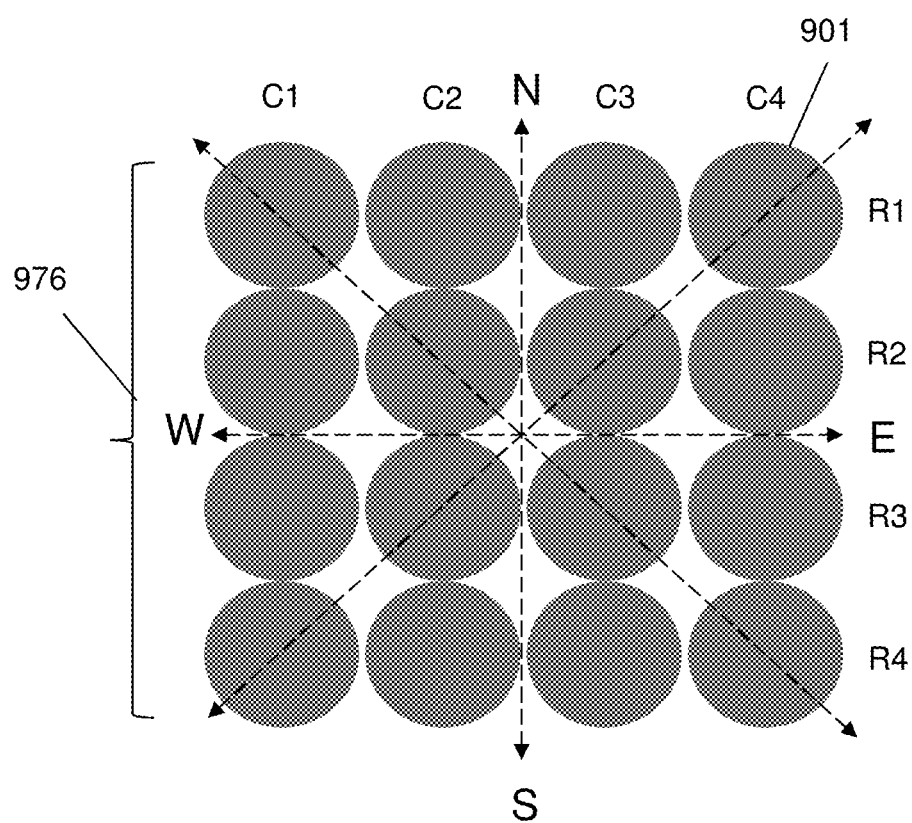

Turning now to FIG. 9C, block diagrams of example, non-limiting embodiments of an array 976 of dielectric antennas 901 configurable for steering wireless signals in accordance with various aspects described herein is shown. The array 976 of dielectric antennas 901 can be conical shaped antennas 901 or pyramidal-shaped dielectric antennas 901'. To perform beam steering, a waveguide system coupled to the array 976 of dielectric antennas 901 can be adapted to utilize a circuit 972 comprising amplifiers 973 and phase shifters 974, each pair coupled to one of the dielectric antennas 901 in the array 976. The waveguide system can steer far-field wireless signals from left to right (west to east) by incrementally increasing a phase delay of signals supplied to the dielectric antennas 901.

For example, the waveguide system can provide a first signal to the dielectric antennas of column 1 ("C1") having no phase delay. The waveguide system can further provide a second signal to column 2 ("C2"), the second signal comprising the first signal having a first phase delay. The waveguide system can further provide a third signal to the dielectric antennas of column 3 ("C3"), the third signal comprising the second signal having a second phase delay. Lastly, the waveguide system can provide a fourth signal to the dielectric antennas of column 4 ("C4"), the fourth signal comprising the third signal having a third phase delay. These phase shifted signals will cause far-field wireless signals generated by the array to shift from left to right. Similarly, far-field signals can be steered from right to left (east to west) ("C4" to "C1"), north to south ("R1" to "R4"), south to north ("R4" to "R1"), and southwest to northeast ("C1-R4" to "C4-R1").

Utilizing similar techniques beam steering can also be performed in other directions such as southwest to northeast by configuring the waveguide system to incrementally increase the phase of signals transmitted by the following sequence of antennas: "C1-R4", "C1-R3/C2-R4", "C1-R2/C2-R3/C3-R4", "C1-R1/C2-R2/C3- R3/C4-R4", "C2-R1/C3-R2/C4-R3", "C3-R1/C4-R2", "C4-R1". In a similar way, beam steering can be performed northeast to southwest, northwest to southeast, southeast to northwest, as well in other directions in three-dimensional space. Beam steering can be used, among other things, for aligning the array 976 of dielectric antennas 901 with a remote receiver and/or for directivity of signals to mobile communication devices. In some embodiments, a phased array 976 of dielectric antennas 901 can also be used to circumvent the use of the gimbal assembly or other actuated mount. While the foregoing has described beam steering controlled by phase delays, gain and phase adjustment can likewise be applied to the dielectric antennas 901 of the phased array 976 in a similar fashion to provide additional control and versatility in the formation of a desired beam pattern.

Figure 10A:
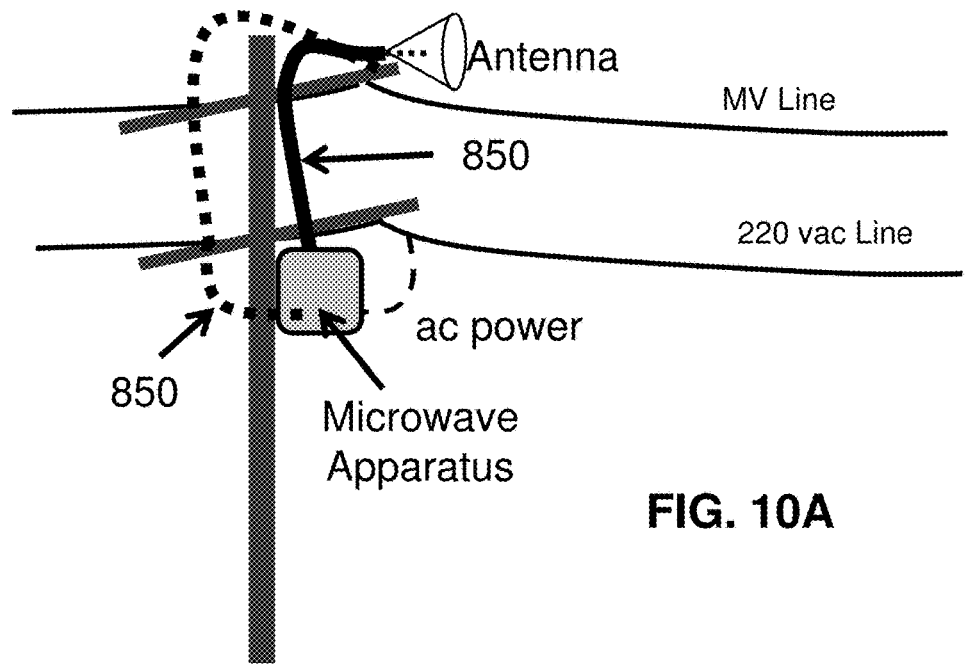
FIGS. 10A and 10B are block diagrams illustrating example, non-limiting embodiments of the transmission medium of FIG. 18A used for inducing guided electromagnetic waves on power lines supported by utility poles.
Figure 10B:
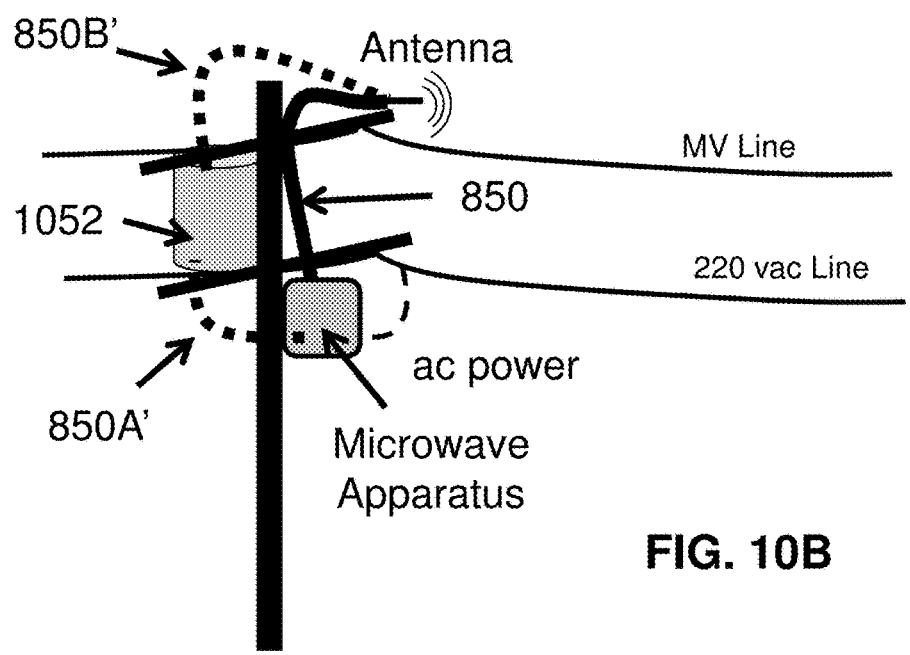

Turning now to FIGS. 10A and 10B, block diagrams illustrating example, non-limiting embodiments of the cable 850 of FIG. 8A used for inducing guided electromagnetic waves on power lines supported by utility poles. In one embodiment, as depicted in FIG. 10A, a cable 850 can be coupled at one end to a microwave apparatus that launches guided electromagnetic waves within one or more inner layers of cable 850 utilizing, for example, the hollow waveguide 808 shown in FIG. 8A. The microwave apparatus can utilize a microwave transceiver such as shown in FIG. 10 for transmitting or receiving signals from cable 850. The guided electromagnetic waves induced in the one or more inner layers of cable 850 can propagate to an exposed stub of the cable 850 located inside a horn antenna (shown as a dotted line in FIG. 10A) for radiating the electromagnetic waves via the horn antenna. The radiated signals from the horn antenna in turn can induce guided electromagnetic waves that propagate longitudinally on power line such as a medium voltage (MV) power line. In one embodiment, the microwave apparatus can receive AC power from a low voltage (e.g., 220V) power line. Alternatively, the horn antenna can be replaced with a stub antenna as shown in FIG. 10B to induce guided electromagnetic waves that propagate longitudinally on a power line such as the MV power line or to transmit wireless signals to other antenna system(s).

In an alternative embodiment, the hollow horn antenna shown in FIG. 10A can be replaced with a solid dielectric antenna such as the dielectric antenna 901 of FIG. 9A, or a pyramidal-shaped horn antenna. In this embodiment the horn antenna can radiate wireless signals directed to another horn antenna such as bidirectional horn antennas. In this embodiment, each horn antenna 1040 can transmit wireless signals to another horn antenna 1040 or receive wireless signals from the other horn antenna 1040. Such an arrangement can be used for performing bidirectional wireless communications between antennas. Although not shown, the horn antennas 1040 can be configured with an electromechanical device to steer a direction of the horn antennas 1040.

In alternate embodiments, first and second cables 850A' and 850B' can be coupled to the microwave apparatus and to a transformer 1052, respectively, as shown in FIGS. 10A and 10B. The first and second cables 850A' and 850B' can be represented by, for example, cable 800 each modified to have a conductive core. A first end of the conductive core of the first cable 850A' can be coupled to the microwave apparatus for propagating guided electromagnetic waves launched therein. A second end of the conductive core of the first cable 850A' can be coupled to a first end of a conductive coil of the transformer 1052 for receiving the guided electromagnetic waves propagating in the first cable 850A' and for supplying signals associated therewith to a first end of a second cable 850B' by way of a second end of the conductive coil of the transformer 1052. A second end of the second cable 850B' can be coupled to the horn antenna of FIG. 10A or can be exposed as a stub antenna of FIG. 10B for inducing guided electromagnetic waves that propagate longitudinally on the MV power line.

In an embodiment where cable 850, 850A' and 850B' each comprise multiple instances of transmission mediums 800, a poly-rod structure of antennas 855 can be formed such as shown in FIG. 8C. Each antenna 855 can be coupled, for example, to a horn antenna assembly as shown in FIG. 10A or a pie-pan antenna assembly (not shown) for radiating multiple wireless signals. Alternatively, the antennas 855 can be used as stub antennas in FIG. 10B. The microwave apparatus of FIGS. 10A-10B can be configured to adjust the guided electromagnetic waves to beam steer the wireless signals emitted by the antennas 855. One or more of the antennas 855 can also be used for inducing guided electromagnetic waves on a power line.

Figure 10C:
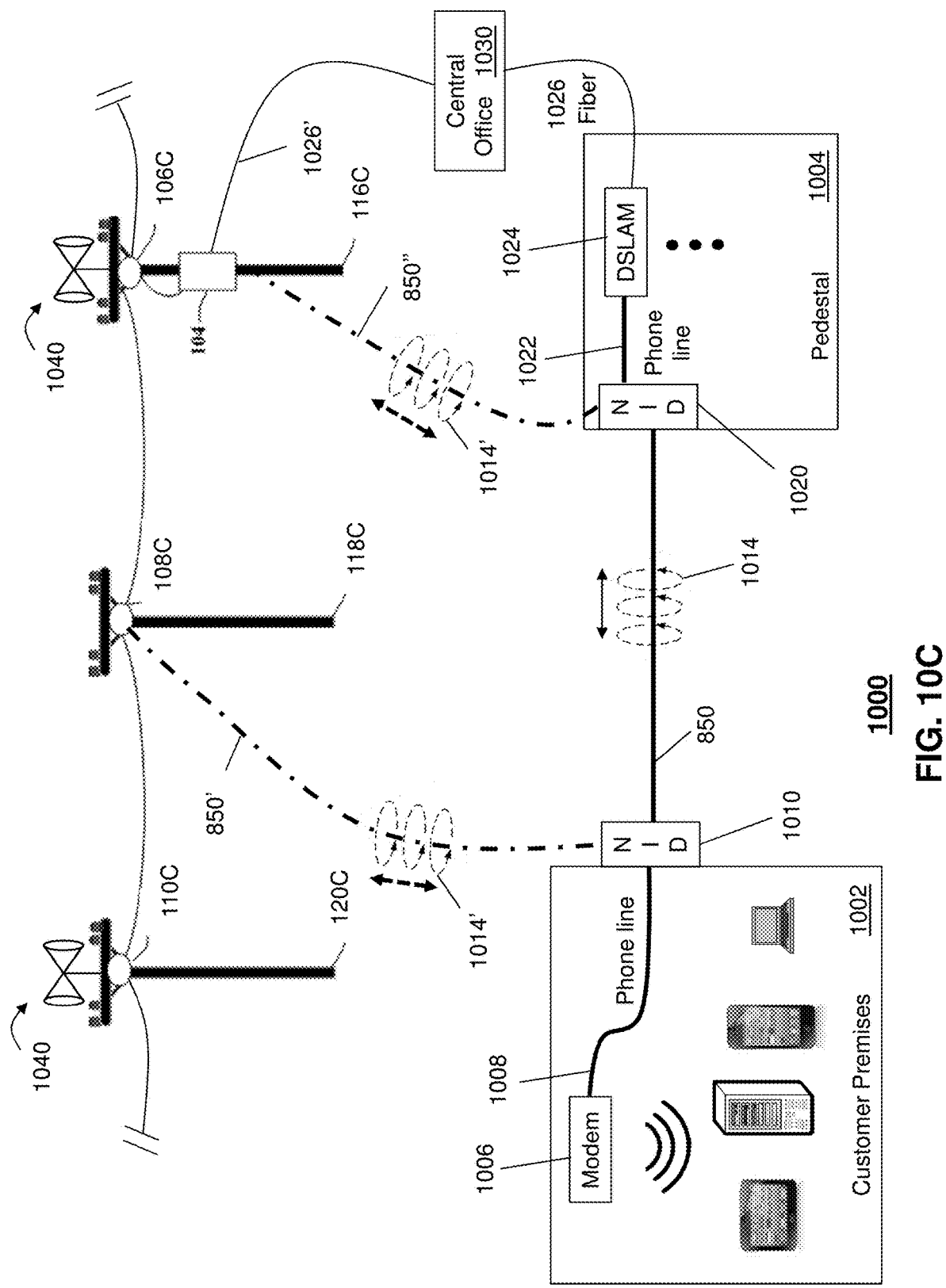
FIG. 10C is a block diagram of an example, non-limiting embodiment of a communication network in accordance with various aspects described herein.

Turning now to FIG. 10C, a block diagram of an example, non-limiting embodiment of a communication network 1000 in accordance with various aspects described herein is shown. In one embodiment, for example, a waveguide system can be incorporated into network interface devices (NIDs) such as NIDs 1010 and 1020 of FIG. 10C. A NID having the functionality of a waveguide system can be used to enhance transmission capabilities between customer premises 1002 (enterprise or residential) and a pedestal 1004 (sometimes referred to as a service area interface or SAI).

In one embodiment, a central office 1030 can supply one or more fiber cables 1026 to the pedestal 1004. The fiber cables 1026 can provide high-speed full-duplex data services (e.g., 1-100 Gbps or higher) to mini-DSLAMs 1024 located in the pedestal 1004. The data services can be used for transport of voice, internet traffic, media content services (e.g., streaming video services, broadcast TV), and so on. In prior art systems, mini-DSLAMs 1024 typically connect to twisted pair phone lines (e.g., twisted pairs included in category 5e or Cat. 5e unshielded twisted-pair (UTP) cables that include an unshielded bundle of twisted pair cables, such as 24 gauge insulated solid wires, surrounded by an outer insulating sheath), which in turn connect to the customer premises 1002 directly. In such systems, DSL data rates taper off at 100 Mbps or less due in part to the length of legacy twisted pair cables to the customer premises 1002 among other factors.

The embodiments of FIG. 10C, however, are distinct from prior art DSL systems. In the illustration of FIG. 10C, a mini-DSLAM 1024, for example, can be configured to connect to NID 1020 via cable 850 (which can represent in whole or in part any of the cable embodiments described in relation to FIG. 8A singly or in combination). Utilizing cable 850 between customer premises 1002 and a pedestal 1004, enables NIDs 1010 and 1020 to transmit and receive guide electromagnetic waves for uplink and downlink communications. Based on embodiments previously described, cable 850 can be exposed to rain, or can be buried without adversely affecting electromagnetic wave propagation either in a downlink path or an uplink path so long as the electric field profile of such waves in either direction is confined at least in part or entirely within inner layers of cable 850. In the present illustration, downlink communications represent a communication path from the pedestal 1004 to customer premises 1002, while uplink communications represent a communication path from customer premises 1002 to the pedestal 1004. In an embodiment where cable 850 includes an inner conductor, cable 850 can also serve the purpose of supplying power to the NID 1010 and 1020 and other equipment of the customer premises 1002 and the pedestal 1004.

In customer premises 1002, DSL signals can originate from a DSL modem 1006 (which may have a built-in router and which may provide wireless services such as Wi-Fi to user equipment shown in the customer premises 1002). The DSL signals can be supplied to NID 1010 by a twisted pair phone 1008. The NID 1010 can utilize the integrated waveguide to launch within cable 850 guided electromagnetic waves 1014 directed to the pedestal 1004 on an uplink path. In the downlink path, DSL signals generated by the mini-DSLAM 1024 can flow through a twisted pair phone line 1022 to NID 1020. The waveguide system integrated in the NID 1020 can convert the DSL signals, or a portion thereof, from electrical signals to guided electromagnetic waves 1014 that propagate within cable 850 on the downlink path. To provide full duplex communications, the guided electromagnetic waves 1014 on the uplink can be configured to operate at a different carrier frequency and/or a different modulation approach than the guided electromagnetic waves 1014 on the downlink to reduce or avoid interference. Additionally, on the uplink and downlink paths, the guided electromagnetic waves 1014 are guided by a core section of cable 850, as previously described, and such waves can be configured to have a field intensity profile that confines the guide electromagnetic waves in whole or in part in the inner layers of cable 850. Although the guided electromagnetic waves 1014 are shown outside of cable 850, the depiction of these waves is for illustration purposes only. For this reason, the guided electromagnetic waves 1014 are drawn with "hash marks" to indicate that they are guided by the inner layers of cable 850.

On the downlink path, the integrated waveguide system of NID 1010 receives the guided electromagnetic waves 1014 generated by NID 1020 and converts them back to DSL signals conforming to the requirements of the DSL modem 1006. The DSL signals are then supplied to the DSL modem 1006 via a set of twisted pair wires of phone line 1008 for processing. Similarly, on the uplink path, the integrated waveguide system of NID 1020 receives the guided electromagnetic waves 1014 generated by NID 1010 and converts them back to DSL signals conforming to the requirements of the mini-DSLAM 1024. The DSL signals are then supplied to the mini-DSLAM 1024 via a set of twisted pair wires of phone line 1022 for processing. Because of the short length of phone lines 1008 and 1022, the DSL modem 1006 and the mini-DSLAM 1024 can send and receive DSL signals between themselves on the uplink and downlink at very high speeds (e.g., 1 Gbps to 60 Gbps or more). Consequently, the uplink and downlink paths can in most circumstances exceed the data rate limits of traditional DSL communications over twisted pair phone lines.

Typically, DSL devices are configured for asymmetric data rates because the downlink path usually supports a higher data rate than the uplink path. However, cable 850 can provide much higher speeds both on the downlink and uplink paths. With a firmware update, a legacy DSL modem 1006 such as shown in FIG. 10C can be configured with higher speeds on both the uplink and downlink paths. Similar firmware updates can be made to the mini-DSLAM 1024 to take advantage of the higher speeds on the uplink and downlink paths. Since the interfaces to the DSL modem 1006 and mini-DSLAM 1024 remain as traditional twisted pair phone lines, no hardware change is necessary for a legacy DSL modem or legacy mini-DSLAM other than firmware changes and the addition of the NIDs 1010 and 1020 to perform the conversion from DSL signals to guided electromagnetic waves 1014 and vice-versa. The use of NIDs enables a reuse of legacy modems 1006 and mini-DSLAMs 1024, which in turn can substantially reduce installation costs and system upgrades. For new construction, updated versions of mini-DSLAMs and DSL modems can be configured with integrated waveguide systems to perform the functions described above, thereby eliminating the need for NIDs 1010 and 1020 with integrated waveguide systems. In this embodiment, an updated version of modem 1006 and updated version of mini-DSLAM 1024 would connect directly to cable 850 and communicate via bidirectional guided electromagnetic wave transmissions, thereby averting a need for transmission or reception of DSL signals using twisted pair phone lines 1008 and 1022.

In an embodiment where use of cable 1850 between the pedestal 1004 and customer premises 1002 is logistically impractical or costly, NID 1010 can be configured instead to couple to a cable 850' (similar to cable 1850 of the subject disclosure) that originates from a waveguide 108C on a utility pole 118C, and which may be buried in soil before it reaches NID 1010 of the customer premises 1002. Cable 850' can be used to receive and transmit guided electromagnetic waves 1014' between the NID 1010 and the waveguide 108C. Waveguide 108C can connect via waveguide 106C, which can be coupled to base station 104C. Base station 104C can provide data communication services to customer premises 1002 by way of its connection to central office 1030 over fiber 1026'. Similarly, in situations where access from the central office 1030 to pedestal 1004 is not practical over a fiber link, but connectivity to base station 104C is possible via fiber link 1026', an alternate path can be used to connect to NID 1020 of the pedestal 1004 via cable 850" (similar to cable 850 of the subject disclosure) originating from pole 116C. Cable 850" can also be buried before it reaches NID 1020.

Figure 10D:
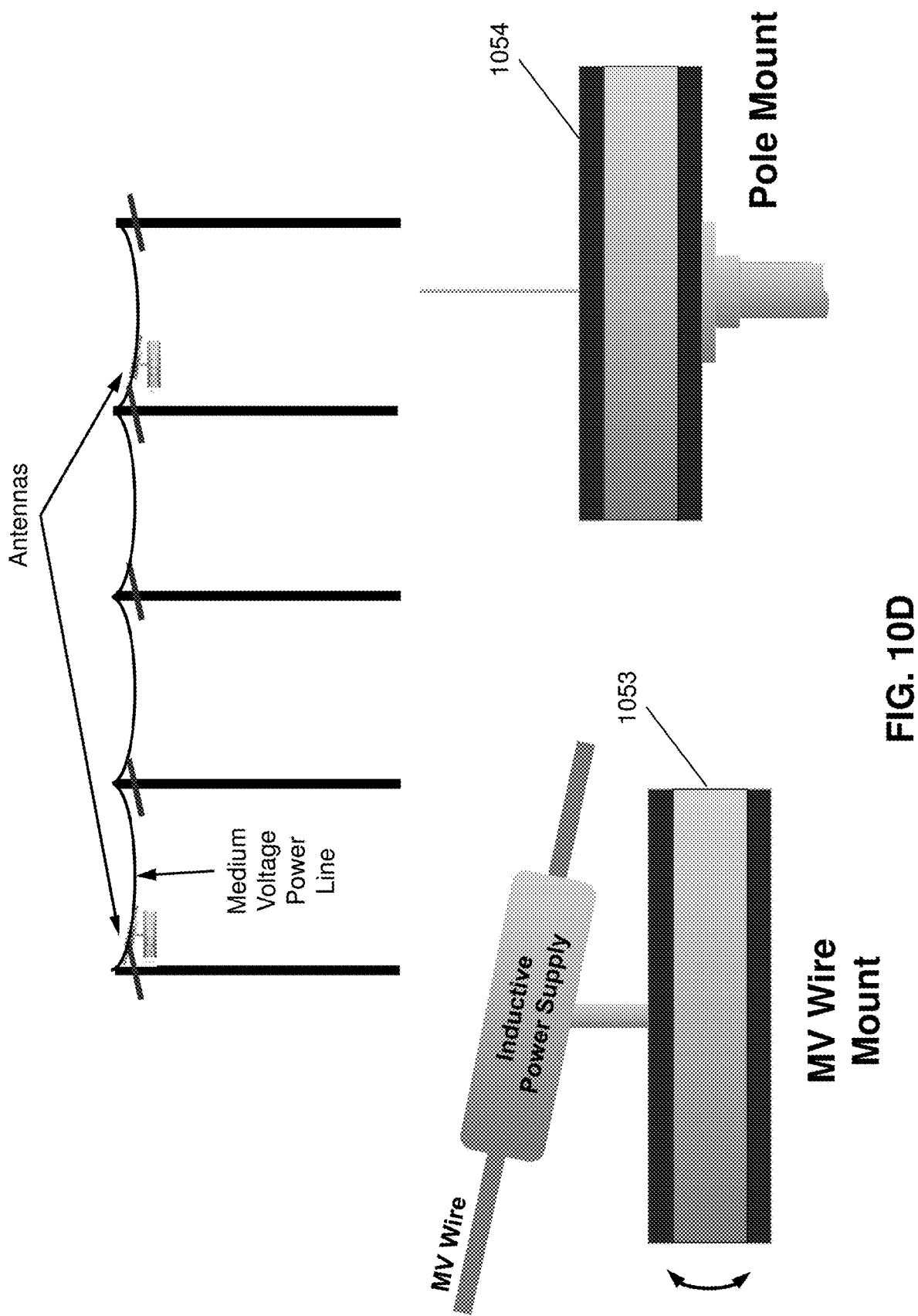
FIG. 10D is a block diagram of an example, non-limiting embodiment of an antenna mount for use in a communication network in accordance with various aspects described herein.
Figure 10E:
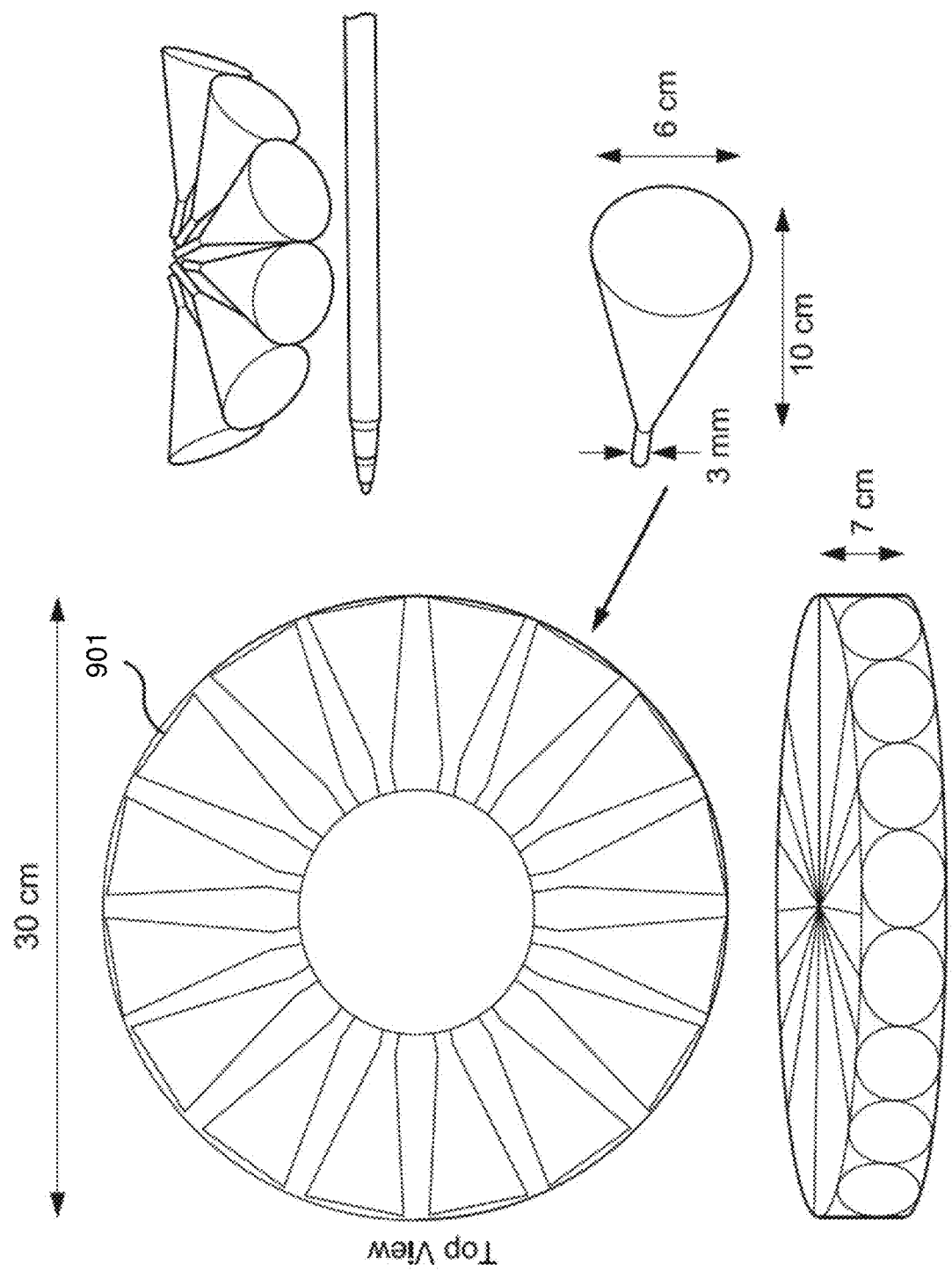
FIG. 10E is a block diagram of an example, non-limiting embodiment of an antenna mount for use in a communication network in accordance with various aspects described herein.

Turning now to FIGS. 10D and 10E, diagrams of example, non-limiting embodiments of antenna mounts that can be used in the communication network 1000 of FIG. 10C (or other suitable communication networks) in accordance with various aspects described herein are shown. In some embodiments, an antenna mount 1053 can be coupled to a medium voltage power line by way of an inductive power supply that supplies energy to one or more waveguide systems (not shown) integrated in the antenna mount 1053 as depicted in FIG. 10D. The antenna mount 1053 can include an array of dielectric antennas 901 (e.g., 16 antennas) such as shown by the top and side views depicted in FIG. 10E. The dielectric antennas 901 can be small in dimension. In other embodiments, a pole mounted antenna 1054 can be used as depicted in FIG. 10D. In yet other embodiments, an antenna mount can be attached to a pole with an arm assembly. In other embodiments, an antenna mount can be placed on a top portion of a pole coupled to a cable 800 or 836 such as the cables as described in the subject disclosure.

The array of dielectric antennas 901 of the antenna mount of FIG. 10D can include one or more waveguide systems as described in the subject disclosure by way of FIGS. 1-10E. The waveguide systems can be configured to perform beam steering with the array of dielectric antennas 901 (for transmission or reception of wireless signals). Alternatively, each dielectric antenna 901 can be utilized as a separate sector for receiving and transmitting wireless signals. In other embodiments, the one or more waveguide systems integrated in the antenna mount of FIG. 10D can be configured to utilize combinations of the dielectric antennas 901 in a wide range of multi-input multi-output (MIMO) transmission and reception techniques. The one or more waveguide systems integrated in the antenna mount of FIG. 10D can also be configured to apply communication techniques such as SISO, SIMO, MISO, MIMO, signal diversity (e.g., frequency, time, space, polarization, or other forms of signal diversity techniques), and so on, with any combination of the dielectric antennas 901 in any of the antenna mount of FIG. 10D. In yet other embodiments, the antenna mount of FIG. 10D can be adapted with two or more stacks of the antenna arrays shown in FIG. 10E.

Figure 11A:
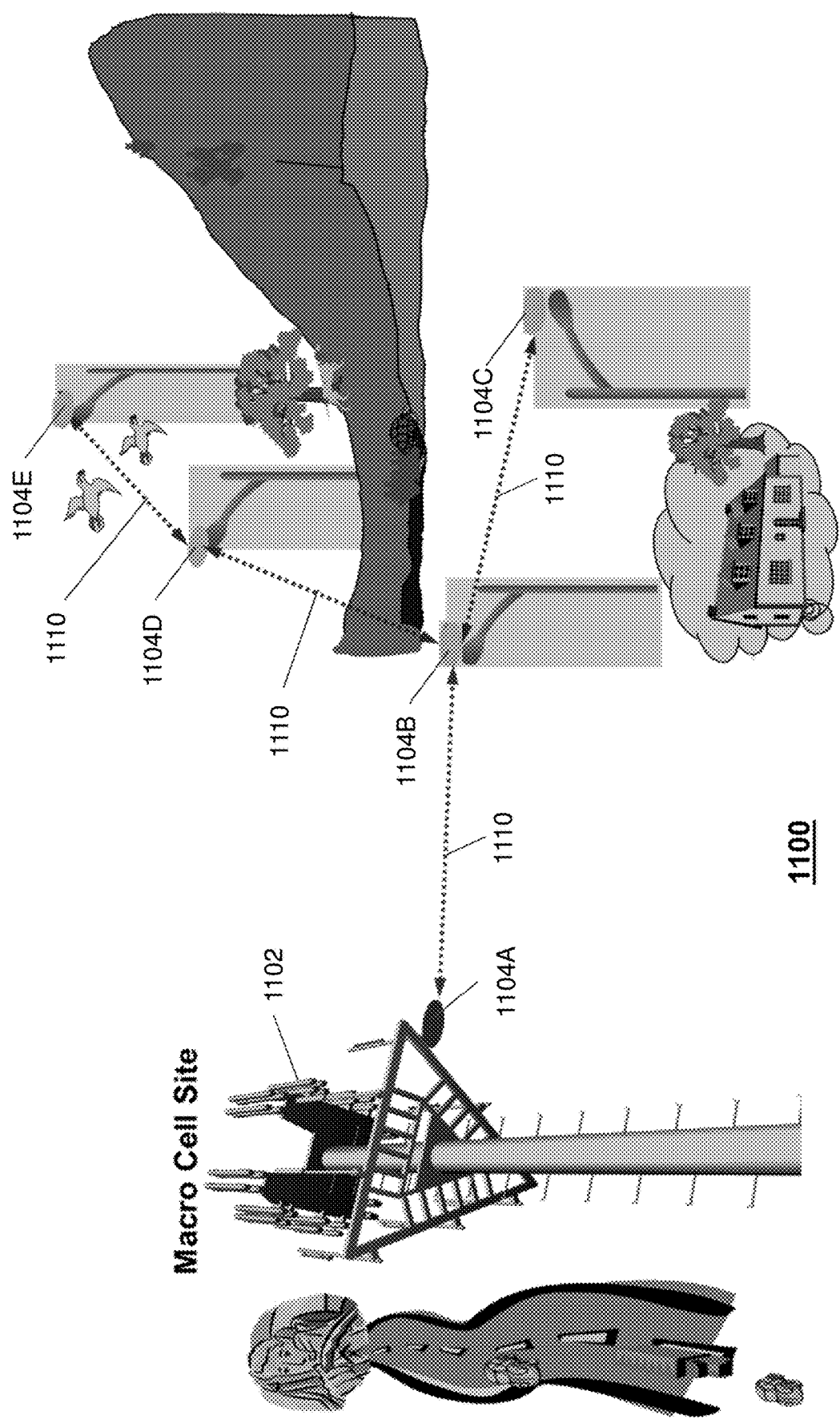
FIG. 11A is a block diagram illustrating an example, non-limiting embodiment of a communication system in accordance with various aspects described herein.

Turning now to FIG. 11A, a block diagram illustrating an example, non-limiting embodiment of a communication system 1100 in accordance with various aspects of the subject disclosure is shown. The communication system 1100 can include a macro base station 1102 such as a base station or access point having antennas that covers one or more sectors (e.g., 6 or more sectors). The macro base station 1102 can be communicatively coupled to a communication node 1104A that serves as a master or distribution node for other communication nodes 1104B-E distributed at differing geographic locations inside or beyond a coverage area of the macro base station 1102. The communication nodes 1104 operate as a distributed antenna system configured to handle communications traffic associated with client devices such as mobile devices (e.g., cell phones) and/or fixed/stationary devices (e.g., a communication device in a residence, or commercial establishment) that are wirelessly coupled to any of the communication nodes 1104. In particular, the wireless resources of the macro base station 1102 can be made available to mobile devices by allowing and/or redirecting certain mobile and/or stationary devices to utilize the wireless resources of a communication node 1104 in a communication range of the mobile or stationary devices.

The communication nodes 1104A-E can be communicatively coupled to each other over an interface 1110. In one embodiment, the interface 1110 can comprise a wired or tethered interface (e.g., fiber optic cable). In other embodiments, the interface 1110 can comprise a wireless RF interface forming a radio distributed antenna system. In various embodiments, the communication nodes 1104A-E can include one or more antennas, such as dielectric horn antennas or antenna arrays, poly rod antennas or antenna arrays or any of the other antennas described herein. The communication nodes 1104A-E can be configured to provide communication services to mobile and stationary devices according to instructions provided by the macro base station 1102. In other examples of operation however, the communication nodes 1104A-E operate merely as analog repeaters to spread the coverage of the macro base station 1102 throughout the entire range of the individual communication nodes 1104A-E.

The micro base stations (depicted as communication nodes 1104) can differ from the macro base station in several ways. For example, the communication range of the micro base stations can be smaller than the communication range of the macro base station. Consequently, the power consumed by the micro base stations can be less than the power consumed by the macro base station. The macro base station optionally directs the micro base stations as to which mobile and/or stationary devices they are to communicate with, and which carrier frequency, spectral segment(s) and/or timeslot schedule of such spectral segment(s) are to be used by the micro base stations when communicating with certain mobile or stationary devices. In these cases, control of the micro base stations by the macro base station can be performed in a master-slave configuration or other suitable control configurations. Whether operating independently or under the control of the macro base station 1102, the resources of the micro base stations can be simpler and less costly than the resources utilized by the macro base station 1102.

Figure 11B:
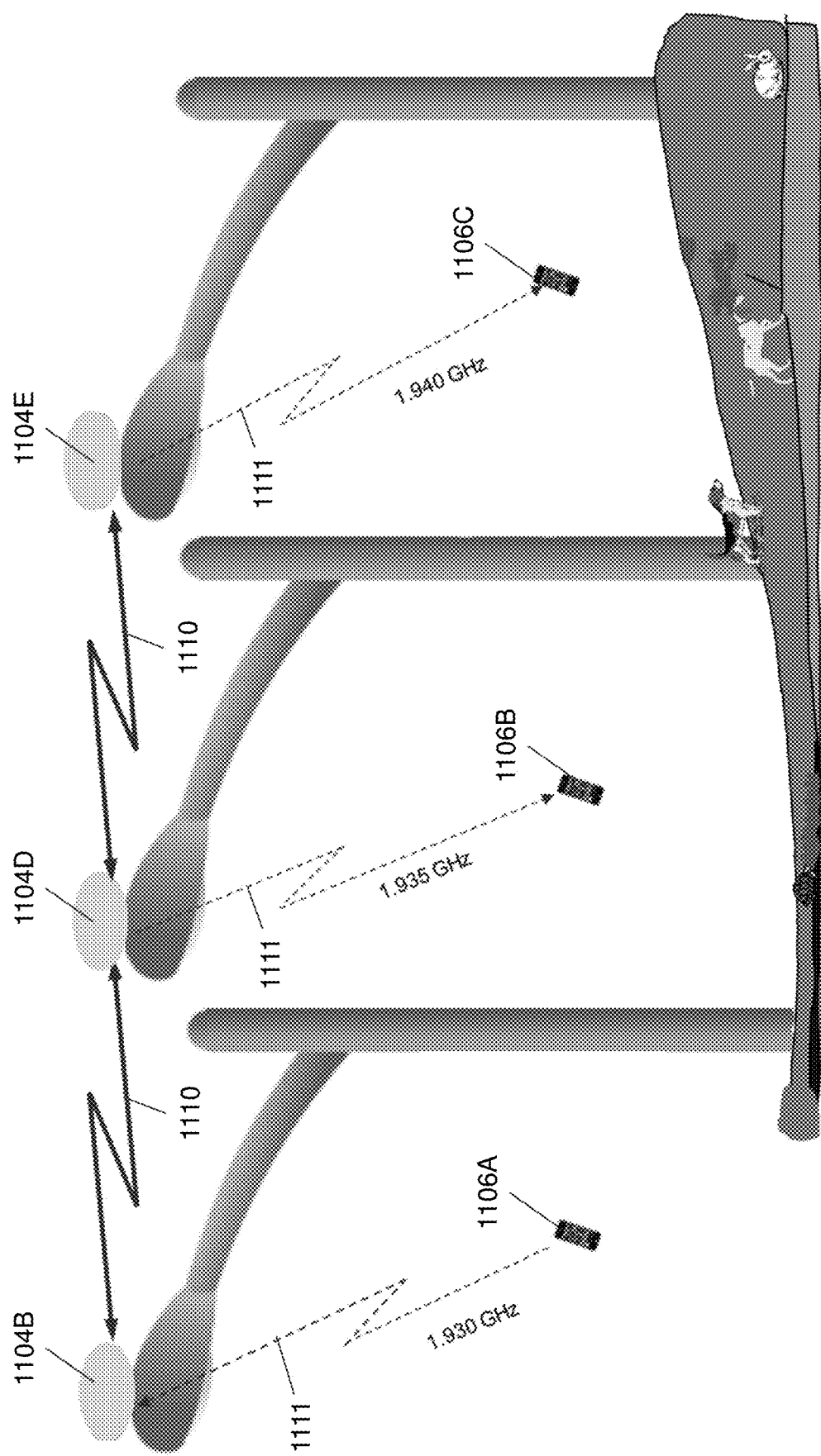
FIG. 11B is a block diagram illustrating an example, non-limiting embodiment of a portion of the communication system of FIG. 44A in accordance with various aspects described herein.

Turning now to FIG. 11B, a block diagram illustrating an example, non-limiting embodiment of the communication nodes 1104B-E of the communication system 1100 of FIG. 11A is shown. In this illustration, the communication nodes 1104B-E are placed on a utility fixture such as a light post. In other embodiments, some of the communication nodes 1104B-E can be placed on a building or a utility post or pole that is used for distributing power and/or communication lines. The communication nodes 1104B-E in these illustrations can be configured to communicate with each other over the interface 1110, which in this illustration is shown as a wireless interface. The communication nodes 1104B-E can also be configured to communicate with mobile or stationary devices 1106A-C over a wireless interface 1111 that conforms to one or more communication protocols (e.g., fourth generation (4G) wireless signals such as LTE signals or other 4G signals, fifth generation (5G) wireless signals, WiMAX, 802.11 signals, ultra-wideband signals, etc.). The communication nodes 1104 can be configured to exchange signals over the interface 1110 at an operating frequency that is may be higher (e.g., 28 GHz, 38 GHz, 60 GHz, 80 GHz or higher) than the operating frequency used for communicating with the mobile or stationary devices (e.g., 1.9 GHz) over interface 1111. The high carrier frequency and a wider bandwidth can be used for communicating between the communication nodes 1104 enabling the communication nodes 1104 to provide communication services to multiple mobile or stationary devices via one or more differing frequency bands, (e.g. a 900 MHz band, 1.9 GHz band, a 2.4 GHz band, and/or a 5.8 GHz band, etc.) and/or one or more differing protocols. In other embodiments, particularly where the interface 1110 is implemented via a guided wave communications system on a wire, a wideband spectrum in a lower frequency range (e.g. in the range of 2-6 GHz, 4-10 GHz, etc.) can be employed.

Figure 11C:
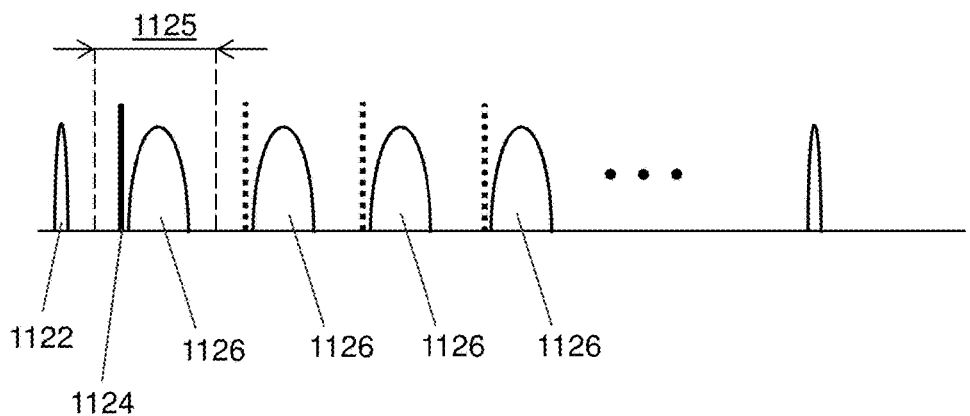
FIG. 11C is a graphical diagram illustrating an example, non-limiting embodiment of downlink and uplink communication techniques for enabling a base station to communicate with communication nodes in accordance with various aspects described herein.
Figure 11C:
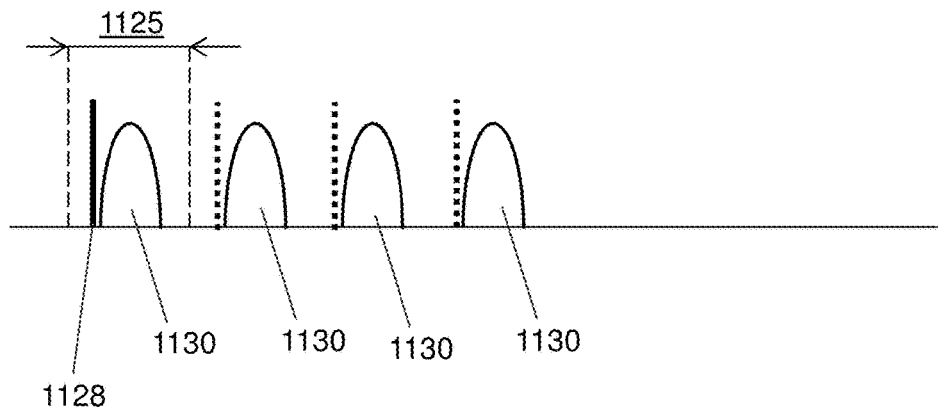

Turning now to FIG. 11C, a block diagram illustrating an example, non-limiting embodiment of downlink and uplink communication techniques for enabling a base station to communicate with the communication nodes 1104 of FIG. 11A is shown. In the illustrations of FIG. 11C, downlink signals (i.e., signals directed from the macro base station 1102 to the communication nodes 1104) can be spectrally divided into control channels 1122, downlink spectral segments 1126 each including modulated signals which can be frequency converted to their original/native frequency band (e.g., cellular band, or other native frequency band) for enabling the communication nodes 1104 to communicate with one or more mobile or stationary devices, and pilot signals 1124 which can be supplied with some or all of the spectral segments 1126 for mitigating distortion created between the communication nodes 1104. The pilot signals 1124 can be processed by tethered or wireless transceivers of downstream communication nodes 1104 to remove distortion from a receive signal (e.g., phase distortion). Each downlink spectral segment 1126 can be allotted a bandwidth 1125 sufficiently wide (e.g., 50 MHz) to include a corresponding pilot signal 1124 and one or more downlink modulated signals located in frequency channels (or frequency slots) in the spectral segment 1126. The modulated signals can represent cellular channels, WLAN channels or other modulated communication signals (e.g., 10-20 MHz), which can be used by the communication nodes 1104 for communicating with one or more mobile or stationary devices 1106.

Uplink modulated signals generated by mobile or stationary communication devices in their native/original frequency bands (e.g., cellular band, or other native frequency band) can be frequency converted and thereby located in frequency channels (or frequency slots) in the uplink spectral segment 1130. The uplink modulated signals can represent cellular channels, WLAN channels or other modulated communication signals. Each uplink spectral segment 1130 can be allotted a similar or same bandwidth 1125 to include a pilot signal 1128 which can be provided with some or each spectral segment 1130 to enable upstream communication nodes 1104 and/or the macro base station 1102 to remove distortion (e.g., phase error).

In the embodiment shown, the downlink and uplink spectral segments 1126 and 1130 each comprise a plurality of frequency channels (or frequency slots), which can be occupied with modulated signals that have been frequency converted from any number of native/original frequency bands (e.g. a 900 MHz band, 1.9 GHz band, a 2.4 GHz band, and/or a 5.8 GHz band, etc.). The modulated signals can be up converted to adjacent frequency channels in downlink and uplink spectral segments 1126 and 1130. In this fashion, while some adjacent frequency channels in a downlink spectral segment 1126 can include modulated signals originally in a same native/original frequency band, other adjacent frequency channels in the downlink spectral segment 1126 can also include modulated signals originally in different native/original frequency bands, but frequency converted to be located in adjacent frequency channels of the downlink spectral segment 1126. For example, a first modulated signal in a 1.9 GHz band and a second modulated signal in the same frequency band (i.e., 1.9 GHz) can be frequency converted and thereby positioned in adjacent frequency channels of a downlink spectral segment 1126. In another illustration, a first modulated signal in a 1.9 GHz band and a second communication signal in a different frequency band (i.e., 2.4 GHz) can be frequency converted and thereby positioned in adjacent frequency channels of a downlink spectral segment 1126. Accordingly, frequency channels of a downlink spectral segment 1126 can be occupied with any combination of modulated signals of the same or differing signaling protocols and of a same or differing native/original frequency bands.

Similarly, while some adjacent frequency channels in an uplink spectral segment 1130 can include modulated signals originally in a same frequency band, adjacent frequency channels in the uplink spectral segment 1130 can also include modulated signals originally in different native/original frequency bands, but frequency converted to be located in adjacent frequency channels of an uplink segment 1130. For example, a first communication signal in a 2.4 GHz band and a second communication signal in the same frequency band (i.e., 2.4 GHz) can be frequency converted and thereby positioned in adjacent frequency channels of an uplink spectral segment 1130. In another illustration, a first communication signal in a 1.9 GHz band and a second communication signal in a different frequency band (i.e., 2.4 GHz) can be frequency converted and thereby positioned in adjacent frequency channels of the uplink spectral segment 1126. Accordingly, frequency channels of an uplink spectral segment 1130 can be occupied with any combination of modulated signals of a same or differing signaling protocols and of a same or differing native/original frequency bands. It should be noted that a downlink spectral segment 1126 and an uplink spectral segment 1130 can themselves be adjacent to one another and separated by only a guard band or otherwise separated by a larger frequency spacing, depending on the spectral allocation in place.

It will be appreciated that downlink modulated signals generated by a base station in their native/original frequency bands (e.g., cellular band, or other native frequency band) can be frequency shifted to one of the downlink spectral segments 1126 without re-modulating the modulated signals. That is, frequency shifting the downlink modulated signals can include transitioning the downlink modulated signals from its native/original frequency bands to a spectral segment 1126 without modifying the signaling protocol (e.g., LTE, 5G, DOCSIS, etc.) and/or the modulation technique (e.g., orthogonal frequency-division multiple access; generally, referred to as OFDMA, etc.) used by the base station to generate the downlink modulated signal in its native/original frequency bands. Frequency shifting the downlink modulated signals in this manner preserves the signaling protocol and/or modulation technique used to generate the downlink modulated signals, and thereby enables any of the communication nodes 1104 to restore the downlink modulated signals in spectral segment 1126 to its respective native/original frequency bands with only a frequency conversion process.

Similarly, uplink modulated signals generated by mobile or stationary communication devices in their native/original frequency bands (e.g., cellular band, or other native frequency band) can be frequency shifted to one of the uplink spectral segments 1130 without re-modulating the modulated signals. That is, frequency shifting the uplink modulated signals can include transitioning the uplink modulated signals from its native/original frequency bands to a spectral segment 1130 without modifying the signaling protocol (e.g., LTE, 5G, DOCSIS, etc.) and/or the modulation technique (e.g., single carrier frequency-division multiple access; generally, referred to as SC-FDMA, etc.) used by the mobile or stationary communication devices to generate the uplink modulated signal in its native/original frequency bands. Frequency shifting the uplink modulated signals in this manner preserves the signaling protocol and/or modulation technique used to generate the uplink modulated signals, and thereby enables any of the communication nodes 1104 to restore the uplink modulated signals in spectral segment 1130 to its respective native/original frequency bands with only a frequency conversion process.

The foregoing frequency conversion processes can correspond to a frequency up-conversion, a frequency down-conversion, or a combination thereof. The frequency conversion process can be performed with analog circuitry (e.g., amplifiers, mixers, filters, etc.) without digital conversion, which can simplify the design requirements of the communication nodes 1104. Frequency conversion can be also performed via digital signal processing while preserving the signaling protocol and/or modulation technique, for example, by shifting the signals in the frequency domain. It will be appreciated that the foregoing principles of frequency conversion without modifying the signaling protocol and/or the modulation technique of previously modulated signals its native/original frequency bands can be applied to any embodiments of the subject disclosure including without limitation wireless signals propagating in free space between antenna systems of a distributed antenna system, and/or guided electromagnetic waves that propagate along a physical transmission medium.

Figure 11D:
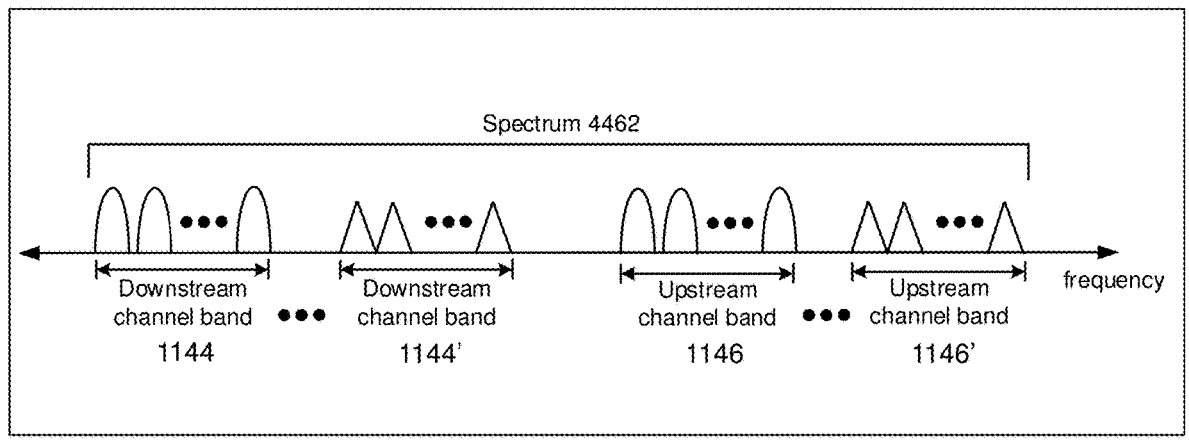
FIG. 11D is a graphical diagram illustrating an example, non-limiting embodiment of a frequency spectrum in accordance with various aspects described herein.

Turning now to FIG. 11D, a graphical diagram 1160 illustrating an example, non-limiting embodiment of a frequency spectrum is shown. In particular, a spectrum 1162 is shown for a distributed antenna system that conveys modulated signals occupying frequency channels of uplink or downlink spectral segments after they have been converted in frequency (e.g. via up-conversion or down-conversion) from one or more original/native spectral segments into the spectrum 1162.

As previously discussed, two or more different communication protocols can be employed to communicate upstream and downstream data. When two or more differing protocols are employed, a first subset of the downlink frequency channels of a downlink spectral segment 1126 can be occupied by frequency converted modulated signals in accordance with a first standard protocol and a second subset of the downlink frequency channels of the same or a different downlink spectral segment 1130 can be occupied by frequency converted modulated signals in accordance with a second standard protocol that differs from the first standard protocol. Likewise a first subset of the uplink frequency channels of an uplink spectral segment 1130 can be received by the system for demodulation in accordance with the first standard protocol and a second subset of the uplink frequency channels of the same or a different uplink spectral segment 1130 can be received in accordance with a second standard protocol for demodulation in accordance with the second standard protocol that differs from the first standard protocol.

In the example shown, the downstream channel band 1144 includes a first plurality of downstream spectral segments represented by separate spectral shapes of a first type representing the use of a first communication protocol. The downstream channel band 1144' includes a second plurality of downstream spectral segments represented by separate spectral shapes of a second type representing the use of a second communication protocol. Likewise, the upstream channel band 1146 includes a first plurality of upstream spectral segments represented by separate spectral shapes of the first type representing the use of the first communication protocol. The upstream channel band 1146' includes a second plurality of upstream spectral segments represented by separate spectral shapes of the second type representing the use of the second communication protocol. These separate spectral shapes are meant to be placeholders for the frequency allocation of each individual spectral segment along with associated reference signals, control channels and/or clock signals. While the individual channel bandwidth is shown as being roughly the same for channels of the first and second type, it should be noted that upstream and downstream channel bands 1144, 1144', 1146 and 1146' may be of differing bandwidths. Additionally, the spectral segments in these channel bands of the first and second type may be of differing bandwidths, depending on available spectrum and/or the communication standards employed.

Figure 11E:
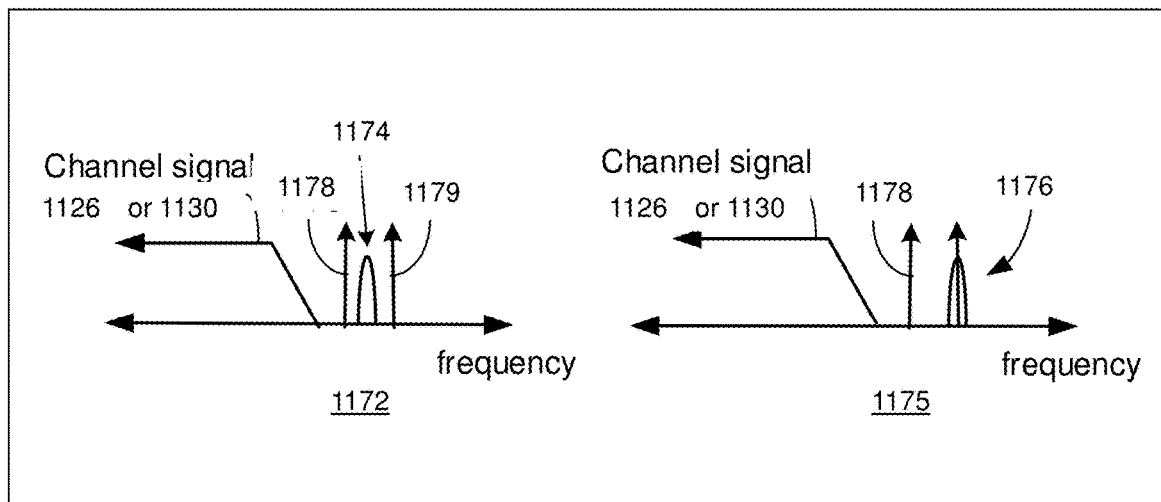
FIG. 11E is a graphical diagram illustrating an example, non-limiting embodiment of a frequency spectrum in accordance with various aspects described herein.

Turning now to FIG. 11E, a graphical diagram 1170 illustrating an example, non-limiting embodiment of a frequency spectrum is shown. In particular a portion of the spectrum 1162 of FIG. 11D is shown for a distributed antenna system that conveys modulated signals in the form of channel signals that have been converted in frequency (e.g. via up-conversion or down-conversion) from one or more original/native spectral segments.

The portion 1172 includes a portion of a downlink or uplink spectral segment 1126 and 1130 that is represented by a spectral shape and that represents a portion of the bandwidth set aside for a control channel, reference signal, and/or clock signal. The spectral shape 1174, for example, represents a control channel that is separate from reference signal 1179 and a clock signal 1178. It should be noted that the clock signal 1178 is shown with a spectral shape representing a sinusoidal signal that may require conditioning into the form of a more traditional clock signal. In other embodiments however, a traditional clock signal could be sent as a modulated carrier wave such by modulating the reference signal 1179 via amplitude modulation or other modulation technique that preserves the phase of the carrier for use as a phase reference. In other embodiments, the clock signal could be transmitted by modulating another carrier wave or as another signal. Further, it is noted that both the clock signal 1178 and the reference signal 1179 are shown as being outside the frequency band of the control channel 1174.

In another example, the portion 1175 includes a portion of a downlink or uplink spectral segment 1126 and 1130 that is represented by a portion of a spectral shape that represents a portion of the bandwidth set aside for a control channel, reference signal, and/or clock signal. The spectral shape 1176 represents a control channel having instructions that include digital data that modulates the reference signal, via amplitude modulation, amplitude shift keying or other modulation technique that preserves the phase of the carrier for use as a phase reference. The clock signal 1178 is shown as being outside the frequency band of the spectral shape 1176. The reference signal, being modulated by the control channel instructions, is in effect a subcarrier of the control channel and is in-band to the control channel. Again, the clock signal 1178 is shown with a spectral shape representing a sinusoidal signal, in other embodiments however, a traditional clock signal could be sent as a modulated carrier wave or other signal. In this case, the instructions of the control channel can be used to modulate the clock signal 1178 instead of the reference signal.

Consider the following example, where the control channel 1176 is carried via modulation of a reference signal in the form of a continuous wave (CW) from which the phase distortion in the receiver is corrected during frequency conversion of the downlink or uplink spectral segment 1126 and 1130 back to its original/native spectral segment. The control channel 1176 can be modulated with a robust modulation such as pulse amplitude modulation, binary phase shift keying, amplitude shift keying or other modulation scheme to carry instructions between network elements of the distributed antenna system such as network operations, administration and management traffic and other control data. In various embodiments, the control data can include without limitation: status information that indicates online status, offline status, and network performance parameters of each network element; network device information such as module names and addresses, hardware and software versions, device capabilities, etc.; spectral information such as frequency conversion factors, channel spacing, guard bands, uplink/downlink allocations, uplink and downlink channel selections, etc.; and/or environmental measurements such as weather conditions, image data, power outage information, line of sight blockages, etc.

In a further example, the control channel data can be sent via ultra-wideband (UWB) signaling. The control channel data can be transmitted by generating radio energy at specific time intervals and occupying a larger bandwidth, via pulse-position or time modulation, by encoding the polarity or amplitude of the UWB pulses and/or by using orthogonal pulses. In particular, UWB pulses can be sent sporadically at relatively low pulse rates to support time or position modulation but can also be sent at rates up to the inverse of the UWB pulse bandwidth. In this fashion, the control channel can be spread over an UWB spectrum with relatively low power, and without interfering with CW transmissions of the reference signal and/or clock signal that may occupy in-band portions of the UWB spectrum of the control channel.

Figure 12:
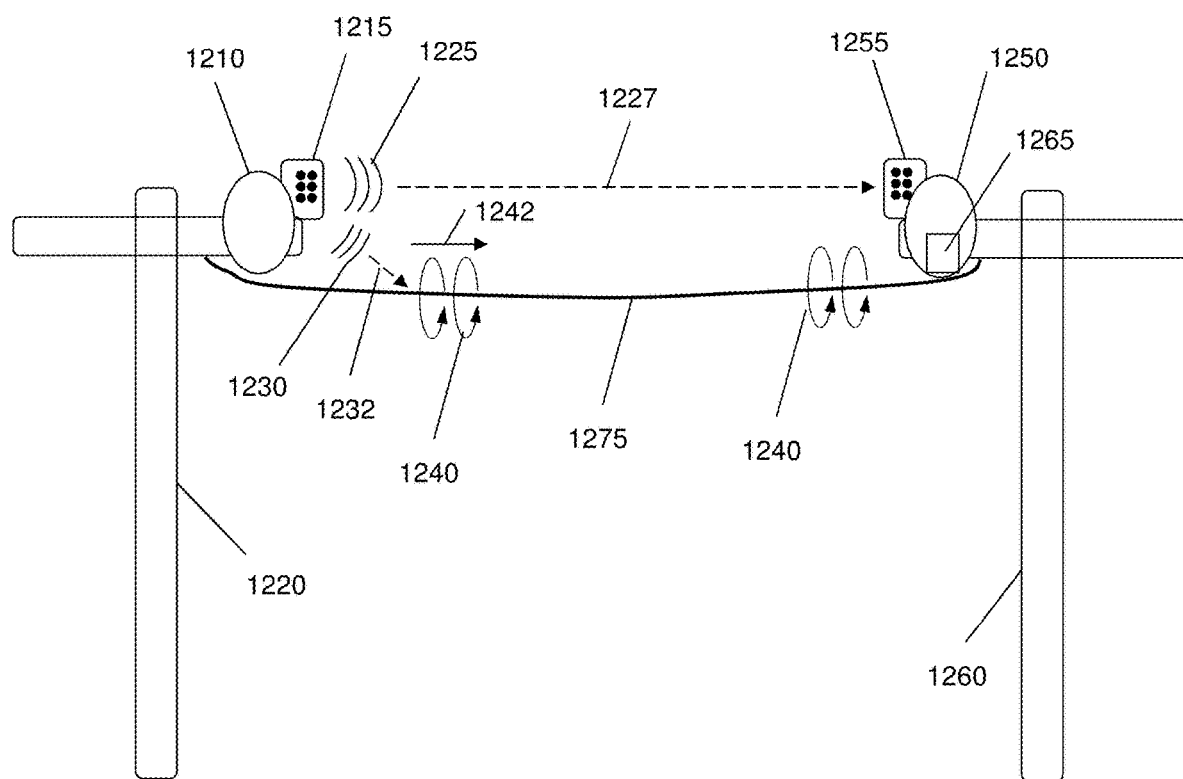
FIG. 12 is a block diagram illustrating an example, non-limiting embodiment of a communication system that utilizes beam steering in accordance with various aspects described herein.

In one or more embodiments in system 1200 of FIG. 12, communication device 1210 can include an antenna array 1215 for transmitting wireless signals. In one or more embodiments, the antenna array 1215 can perform beam steering. For example, the antenna array 1215 can utilize a first subset of antennas of the antenna array to transmit first wireless signals 1225 directed (as shown by reference number 1227) via beam steering towards the communication device 1250. A second subset of antennas of the antenna array 1215 can transmit second wireless signals 1230 directed (as shown by reference number 1232) via the beam steering towards a transmission medium 1275 (e.g., a power line connected between the utility poles 1220, 1260). In one or more embodiments, the aforementioned beams can be simultaneously created by the same set of antennas in arrays 1215 and 1255. In one or more embodiments, the beam steering can enable the antenna array to communicate with more than one wireless receiver with or without directing wireless signals to a transmission medium. In one or more embodiments, the beam steering can enable the antenna array to direct the wireless signals to more than one transmission medium with or without communicating with a wireless receiver.

The first and second wireless signals 1225, 1230 can be associated with communication signals that are to be transmitted over the network. For instance, the first and second wireless signals 1225, 1230 can be the same signals. In another example, the first wireless signals 1225 can represent a first subset of the communication signals, while the second wireless signals 1230 represent a second subset of the communication signals. In one embodiment, the first and second wireless signals 1225, 1230 can be different and can be based on interleaving of a group of communication signals, such as video packets, and so forth. The communication signals can be various types of signals including information associated with subscriber services, network control, testing, and so forth.

In one or more embodiments, the second wireless signals 1230 induce electromagnetic waves 1240. For example, the electromagnetic waves 1240 are induced at a physical interface of the transmission medium 1275 and propagate (as shown by reference number 1242) without requiring an electrical return path. The electromagnetic waves 1240 are guided by the transmission medium 1275 towards the communication device 1250, which is positioned in proximity to the transmission medium. The electromagnetic waves 1240 can be representative of the second wireless signals 1230 which are associated with the communication signals.

In one or more embodiments, the communication device 1250 can include a receiver that is configured to receive the electromagnetic waves 1240 that are propagating along the transmission medium 1275. Various types of receivers can be used for receiving the electromagnetic waves 1240.

System 1200 enables the communication device 1210 to transmit information which is received by the communication device 1250 (e.g., another antenna array 1255) via the wireless communication path 1227 and via being guided by the transmission medium 1275.

In one or more embodiments, the antenna arrays 1215, 1255 can include polyrod antennas. For example, each of the polyrod antennas can include a core that is connected with a waveguide that is configured to confine an electromagnetic wave at least in part within the core in a particular region of the core. In one embodiment, each of the polyrod antennas can include a core having a first region, a second region, a third region, and a fourth region, where the core comprises an interface in the first region. One of the plurality of transmitters can generate a first electromagnetic wave that induces a second electromagnetic wave at the interface of the first region. The core can be connected with a waveguide that is configured to confine the second electromagnetic wave at least in part within the core in the first region, where the second region of the core is configured to reduce a radiation loss of the second electromagnetic wave as the second electromagnetic wave propagates into the second region. The third region of the core can be configured to reduce a propagation loss of the second electromagnetic wave as the second electromagnetic wave propagates into the third region. The fourth region of the core can be outside of the waveguide and can be tapered to facilitate transmitting one of the first or second wireless signals based on the second electromagnetic wave.

In one or more embodiments, the communication device 1210 can provide a phase adjustment to the second wireless signals 1230 to accomplish beam steering towards the transmission medium 1275. FIG. 12 illustrates the antenna array 1255 and the receiver 1265 being co-located at communication device 1250, however, in another embodiment the antenna array 1255 and the receiver 1265 can be separate devices that may or may not be in proximity to each other. For example, the first wireless signals 1225 can be received by the antenna array 1255 of the communication device 1250 while the electromagnetic waves 1240 can be received by a receiver of a different communication device (not shown) that is in proximity to the transmission medium 1275.

One or more of the exemplary embodiments provide communications that facilitate management of vehicular traffic, such as in rural areas. In one embodiment, the particular area may have weak or non-existent cellular communication coverage, although one or more of the exemplary embodiments can operate where cellular communications coverage does exist.

In one or more embodiments, smart city features can be brought to rural areas using waveguide device capabilities and its presence over long distances in rural locations. As an example, in one or more embodiments, waveguide devices can provide for low-cost, low-energy communication options in rural area. Large urban communities are often characterized by large populations, heavy traffic, dense connectivity, large surface areas, and sizable local government. By contrast, rural areas are often characterized by low, spread-out populations, medium-to-low traffic, sparse connectivity, very large surface areas, and small local government. One or more of the exemplary embodiments can provide communications via wireless technology and via electromagnetic waves as described herein so that rural areas can be provided with smart features. As an example, smart city features can focus on office buildings, public transportation, smart roads, smart parking, air quality, fire risks to buildings, transparent government. These features have the potential to change the lives of city inhabitants for the better, and optimize local transportation, government, etc.

Figure 13A:
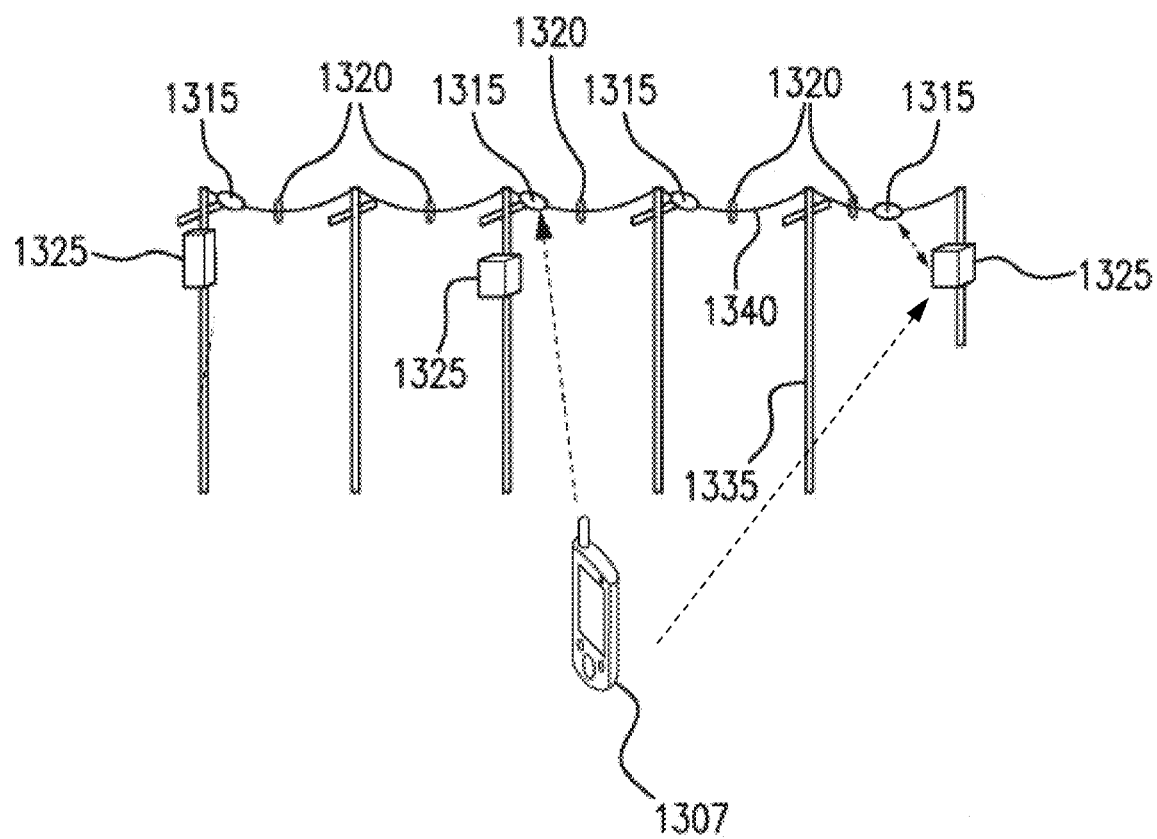
FIG. 13A is a graphical diagram illustrating an example, non-limiting embodiment of a communication system in accordance with various aspects described herein.

Turning now to FIG. 13A, a block diagram illustrating an example, non-limiting embodiment of a communication system 1300 in accordance with various aspects of the subject disclosure is shown. The communication system 1300 can include waveguide devices 1315 (e.g., mounted on utility structures 1335 that support transmission medium 1340) which can act as access points and concentrators as an economical communication media. As an example, the waveguide device(s) 1315 can be full duplex transceivers that can generate and receive electromagnetic wave signals 1320 simultaneously. The electromagnetic wave signals 1320 convey information in the form of data frames or packets, where the electromagnetic wave signals propagate along the transmission medium between each of the waveguide devices 1315. The transmission medium 1340 can comprise an external surface and the electromagnetic wave signals 1320 propagate along the transmission medium 1340 without requiring an electrical return path. In an embodiment, the electromagnetic wave signals 1320 can have a non-optical frequency range. In this example, the transmission medium 1340 can be a physical cable, such as a power line, although other transmission mediums can also be utilized. In another example, the transmission medium 1340 can be a fiber optic cable and the electromagnetic wave signals can have an optical frequency. The waveguides 1315 and/or transmission medium 1340 can also include other embodiments or components thereof (e.g., in place of or in addition to components described with respect to the embodiment of waveguide 1315), which are described herein.

In one or more embodiments, the waveguide devices 1315 also include wireless transmitters and receivers for directly communicating with other devices such as handset 1307. In another embodiment, wireless access point devices 1325 can be utilized that are separate devices from the waveguide devices 1315 that can facilitate communications with handset 1307.

In an embodiment, each waveguide device 1315 can be equipped with a sensor to detect noise or interference on transmission medium 1340 that can corrupt data frames sent or received over the transmission medium 1340. The sensor can also be integrated with the circuit(s) of the transmitter or receiver, can be a separate component of the waveguide, and/or can be a separate device that is in communication with the waveguide 1315. Additionally, the receiver of each waveguide device 1315 can detect noise or interference on the transmission medium 1340. Such noise or interference may be the result of a short pulse of energy, i.e., impulse, such as a spark gap discharge or a corona discharge, lasting 100 to 2000 nanoseconds, in general. The impulse may occur in a periodic pattern, with similar signal strength and/or have a large frequency bandwidth. The noise or interference may typically include energy that is out-of-band to the normal transmitted or received frequencies, thus making the noise or interference easier to detect. Furthermore, the noise or interference may have a particular noise signature.

Whenever data frames are corrupted, typically the receiver will determine that such corrupted data frames were not received properly and will send a non-acknowledgement (NACK) message to the transmitter requesting retransmission of such data frames. Depending on the protocol, a transmitter may not receive an acknowledgement (ACK) message from the receiver that certain data frames have been received, and after a time period, may automatically retransmit those data frames unacknowledged by the receiver. See, e.g., automatic repeat request protocols such as en.wikipedia.org/wiki/Stop-and-wait_ARQ, en.wikipedia.org/wiki/Go-Back-N_ARQ, and en.wikipedia.org/wiki/Selective_Repeat_ARQ, which are hereby incorporated by reference herein.

In an embodiment, when the waveguide device 1315 detects noise or interference that will corrupt data frames, the waveguide device 1315 will retransmit those corrupted data frames that are affected by the noise or interference without waiting for an ACK or NACK message from the corresponding receiver in a waveguide device 1315 at the other end of the transmission medium 1340. By not waiting for a message from the receiver, the system can decrease latency in communications affected by the noise or interference. The transmitter shall wait until the noise or interference event ends before attempting retransmission of the corrupted data frames.

Additionally, if the receiver of a waveguide device 1315 detects noise or interference that corrupts the received data frames, the waveguide device 1315 would not need to send a NACK message concerning the corrupted data frames, because the transmitter at the other end of the transmission medium 1340 will automatically identify the corrupted data frames and resend them. If for some reason potentially corrupted data frames were successfully transmitted, the receiver could merely discard the duplicate frames sent by the transmitter. In one or more embodiments, the process for retransmission of frames (e.g., responsive to detection of interference in received signal(s)), can be integrated with various transmission protocols including protocols that utilized acknowledgements. In an embodiment, machine learning can be used to classify the noise or interference and determine whether the noise or interference will disrupt the transmission of data frames, and the length of time that such disruption will occur. In such case when the transmitter detects a periodic pattern of interference, the transmitter can forego transmissions during a next occurrence in the periodic pattern. In one embodiment, the process (including by way of machine learning) can also be used to exclude particular events (which are identified by their parameter patterns) that are deemed not to impact transmissions by the receiving waveguide and/or other waveguides. In one embodiment, the machine learning can generate a table of probabilities for parameters of the signals in order to identify a particular interference (e.g., corona pulse versus spark gap noise). Parameters can change over time based on characteristics (or changes thereto) of the components involved in the communications (e.g., characteristics of the transmission medium, the waveguide transmitter, and so forth). In one embodiment, these changes of parameters can be monitored and learned by the machine learning so that the retransmission process can be adjusted.

Figure 13B:
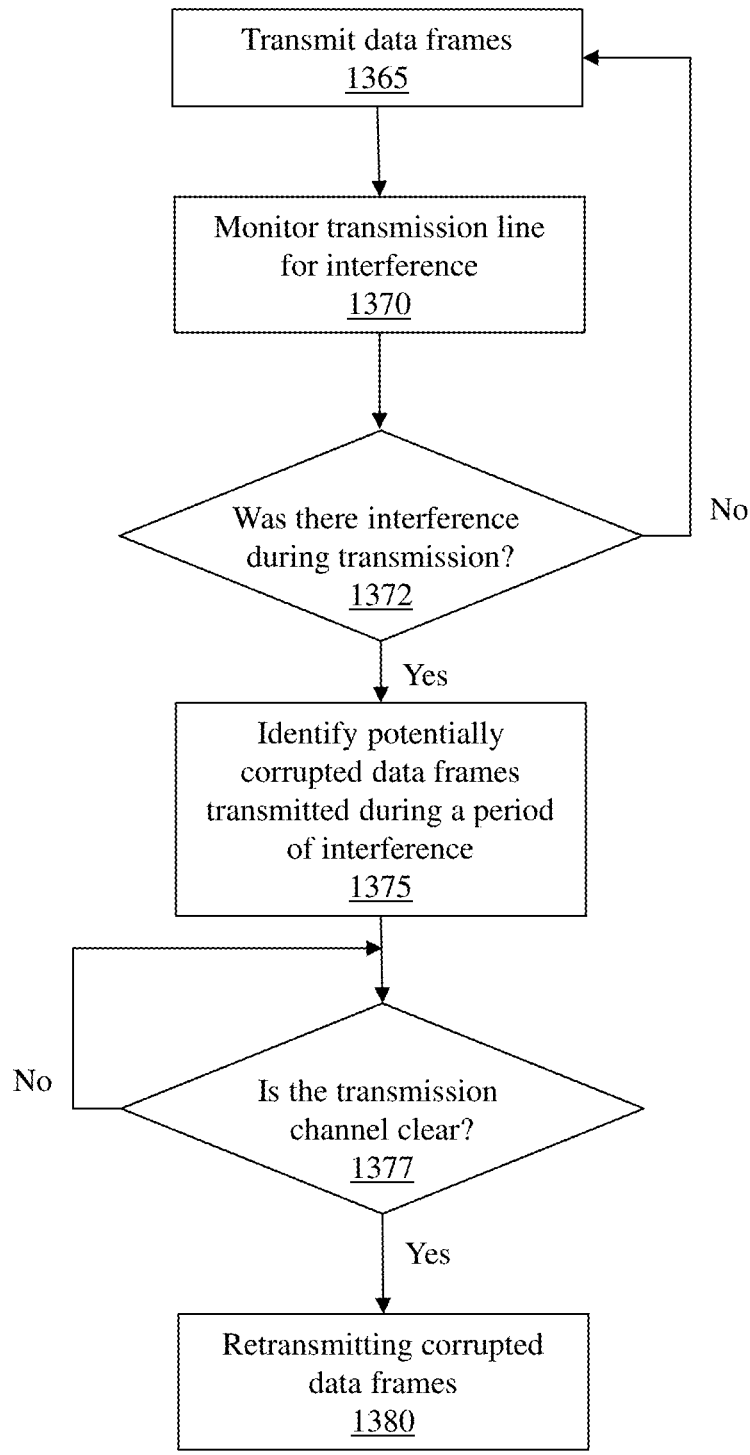
FIG. 13B illustrates a flow diagram of an example, non-limiting embodiment of communications associated with the systems of FIG. 13A in accordance with various aspects described herein.

FIG. 13B is a flow diagram of an example, non-limiting embodiment of a communications process associated with the systems of FIG. 13A in accordance with various aspects described herein. As shown in FIG. 13B, the process 1360 begins at step 1365 where a full duplex transceiver transmits electromagnetic wave signals that convey a plurality of data frames to another transceiver. In an embodiment, the electromagnetic wave signals propagate along the transmission medium without requiring an electrical return path.

Next, in step 1370, the full duplex transceiver, some other component of the waveguide, or another device that can detect interference monitors the transmission medium for an interference.

In step 1372, if there was no interference, then the process repeats at step 1365. However, if interference was detected, then the process continues at step 1375.

Then, in step 1375, the full duplex transceiver identifies one or more data frames of the plurality of data frames that were transmitted during a period of the interference detected in step 1370.

Next, in step 1377, the full duplex transceiver, some other component of the waveguide, or another device detects whether the interference is no longer present on the transmission medium. If the transmission channel is clear, then the process continues at step 1380, but waits if the transmission channel is not clear.

In step 1380, the full duplex transceiver retransmits the one or more data frames to the receiver of another waveguide device at the other end of the transmission medium.

While for purposes of simplicity of explanation, the respective processes are shown and described as a series of blocks in FIG. 13B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

It is further appreciated that the foregoing embodiments of FIGS. 13A-13B can be combined in whole or in part with one another, and/or can be combined in whole or in part with other embodiments of the subject disclosure, and/or can be adapted for use in whole or in part with other embodiments of the subject disclosure.

It is further appreciated that any of the embodiments of the subject disclosure (singly or in any combination) which are adaptable for transmitting or receiving communication signals can be utilized as network elements for the distribution and/or routing of media content, voice communications, video streaming, internet traffic or other data transport. It is further appreciated that such network elements can be adapted or otherwise utilized in a communication network described below in relation to FIG. 14 for the distribution or routing of media content, voice communications, video streaming, internet traffic or other data transport. It is also appreciated that such network elements can also be configured to utilize virtualized communication network techniques described below in relation to FIG. 15.

Figure 14:
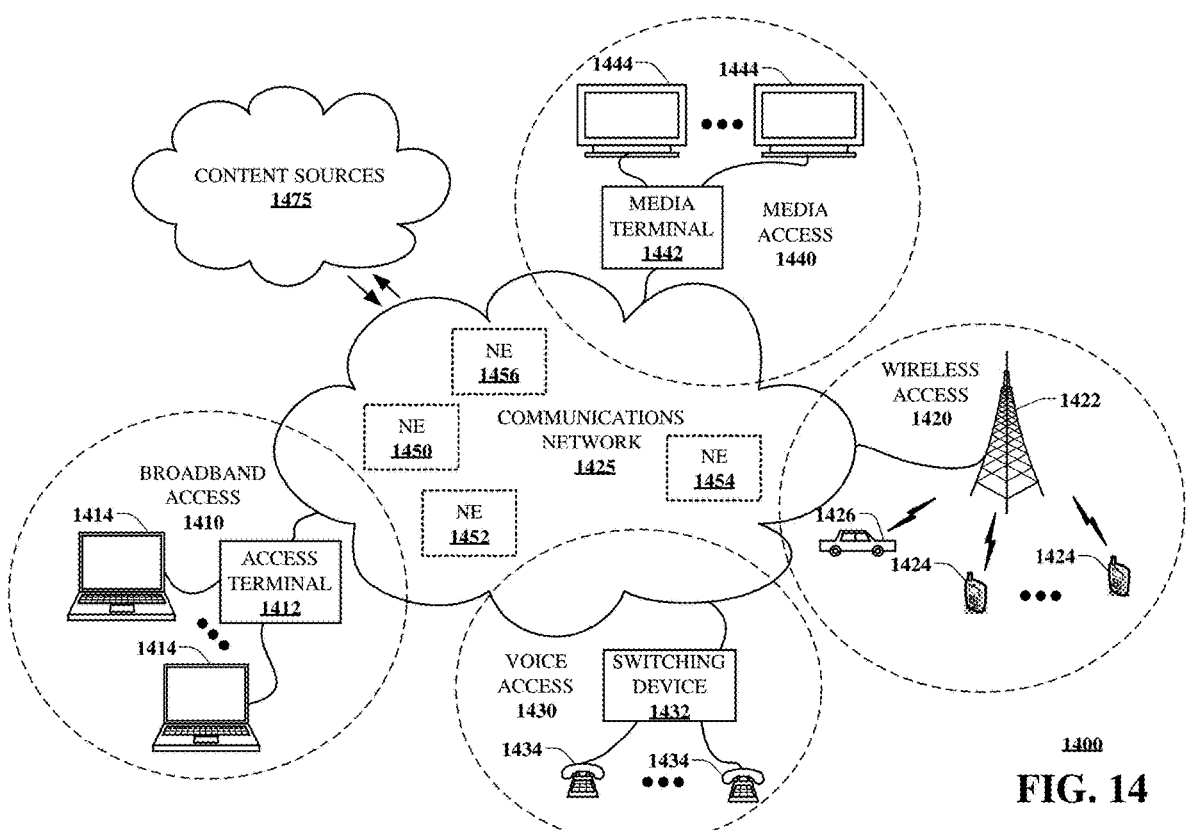
FIG. 14 is a block diagram illustrating an example, non-limiting embodiment of a communications network in accordance with various aspects described herein.

Referring now to FIG. 14, a block diagram is shown illustrating an example, non-limiting embodiment of a communications network 1400 in accordance with various aspects described herein. Network 1400 can be used in conjunction with the waveguide devices 1315 for communicating information, such as in areas with no or poor cellular network coverage. In particular, a communications network 1425 is presented for providing broadband access 1410 to a plurality of data terminals 1414 via access terminal 1412, wireless access 1420 to a plurality of mobile devices 1424 and vehicle 1426 via base station or access point 1422, voice access 1430 to a plurality of telephony devices 1434, via switching device 1432 and/or media access 1440 to a plurality of audio/video display devices 1444 via media terminal 1442. In addition, communication network 1425 is coupled to one or more content sources 1475 of audio, video, graphics, text and/or other media. While broadband access 1410, wireless access 1420, voice access 1430 and media access 1440 are shown separately, one or more of these forms of access can be combined to provide multiple access services to a single client device (e.g., mobile devices 1424 can receive media content via media terminal 1442, data terminal 1414 can be provided voice access via switching device 1432, and so on).

The communications network 1425 includes a plurality of network elements (NE) 1450, 1452, 1454, 1456, etc. for facilitating the broadband access 1410, wireless access 1420, voice access 1430, media access 1440 and/or the distribution of content from content sources 1475. The communications network 1425 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 1412 can include a digital subscriber line access multiplexer (DSLAM), cable modem termination system (CMTS), optical line terminal (OLT) and/or other access terminal. The data terminals 1414 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 1422 can include a 4G, 5G, or higher generation base station, an access point that operates via an 802.11 standard such as 802.11n, 802.11ac, 802.11ag, 802.11agn or other wireless access terminal. The mobile devices 1424 can include mobile phones, e-readers, tablets, phablets, wireless modems, and/or other mobile computing devices.

In various embodiments, the switching device 1432 can include a private branch exchange or central office switch, a media services gateway, VoIP gateway or other gateway device and/or other switching device. The telephony devices 1434 can include traditional telephones (with or without a terminal adapter), VoIP telephones and/or other telephony devices.

In various embodiments, the media terminal 1442 can include a cable head-end or other TV head-end, a satellite receiver, gateway or other media terminal 1442. The display devices 1444 can include televisions with or without a set top box, personal computers and/or other display devices.

In various embodiments, the content sources 1475 include broadcast television and radio sources, video on demand platforms and streaming video and audio services platforms, one or more content data networks, data servers, web servers and other content servers, and/or other sources of media.

In various embodiments, the communications network 1425 can include wired, optical and/or wireless links and the network elements 1450, 1452, 1454, 1456, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

It will be appreciated that any of the subsystems (e.g., access terminal 1412, network elements 1450-1456, media terminal 1442, switching device 1432, wireless access 1420, and so on) of the communication network 1400 can be configured or otherwise adapted to utilize in whole or in part any of the embodiments of the subject disclosure for transmitting and receiving communication signals via electromagnetic waves that propagate over wireless or physical transmission media.

Figure 15:
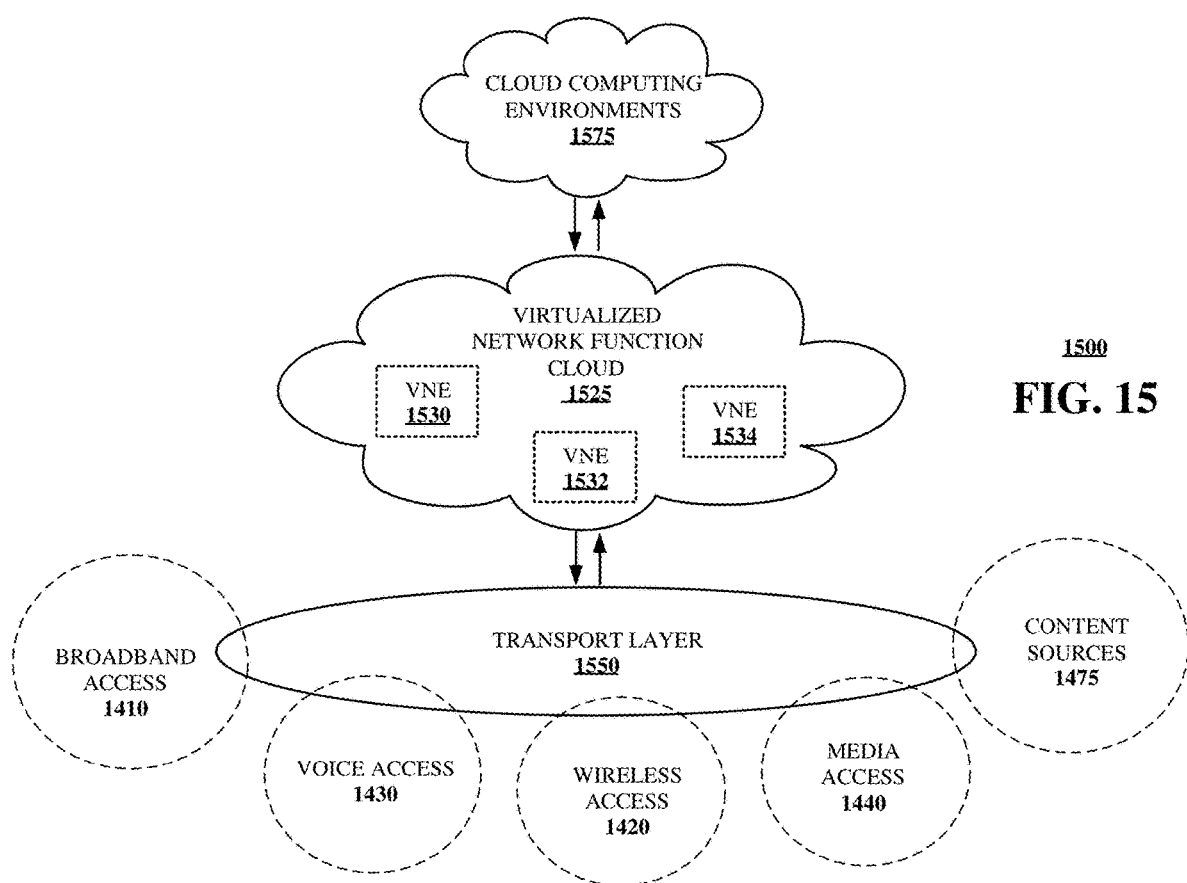
FIG. 15 is a block diagram illustrating an example, non-limiting embodiment of a virtualized communication network in accordance with various aspects described herein.

Referring now to FIG. 15, a block diagram 1500 is shown illustrating an example, non-limiting embodiment of a virtualized communication network in accordance with various aspects described herein. In particular a virtualized communication network is presented that can be used to implement some or all of the subsystems and functions of communication network 1400, some or all of the embodiments associated with waveguide systems and methods thereof, some or all of the embodiments associated with distributed antenna systems, or other embodiments and methods thereof described by the subject disclosure. Network 1500 can be used in conjunction with the waveguide devices 1315 for communicating information, such as in areas with no or poor cellular network coverage.

In particular, a cloud networking architecture is shown that leverages cloud technologies and supports rapid innovation and scalability via a transport layer 1550, a virtualized network function cloud 1525 and/or one or more cloud computing environments 1575. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 1530, 1532, 1534, etc. that perform some or all of the functions of network elements 1450, 1452, 1454, 1456, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 1450 (shown in FIG. 14), such as an edge router can be implemented via a virtual network element 1530 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 1550 includes fiber, cable, wired and/or wireless transport elements, network elements and interfaces to provide broadband access 1410, wireless access 1420, voice access 1430, media access 1440 and/or access to content sources 1475 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as virtual network elements 1530, 1532 or 1534. These network elements can be included in transport layer 1550.

The virtualized network function cloud 1525 interfaces with the transport layer 1550 to provide the virtual network elements 1530, 1532, 1534, etc. to provide specific NFVs. In particular, the virtualized network function cloud 1525 leverages cloud operations, applications, and architectures to support networking workloads. The virtualized network elements 1530, 1532 and 1534 can employ network function software that provides either a one-for-one mapping of traditional network element function or alternately some combination of network functions designed for cloud computing. For example, virtualized network elements 1530, 1532 and 1534 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 1530, 1532, 1534, etc. can be instantiated and managed using an orchestration approach similar to those used in cloud compute services.

The cloud computing environments 1575 can interface with the virtualized network function cloud 1525 via APIs that expose functional capabilities of the VNE 1530, 1532, 1534, etc. to provide the flexible and expanded capabilities to the virtualized network function cloud 1525. In particular, network workloads may have applications distributed across the virtualized network function cloud 1525 and cloud computing environment 1575 and in the commercial cloud or might simply orchestrate workloads supported entirely in NFV infrastructure from these third-party locations.

It will be appreciated that any of the foregoing techniques can be applied or combined in whole or in party with any embodiments of the subsystems and functions of communication network 1400, some or all of the embodiments associated with waveguide systems and methods thereof, some or all of the embodiments associated with distributed antenna systems, as well as other embodiments and methods thereof described by the subject disclosure.

Figure 16:
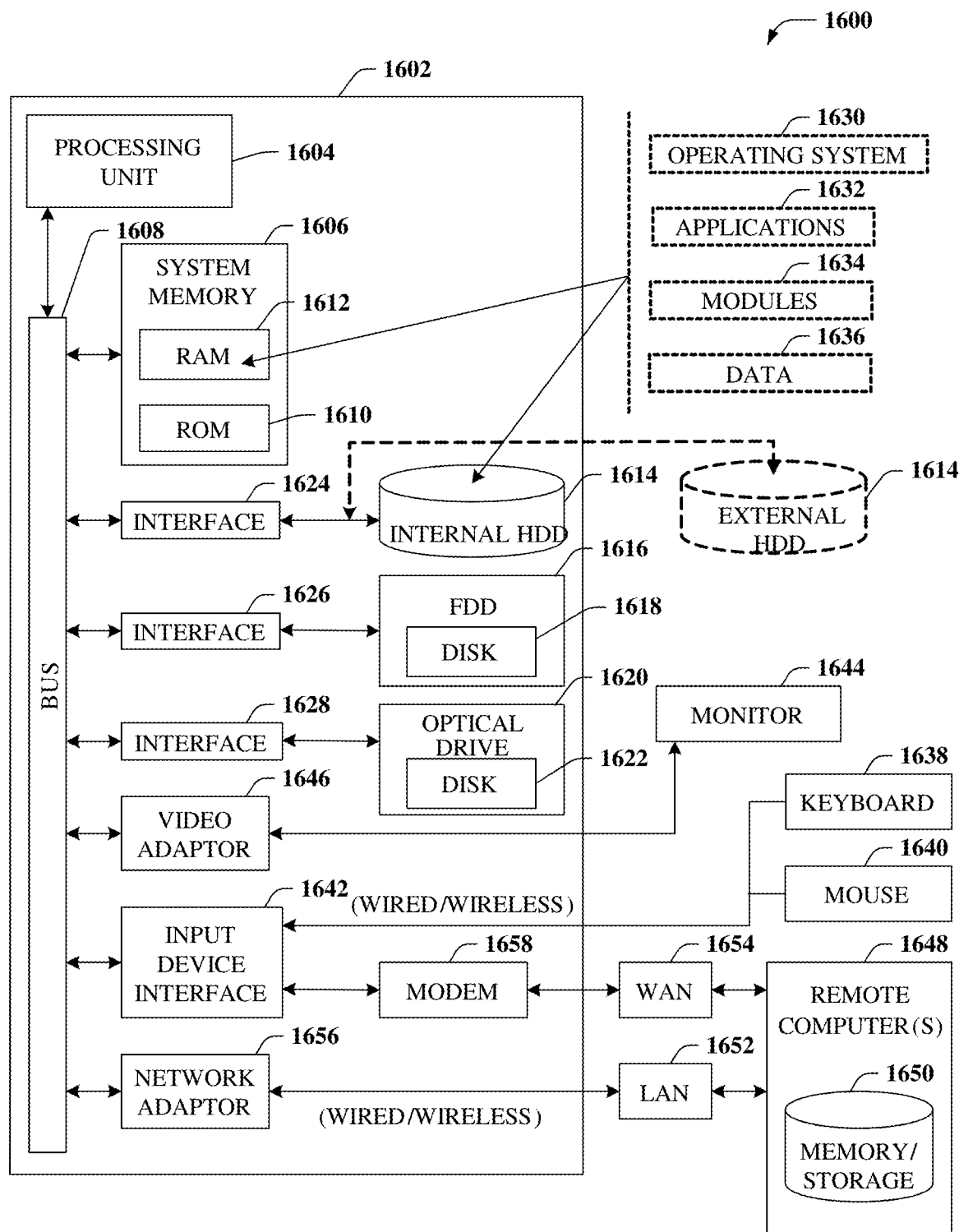
FIG. 16 is a block diagram of an example, non-limiting embodiment of a computing environment in accordance with various aspects described herein.

FIG. 16 illustrates a block diagram of a computing environment in accordance with various aspects described herein. In order to provide additional context for various embodiments of the embodiments described herein, FIG. 16 and the following discussion are intended to provide a brief, general description of a suitable computing environment 1600 in which the various embodiments of the subject disclosure can be implemented. While the embodiments have been described above in the general context of computer-executable instructions that can run on one or more computers, those skilled in the art will recognize that the embodiments can be also implemented in combination with other program modules and/or as a combination of hardware and software. Computing environment 1600 can be used in conjunction with the waveguide devices 1315 for communicating, monitoring and/or collecting information, such as in areas with no or poor cellular network coverage.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes processor as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 16, the example environment 1600 for transmitting and receiving signals via or forming at least part of a base station (e.g., base station devices, macrocell site 1102, or base stations) or central office. At least a portion of the example environment 1600 can also be used for transmission devices 101 or 102. The example environment can comprise a computer 1602, the computer 1602 comprising a processing unit 1604, a system memory 1606 and a system bus 1608. The system bus 1608 couple's system components including, but not limited to, the system memory 1606 to the processing unit 1604. The processing unit 1604 can be any of various commercially available processors. Dual microprocessors and other multiprocessor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 comprises ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also comprise a high-speed RAM such as static RAM for caching data.

The computer 1602 further comprises an internal hard disk drive (HDD) 1614 (e.g., EIDE, SATA), which internal hard disk drive 1614 can also be configured for external use in a suitable chassis (not shown), a magnetic floppy disk drive (FDD) 1616, (e.g., to read from or write to a removable diskette 1618) and an optical disk drive 1620, (e.g., reading a CD-ROM disk 1622 or, to read from or write to other high capacity optical media such as the DVD). The hard disk drive 1614, magnetic disk drive 1616 and optical disk drive 1620 can be connected to the system bus 1608 by a hard disk drive interface 1624, a magnetic disk drive interface 1626 and an optical drive interface 1628, respectively. The interface 1624 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1612, comprising an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems. Examples of application programs 1632 that can be implemented and otherwise executed by processing unit 1604 include the diversity selection determining performed by transmission device 101 or 102.

A user can enter commands and information into the computer 1602 through one or more wired/wireless input devices, e.g., a keyboard 1638 and a pointing device, such as a mouse 1640. Other input devices (not shown) can comprise a microphone, an infrared (IR) remote control, a joystick, a game pad, a stylus pen, touch screen or the like. These and other input devices are often connected to the processing unit 1604 through an input device interface 1642 that can be coupled to the system bus 1608, but can be connected by other interfaces, such as a parallel port, an IEEE 1394 serial port, a game port, a universal serial bus (USB) port, an IR interface, etc.

A monitor 1644 or other type of display device can be also connected to the system bus 1608 via an interface, such as a video adapter 1646. It will also be appreciated that in alternative embodiments, a monitor 1644 can also be any display device (e.g., another computer having a display, a smart phone, a tablet computer, etc.) for receiving display information associated with computer 1602 via any communication means, including via the Internet and cloud-based networks. In addition to the monitor 1644, a computer typically comprises other peripheral output devices (not shown), such as speakers, printers, etc.

The computer 1602 can operate in a networked environment using logical connections via wired and/or wireless communications to one or more remote computers, such as a remote computer(s) 1648. The remote computer(s) 1648 can be a workstation, a server computer, a router, a personal computer, portable computer, microprocessor-based entertainment appliance, a peer device or other common network node, and typically comprises many or all of the elements described relative to the computer 1602, although, for purposes of brevity, only a memory/storage device 1650 is illustrated. The logical connections depicted comprise wired/wireless connectivity to a local area network (LAN) 1652 and/or larger networks, e.g., a wide area network (WAN) 1654. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1652 through a wired and/or wireless communication network interface or adapter 1656. The adapter 1656 can facilitate wired or wireless communication to the LAN 1652, which can also comprise a wireless AP disposed thereon for communicating with the wireless adapter 1656.

When used in a WAN networking environment, the computer 1602 can comprise a modem 1658 or can be connected to a communications server on the WAN 1654 or has other means for establishing communications over the WAN 1654, such as by way of the Internet. The modem 1658, which can be internal or external and a wired or wireless device, can be connected to the system bus 1608 via the input device interface 1642. In a networked environment, program modules depicted relative to the computer 1602 or portions thereof, can be stored in the remote memory/storage device 1650. It will be appreciated that the network connections shown are example and other means of establishing a communications link between the computers can be used.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and Bluetooth® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 17:
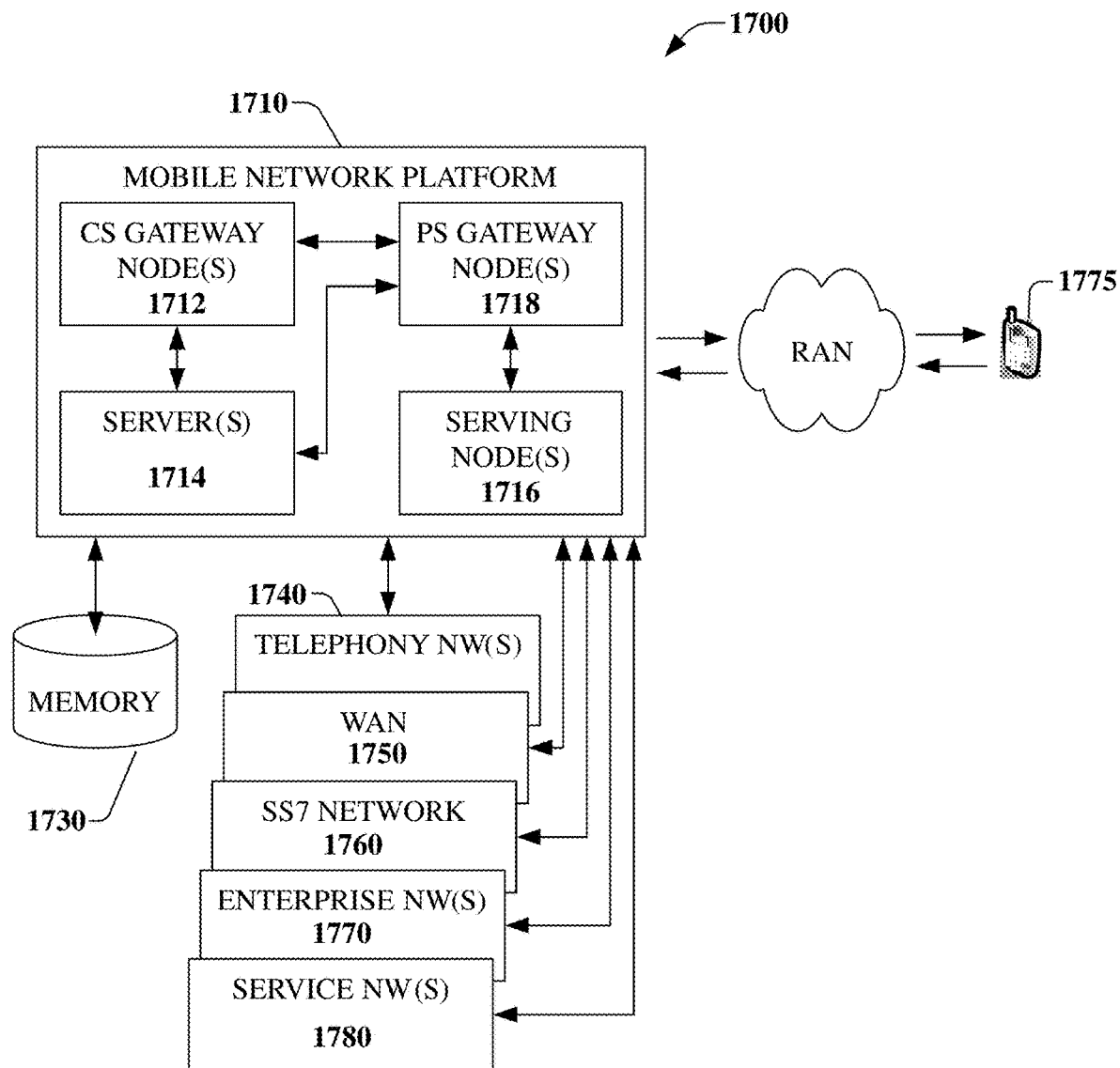
FIG. 17 is a block diagram of an example, non-limiting embodiment of a mobile network platform in accordance with various aspects described herein.

FIG. 17 presents an example embodiment 1700 of a mobile network platform 1710 that can implement and exploit one or more aspects of the disclosed subject matter described herein. Platform 1700 can be used for communicating information, such as with respect to vehicular traffic, road conditions, parking data, and so forth. In one or more embodiments, the mobile network platform 1710 can generate and receive signals transmitted and received by base stations (e.g., base station devices, macrocell site, or base stations), central office, or transmission device 101 or 102 associated with the disclosed subject matter. Generally, wireless network platform 1710 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1710 can be included in telecommunications carrier networks and can be considered carrier-side components as discussed elsewhere herein. Mobile network platform 1710 comprises CS gateway node(s) 1712 which can interface CS traffic received from legacy networks like telephony network(s) 1740 (e.g., public switched telephone network (PSTN), or public land mobile network (PLMN)) or a signaling system #7 (SS7) network 1760. Circuit switched gateway node(s) 1712 can authorize and authenticate traffic (e.g., voice) arising from such networks. Additionally, CS gateway node(s) 1712 can access mobility, or roaming, data generated through SS7 network 1760; for instance, mobility data stored in a visited location register (VLR), which can reside in memory 1730. Moreover, CS gateway node(s) 1712 interfaces CS-based traffic and signaling and PS gateway node(s) 1718. As an example, in a 3GPP UMTS network, CS gateway node(s) 1712 can be realized at least in part in gateway GPRS support node(s) (GGSN). It should be appreciated that functionality and specific operation of CS gateway node(s) 1712, PS gateway node(s) 1718, and serving node(s) 1716, is provided and dictated by radio technology(ies) utilized by mobile network platform 1710 for telecommunication.

In addition to receiving and processing CS-switched traffic and signaling, PS gateway node(s) 1718 can authorize and authenticate PS-based data sessions with served mobile devices. Data sessions can comprise traffic, or content(s), exchanged with networks external to the wireless network platform 1710, like wide area network(s) (WANs) 1750, enterprise network(s) 1770, and service network(s) 1780, which can be embodied in local area network(s) (LANs), can also be interfaced with mobile network platform 1710 through PS gateway node(s) 1718. It is to be noted that WANs 1750 and enterprise network(s) 1770 can embody, at least in part, a service network(s) like IP multimedia subsystem (IMS). Based on radio technology layer(s) available in technology resource(s) 1717, packet-switched gateway node(s) 1718 can generate packet data protocol contexts when a data session is established; other data structures that facilitate routing of packetized data also can be generated. To that end, in an aspect, PS gateway node(s) 1718 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 1700, wireless network platform 1710 also comprises serving node(s) 1716 that, based upon available radio technology layer(s), convey the various packetized flows of data streams received through PS gateway node(s) 1718. It is to be noted that for technology resource(s) 1717 that rely primarily on CS communication, server node(s) can deliver traffic without reliance on PS gateway node(s) 1718; for example, server node(s) can embody at least in part a mobile switching center. As an example, in a 3GPP UMTS network, serving node(s) 1716 can be embodied in serving GPRS support node(s) (SGSN).

For radio technologies that exploit packetized communication, server(s) 1714 in wireless network platform 1710 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 1710. Data streams (e.g., content(s) that are part of a voice call or data session) can be conveyed to PS gateway node(s) 1718 for authorization/authentication and initiation of a data session, and to serving node(s) 1716 for communication thereafter. In addition to application server, server(s) 1714 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 1710 to ensure network's operation and data integrity in addition to authorization and authentication procedures that CS gateway node(s) 1712 and PS gateway node(s) 1718 can enact. Moreover, provisioning server(s) can provision services from external network(s) like networks operated by a disparate service provider; for instance, WAN 1750 or Global Positioning System (GPS) network(s) (not shown). Provisioning server(s) can also provision coverage through networks associated to wireless network platform 1710 (e.g., deployed and operated by the same service provider), such as the distributed antennas networks shown in FIG. 1 that enhance wireless service coverage by providing more network coverage. Repeater devices described herein can also be utilized to improve network coverage in order to enhance subscriber service experience by way of UE 1775.

It is to be noted that server(s) 1714 can comprise one or more processors configured to confer at least in part the functionality of macro network platform 1710. To that end, the one or more processor can execute code instructions stored in memory 1730, for example. It should be appreciated that server(s) 1714 can comprise a content manager, which operates in substantially the same manner as described hereinbefore.

In example embodiment 1700, memory 1730 can store information related to operation of wireless network platform 1710. Other operational information can comprise provisioning information of mobile devices served through wireless platform network 1710, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1730 can also store information from at least one of telephony network(s) 1740, WAN 1750, enterprise network(s) 1770, or SS7 network 1760. In an aspect, memory 1730 can be, for example, accessed as part of a data store component or as a remotely connected memory store.

In order to provide a context for the various aspects of the disclosed subject matter, FIG. 17, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 18:
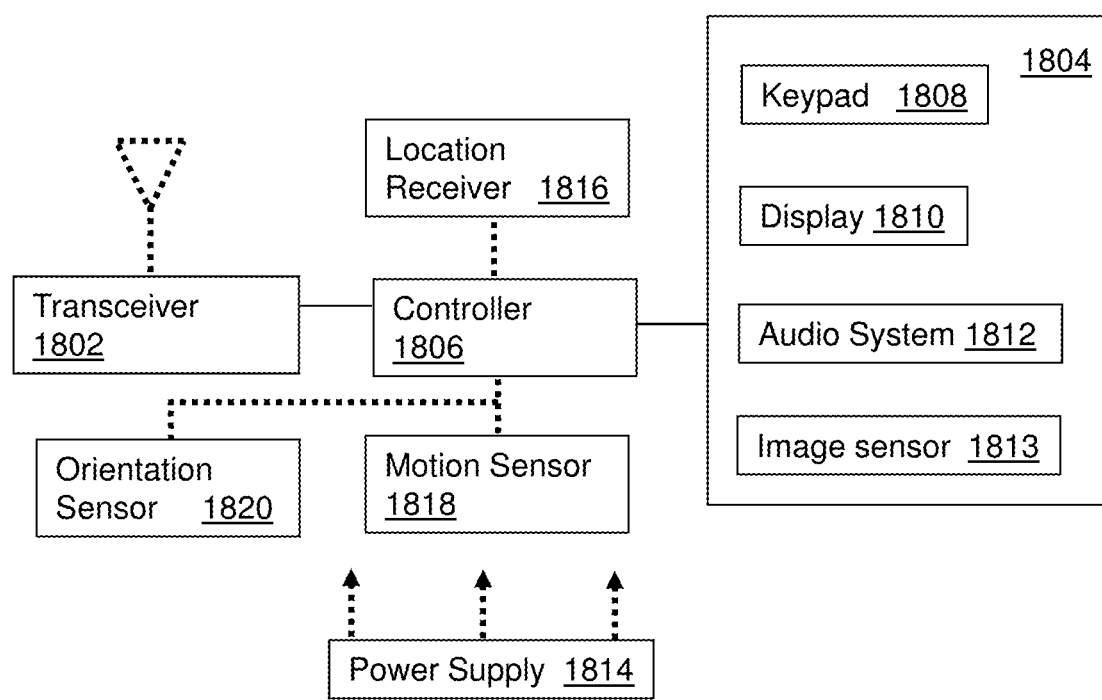
FIG. 18 is a block diagram of an example, non-limiting embodiment of a communication device in accordance with various aspects described herein.

FIG. 18 depicts an illustrative embodiment of a communication device 1800. The communication device 1800 can serve as an illustrative embodiment of devices such as mobile devices and in-building devices referred to by the subject disclosure. Device 1800 can be used in conjunction with the waveguide devices 1315 for communicating information, such as vehicular traffic, road conditions, parking conditions, and so forth.

The communication device 1800 can comprise a wireline and/or wireless transceiver 1802 (herein transceiver 1802), a user interface (UI) 1804, a power supply 1814, a location receiver 1816, a motion sensor 1818, an orientation sensor 1820, and a controller 1806 for managing operations thereof. The transceiver 1802 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1802 can also be adapted to support circuit-switched wireline access technologies (such as PSTN), packet-switched wireline access technologies (such as TCP/IP, VoIP, etc.), and combinations thereof.

The UI 1804 can include a depressible or touch-sensitive keypad 1808 with a navigation mechanism such as a roller ball, a joystick, a mouse, or a navigation disk for manipulating operations of the communication device 1800. The keypad 1808 can be an integral part of a housing assembly of the communication device 1800 or an independent device operably coupled thereto by a tethered wireline interface (such as a USB cable) or a wireless interface supporting for example Bluetooth®. The keypad 1808 can represent a numeric keypad commonly used by phones, and/or a QWERTY keypad with alphanumeric keys. The UI 1804 can further include a display 1810 such as monochrome or color LCD (Liquid Crystal Display), OLED (Organic Light Emitting Diode) or other suitable display technology for conveying images to an end user of the communication device 1800. In an embodiment where the display 1810 is touch-sensitive, a portion or all of the keypad 1808 can be presented by way of the display 1810 with navigation features.

The display 1810 can use touch screen technology to also serve as a user interface for detecting user input. As a touch screen display, the communication device 1800 can be adapted to present a user interface having graphical user interface (GUI) elements that can be selected by a user with a touch of a finger. The touch screen display 1810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1810 can be an integral part of the housing assembly of the communication device 1800 or an independent device communicatively coupled thereto by a tethered wireline interface (such as a cable) or a wireless interface.

The UI 1804 can also include an audio system 1812 that utilizes audio technology for conveying low volume audio (such as audio heard in proximity of a human ear) and high-volume audio (such as speakerphone for hands free operation). The audio system 1812 can further include a microphone for receiving audible signals of an end user. The audio system 1812 can also be used for voice recognition applications. The UI 1804 can further include an image sensor 1813 such as a charged coupled device (CCD) camera for capturing still or moving images.

The power supply 1814 can utilize common power management technologies such as replaceable and rechargeable batteries, supply regulation technologies, and/or charging system technologies for supplying energy to the components of the communication device 1800 to facilitate long-range or short-range portable communications. Alternatively, or in combination, the charging system can utilize external power sources such as DC power supplied over a physical interface such as a USB port or other suitable tethering technologies.

The location receiver 1816 can utilize location technology such as a global positioning system (GPS) receiver capable of assisted GPS for identifying a location of the communication device 1800 based on signals generated by a constellation of GPS satellites, which can be used for facilitating location services such as navigation. The motion sensor 1818 can utilize motion sensing technology such as an accelerometer, a gyroscope, or other suitable motion sensing technology to detect motion of the communication device 1800 in three-dimensional space. The orientation sensor 1820 can utilize orientation sensing technology such as a magnetometer to detect the orientation of the communication device 1800 (north, south, west, and east, as well as combined orientations in degrees, minutes, or other suitable orientation metrics).

The communication device 1800 can use the transceiver 1802 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 1806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1800.

Other components not shown in FIG. 18 can be used in one or more embodiments of the subject disclosure. For instance, the communication device 1800 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. For example, artificial intelligence can be used in optional training controller 230 evaluate and select candidate frequencies, modulation schemes, MIMO modes, and/or guided wave modes in order to maximize transfer efficiency. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A communication system, comprising:
   a full duplex transceiver configured to transmit and receive electromagnetic wave signals simultaneously over a transmission medium;
   a processing system including a processor; and
   a memory that stores executable instructions that, when executed by the processing system, facilitate performance of operations, the operations comprising:
   transmitting, via the full duplex transceiver, the electromagnetic wave signals that convey a plurality of data frames, wherein the electromagnetic wave signals propagate along the transmission medium to another transceiver, wherein the electromagnetic wave signals propagate along the transmission medium without requiring an electrical return path;
   monitoring the transmission medium for an interference;
   identifying, via the full duplex transceiver, one or more data frames of the plurality of data frames that were transmitted during a period of the interference; and
   retransmitting, via the full duplex transceiver, the one or more data frames.

2. The communication system of claim 1, wherein the transmission medium is a fiber optic cable, and the electromagnetic wave signals an optical frequency.

3. The communication system of claim 1, wherein the transmission medium is a physical cable, and the electromagnetic wave signals have a non-optical frequency.

4. The communication system of claim 3, wherein the transmission medium is a power line.

5. The communication system of claim 4, wherein the interference is an impulse on the power line.

6. The communication system of claim 5, wherein the impulse is caused by a corona discharge.

7. The communication system of claim 1, wherein the operations further comprise detecting a periodic pattern of the interference, and foregoing transmissions during a next occurrence in the periodic pattern.

8. The communication system of claim 1, wherein the processing system comprises a plurality of processors operating in a distributed computing environment.

9. A non-transitory, machine-readable medium, comprising executable instructions that, when executed by a processing system including a processor, facilitate performance of operations, the operations comprising:
   directing a transceiver to transmit electromagnetic wave signals that convey a plurality of data frames, wherein the electromagnetic wave signals propagate along a transmission medium to another transceiver, wherein the electromagnetic wave signals propagate along the transmission medium without requiring an electrical return path;
   monitoring the transmission medium for an interference;
   identifying one or more data frames of the plurality of data frames that were transmitted during a period of the interference; and
   directing the transceiver to retransmit the one or more data frames.

10. The non-transitory, machine-readable medium of claim 9, wherein the transmission medium is a fiber optic cable, and the electromagnetic wave signals an optical frequency.

11. The non-transitory, machine-readable medium of claim 9, wherein the transmission medium is a physical cable, and the electromagnetic wave signals have a non-optical frequency.

12. The non-transitory, machine-readable medium of claim 11, wherein the transmission medium is a power line.

13. The non-transitory, machine-readable medium of claim 12, wherein the interference is an impulse on the power line.

14. The non-transitory, machine-readable medium of claim 13, wherein the impulse is caused by a corona discharge.

15. The non-transitory, machine-readable medium of claim 9, wherein the operations further comprise detecting a periodic pattern of the interference, and foregoing transmissions during a next occurrence in the periodic pattern.

16. The non-transitory, machine-readable medium of claim 15, wherein the processing system uses machine learning to detect the periodic pattern of the interference.

17. The non-transitory, machine-readable medium of claim 16, wherein the processing system comprises a plurality of processors operating in a distributed computing environment.

18. A method, comprising:
- detecting, by a processing system including a processor, interference with data transmissions on a transmission medium;
- identifying, by the processing system, one or more data frames that were transmitted during a period of the interference; and
- directing, by the processing system, a transceiver to retransmit the one or more data frames conveyed by electromagnetic wave signals, wherein the electromagnetic wave signals propagate along the transmission medium to another transceiver, wherein the electromagnetic wave signals propagate along the transmission medium without requiring an electrical return path.

19. The method of claim 18, wherein the transmission medium is a power line and the electromagnetic wave signals have a non-optical frequency.

20. The method of claim 19, wherein the interference is caused by an impulse on the power line.

* * * * *